United States Patent [19]

Molyneaux

[11] Patent Number: 5,488,733
[45] Date of Patent: Jan. 30, 1996

[54] PROPULSION CONTROL SYSTEM CENTAL PROCESSING UNIT BOARD

[75] Inventor: William F. Molyneaux, Huntington, Pa.

[73] Assignee: AEG Transportation Systems, Inc., Pittsburgh, Pa.

[21] Appl. No.: 297,845

[22] Filed: Aug. 30, 1994

Related U.S. Application Data

[62] Division of Ser. No. 686,927, Apr. 18, 1991, Pat. No. 5,377,356, which is a continuation of Ser. No. 584,933, Sep. 19, 1990, abandoned.

[51] Int. Cl.[6] .............................. G06F 13/28; G06F 13/36
[52] U.S. Cl. ................. 395/800; 364/424.01; 364/240.5; 364/242.31; 364/DIG. 1
[58] Field of Search ....................... 395/800; 364/424.01, 364/240.5, 242.31, DIG. 1; 340/825.5

[56] References Cited

U.S. PATENT DOCUMENTS 4,626,843  12/1986  Szeto et al. ......................... 340/825.5

Primary Examiner—Alyssa H. Bowler
Assistant Examiner—John Harrity
Attorney, Agent, or Firm—Webb Ziesenheim Bruening Logsdon Orkin & Hanson

[57] ABSTRACT

For use in a propulsion control system, a microprocessor based central processing unit board includes both Multibus I and Multibus II interfaces. Multibus I master interface and Multibus slave interface controllers are designed for high data throughput by using programmed logic design (PLD) technology. In addition, the need for latching of data transceivers used in conventional Multibus I designs is eliminated. The Multibus II interface is removable.

2 Claims, 84 Drawing Sheets

FIG. 4A

```
24 PIN DIP   (SEE FIG. 4)

CLK,BEN,BRD,BWR,MYDECODE,SPEN        PIN 1,2,3,4,5,6;
   BINTA,BRESET,IORD,IOWR,XXACK         PIN 7,8,14,15,16;
   XEN,STA,S0,S1,S2,S3,DIR              PIN 17,18,19,20,21,22,23;
   GND,VCC                              PIN 12,24;

DIR,STA,XXACK,IOWR,IORD              ISTYPE 'NEG,COM';
   S0,A1,S2,S3                          ISTYPE 'NEG,REG';

SREG = [S0,S1,S2,S3];

state values: A=15; B=7; C=3; D=11; E=12; F=9; G=13;
state diagram sreg:
   STATE A:
         IF (BEN & BINTA & BRESET & !MYDECODE) THEN B
         ELSE IF (!BEN & !BINTA & !SPEN & BRESET & MYDECODE)
          THEN F;
         ELSE A;

STATE B:
         IF (BEN & BRESET & BINTA & !MYDECODE) THEN C
         ELSE A;

STATE C:
         IF (BEN & !BRD & BRESET & !MYDECODE & BINTA) THEN E
         ELSE IF (BEN & !BWR & BRESET & !MYDECODE & BINTA) THEN D
         ELSE A;

STATE D:
         IF (BEN & BINTA & BRESET & !MYDECODE) THEN E
         ELSE A;

STATE E:
         IF (BEN & BRESET & !MYDECODE & BINTA) THEN E
         ELSE IF (!BEN & BRESET & !BINTA & !SPEN & MYDECODE) THEN E
         ELSE A;

STATE F:
         IF (!BEN & BRESET & MYDECODE & !BINTA & !SPEN) THEN G
         ELSE A;

STATE G:
         IF (!BEN & !BINTA & !SPEN & BRESET) THEN E
equations
         ENABLE IOWR = TRUE;
         !IOWR = BEN & !BWR & !S0;
         ENABLE IORD = TRUE;
         !IORD = !BRD & BEN;
         ENABLE STA = TRUE;
         !STA = !S0 # !S1 # !S2 # !S3 # BEN & !STA;
         XEN = BEN # !SPEN;
         ENABLE XXACK = XEN;
         XXACK = S3;
         !DIR = !BWR & BRD;
```

FIG. 4B

```
test_vectors ([CLK,BEN,BRD,BWR,BINTA,SPEN,MYDECODE,BRESET] ->
   [DIR,S0,S1,S2,S3,XXACK,STA,IOWR,IORD])

M
                  Y
                  D  B
          B       E  R                    X
          I   S   C  E                    X      I  I
   C  B   B   B   N  P  O  S       D      A  S   O  O
   L  E   R   W   T  E  D  E       I  S   S  S   C  T  W  R
   K  N   D   R   A  N  E  T       R  0   1  2   3  K  A  R  D
  [C,L,H,H,H,H,H,H]  ->  [H,H,H,H,H,Z,H,H,H];
  [C,H,L,H,H,H,L,H]  ->  [H,L,H,H,H,H,L,H,L];
  [C,H,L,H,H,H,L,H]  ->  [H,L,L,H,H,H,L,H,L];
  [C,H,L,H,H,H,L,H]  ->  [H,H,H,L,L,L,L,H,L];
  [C,L,H,H,H,H,H,H]  ->  [H,H,H,H,H,Z,H,H,H];

[C,L,H,H,H,H,H,H]  ->  [H,H,H,H,H,Z,H,H,H];
  [C,H,H,L,H,H,L,H]  ->  [L,L,H,H,H,H,L,L,H];
  [C,H,H,L,H,H,L,H]  ->  [L,L,L,H,H,H,L,L,H];
  [C,H,H,L,H,H,L,H]  ->  [L,H,L,H,H,H,L,H,H];
  [C,H,H,L,H,H,L,H]  ->  [L,H,H,L,L,L,L,H,H];
  [C,L,H,H,H,H,H,H]  ->  [H,H,H,H,H,Z,H,H,H];
  [C,L,H,H,H,H,H,H]  ->  [H,H,H,H,H,Z,H,H,H];

[C,L,H,H,H,H,H,H]  ->  [H,H,H,H,H,Z,H,H,H];
  [C,L,H,H,L,L,H,H]  ->  [H,H,L,L,H,H,L,H,H];
  [C,L,H,H,L,L,H,H]  ->  [H,H,H,L,H,H,L,H,H];
  [C,L,H,H,L,L,H,H]  ->  [H,H,H,L,L,L,L,H,H];
  [C,L,H,H,H,H,H,H]  ->  [H,H,H,H,H,Z,H,H,H];
```

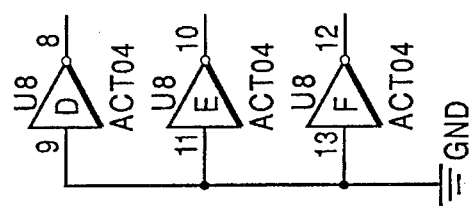
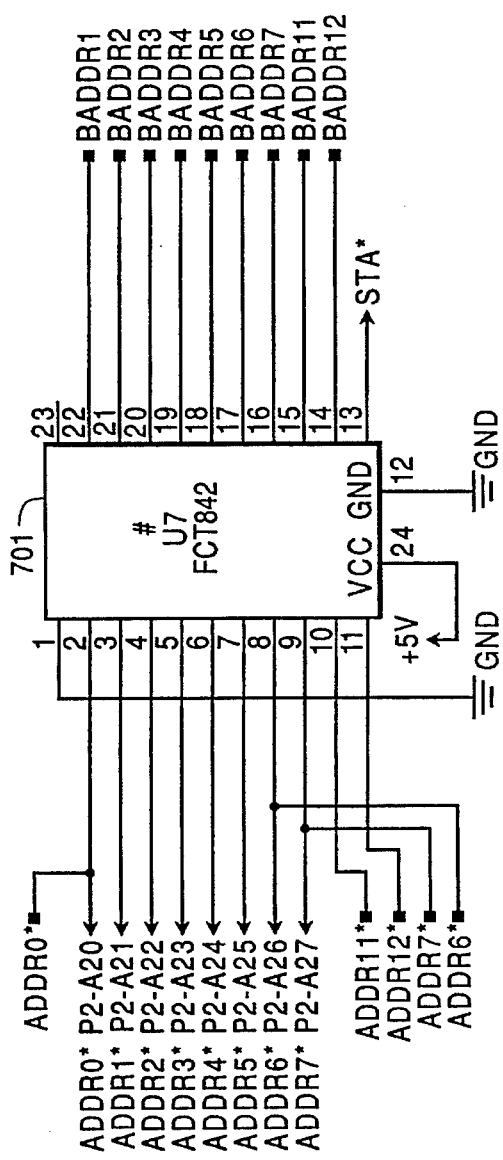
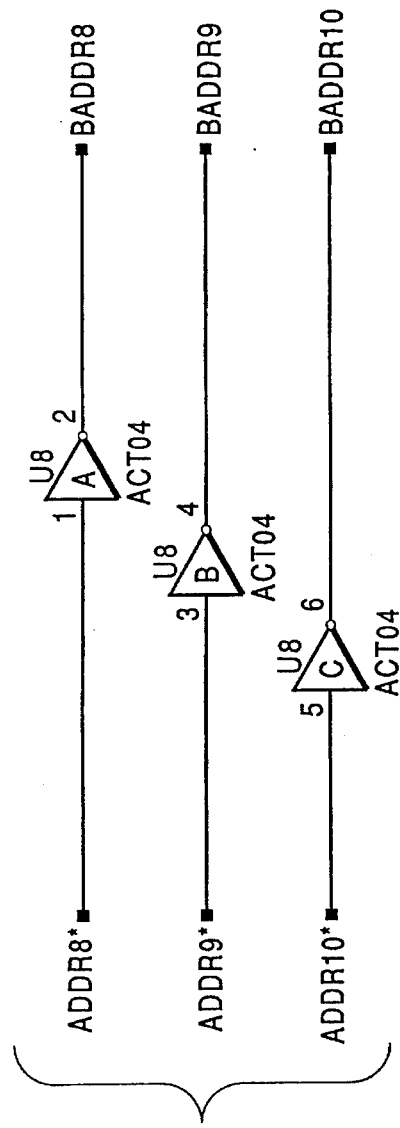
FIG. 7A
FIG. 7B
FIG. 7C

FIG. 16

|        |       |    |    |       |        |
|-------:|------:|:--:|:--:|:------|:-------|
| (PCLK) | BCLK  | 1  | 20 | VCC   |        |
| (P2RD) | RD    | 2  | 19 | BPRO  | (BDRD) |
| (P2WR) | WR    | 3  | 18 | BREQ  | (MBREQ)|
| (MUS)  | SRQ   | 4  | 17 | NU1   |        |
| (RESET)| RST   | 5  | 16 | AEN   |        |
| (PBEN) | BPRN  | 6  | 15 | HRQ   |        |
|        | P2INT | 7  | 14 | SYNC  |        |
| (LLOCK)| LOCK  | 8  | 13 | BSY   | (BUSY) |
|        | INTA  | 9  | 12 | CBRQ  |        |
|        | GND   | 10 | 11 | OE    |        |

FIG. 17

```
20 PIN DIP
MULTIBUS I ARBITER

BCLK,RD,WR,SRQ,RST,BPRN,P2INT,LOCK,INTA    PIN 1,2,3,4,5,6,7,8,9;
OE,CBRQ,BSY,SYNC,HRQ,AEN,NU1,BREQ,BPRO     PIN 11,12,13,14,15,16,17,18,19;
GND,VCC                                     PIN 10,20;

equations

!BPRO = HRQ & !BPRN;

!BREQ = !HRQ & !AEN;                      "Request (or retain)Bus for:

!AEN := (!RST & !AEN & !HRQ & !P2INT)     " 1). Hold bus for INTA cyc
          # (!RST & !AEN & !HRQ & !RD)        " 2). Hold bus for RD cycle
          # (!RST & !AEN & !HRQ & !WR )       " 3). Hold bus for WR cycle
          # (!RST & !HRQ & !BPRN & BSY)       " 4). Initial acquisition
          # (!RST & !AEN & !BPRN & CBRQ)      " 5). Hold if no req's
          # (!RST & !AEN & !LOCK);            " 6). Dont give if locked

!HRQ :=   !RST & !SYNC;

!SYNC :=  !RST & !SRQ & !RD
          #   !RST & !SRQ & !WR
          #   !RST & !P2INT;                  "Grab bus if P2 bus int.

!BSY = !AEN;

BSY.OE = !AEN;

!CBRQ = AEN & !HRQ;

CBRQ.OE = !CBRQ;

TEST_VECTORS
([BCLK,SRQ,RD,WR,BPRN,LOCK,INTA,RST,BSY,CBRQ,P2INT]->[SYNC,HRQ,AEN,BSY,BREQ])
 [.C. , H ,H ,H , L , H , H , H , H , H , H ]->[ H , H , H , Z , H ];
 [.C. , H ,H ,H , L , H , H , L , H , H , H ]->[ H , H , H , Z , H ];
 [.C. , L ,H ,H , L , H , H , L , H , H , H ]->[ H , H , H , Z , H ];
 [.C. , L ,L ,H , L , H , H , L , H , H , H ]->[ L , H , H , Z , H ];
 [.C. , L ,L ,H , L , H , H , L , H , H , H ]->[ L , L , H , Z , H ];
 [.C. , L ,L ,H , L , H , H , L , H , H , H ]->[ L , L , L , L , L ];
 [.C. , L ,L ,H , L , H , H , L , H , H , H ]->[ L , L , L , L , L ];
 [.C. , H ,H ,H , L , H , H , L , H , H , H ]->[ H , L , L , L , L ];
 [.C. , L ,H ,H , L , H , H , L , H , H , H ]->[ H , H , L , L , H ];
 [.C. , L ,H ,L , L , H , H , L , H , H , H ]->[ L , H , L , L , H ];
 [.C. , L ,H ,L , L , H , H , L , H , H , H ]->[ L , L , L , L , L ];
 [.C. , H ,H ,L , L , H , H , L , H , H , H ]->[ H , L , L , L , L ];
 [.C. , L ,H ,H , L , H , H , L , H , H , H ]->[ H , H , L , L , H ];
 [.C. , H ,H ,H , L , H , H , L , H , H , H ]->[ H , H , L , L , H ];
 [.C. , H ,H ,H , L , H , L , L , H , H , L ]->[ L , H , L , L , H ];
```

FIG. 18

```
24 PIN DIP
MULTIBUS I CONTROL PAL FOR 386 CPU BOARD

CLK,RDY386,P2INT,INT07,MBCS,AEN      PIN 1,2,3,4,5,6;
    DC,ADS,WR,XACK,MIO                   PIN 7,8,9,10,11;
    OEN,RDY380,S5,S4,INTA                PIN 13,14,15,16,17;
    S3,S2,S1,S0,MBRDY,RESET              PIN 18,19,20,21,22,23;
    GND,VCC                              PIN 12,24;

INTA,S0,S1,S2,S3,S4,S5               ISTYPE 'NEG,REG,';

SREG =                               [S5,S4,S3,S2,S1,S0];
    A=^b111111 ; B=^b110011 ; C=^b111010 ; D=^b111001 ;
    E=^b111011 ; F=^b010011 ; G=^b001011 ; I=^B011011 ;
    U=^b010111 ; M=^b101111 ; N=^b100111 ; O=^b110111 ;
    Q=^b011111;
                "S0 is the P2 read pulse strobe
                "S1 is the P2 write pulse strobe
equations !INTA =    !S5 & S4 & S3 & !S2 & S1 & S0     "I"
            #  !S5 & S4 & !S3 & !S2 & S1 & S0;   "F"

!MBRDY =    S5 & S4 & S3 & !S2 & S1 & S0 ;   "E"
```

FIG. 19

```
STATE A:
    IF (!ADS & !RESET) THEN M; "If P2 bus cycle or"
    ELSE IF (!ADS & !MIO & !DC & !WR & !P2INT & !RESET) "inta"
     THEN B;
    ELSE A;

STATE B: "must send read or write stobe to arb"
    IF (ADS &  WR & !MBCS & DC & !RESET) THEN D;  "P2 wr cycle
    ELSE IF (ADS &  !WR & !MBCS & DC & !RESET) THEN C; "P2 rd cycle
    ELSE IF (!MIO & !DC & !WR & !P2INT & !AEN & !RESET) THEN F;
    ELSE IF RESET THEN A;  " during interrupt aen should be low "
    ELSE A;

STATE M: GOTO N ; " this delay state is to correct for ads delay in "
                 " i/o space it will wait three cycles and check for "
                 " a multibus select if select is present rd or wr "
                 " strobes will be generated"
STATE N: GOTO O ;

STATE O: GOTO B ;

STATE U: GOTO G ;    " state G will generate a ready for end"
                        " of first inta this state change is required"
                        " because 80380 drives the cas before 380"
                        " ready goes low in first inta "
   STATE F:
        IF !RDY380 & !RESET THEN U; "this signal will indicate"
          ELSE IF RESET THEN A;     "the end of the first inta"
        ELSE F;                     " cycle (state f)"

STATE D:
    IF !XACK & !RESET THEN E;       "P2 write cycle end"
    ELSE IF RESET THEN A;
    ELSE D;

STATE G:                  "the 80386 will drive the ads signal low to"
                          " start the next or second inta cycle"
    IF !ADS & !RESET THEN I;
     ELSE IF RESET THEN A;
     ELSE G;

STATE I:                                         "2nd inta asserted"
    IF !INT07 & !RDY380 & !XACK & !RESET THEN E; " if int07 is low "
      ELSE IF INT07 & !RDY380 & !RESET THEN Q ;   "then this is an "
      ELSE IF RESET THEN A;    " off board interrupt  if local int"
      ELSE I;                  " then local ready generator will "
                               " drive ready"

STATE Q: GOTO A;

STATE C:                        "P2 read cycle"
    IF !XACK & !RESET THEN E;
    ELSE IF RESET THEN A;
    ELSE C;

STATE E: IF (RDY386 & !RESET) THEN E    "WAIT FOR ACK "
    IF (!RDY386 & !RESET) THEN A
    ELSE A;
```

FIG. 20A

```
24 PIN DIP
MULTIBUS I SIGNAL GENERATOR PAL FOR 386 CPU BOARD

CLK,MIO,INTO7,S0,S1,AEN          PIN 1,2,3,4,5,6;
   S2,S3,S4,S5,NU1                  PIN 7,8,9,10,11;
   OE,IOWC,IORC,MWTC,NU2,DATAIN     PIN 13,14,15,16,17,18;
   IOUT,ADEN,DATEN,ILATCH,MRDC      PIN 22,20,21,19,23;
   GND,VCC                          PIN 12,24;

STAT =                           [S5,S4,S3,S2,S1,S0];
        "A = idle state              B = intermediate state
        "C = P2 read cycle           D = P2 write cycle
        "E = cleanup cycle           F = 1st INTA cycle
        "G = between 1st & 2nd INTA  I = 2nd INTA cycle
        "U = wait state in 1st INTA  V = wait state in 1st INTA
        "W = wait state in 1st INTA  Y = wait state in 1st INTA A=^b111111 ; B=^b110011 ; C=^b111010 ; D=^b111001 ;
      E=^b111011 ; F=^b010011 ; G=^b001011 ; I=^B011011 ;
      U=^b010111 ; V=^b101111 ; N=^b100111 ; O=^b110111 ;

"S0 is the P2 read pulse strobe
            "S1 is the P2 write pulse strobe
equations !DATEN: = (STAT==C)
          # (STAT==D)
          # (!INTO7 & (STAT==I))
          # (!DATEN & (STAT==E));

!IORC: = (STAT==C) & !MIO  "IO read cycle"
          # (STAT==E) & !MIO & !IORC;

!IOWC  = (STAT==D) & !MIO; "IO write cycle"

!MRDC: = (STAT==C) & MIO  "memory read cycle"
          # (STAT==E) & MIO & !MRDC;

!MWTC = (STAT==D) & MIO; "memory write cycle"

!IOUT = (STAT==U)
         # (STAT==G)
         # (STAT==I);

!ILATCH = !(STAT==F);

!ADEN = (!AEN & IOUT & !((STAT==F)
         # (STAT==G)
         # (STAT==I));

!DATAIN: = (STAT==C)
            # ((STAT==G) & !INTO7)
            # ((STAT==I) & !INTO7)
            # ((STAT==E) & !DATAIN);
```

FIG. 20B

```
TEST_VECTORS
([MIO,INTO7,AEN,STAT]->[IORC,IOWC,MRDC,MWTC,DATAIN,IOUT,ADEN,DATEN,ILATCH])
  M  I  A  S           I  I  M  M  D  I  A  D  I
  I  N  E  T           O  O  R  W  A  O  D  A  L
  O  T  N  A           R  W  D  T  T  U  E  T  A
     0     T           C  C  C  C  A  T  N  E  T
     7                             I     N     C
                                   N           H
[ X, X, X, A] -> [ H, H, H, H, H, H, X, H, H];
[ X, X, X, A] -> [ H, H, H, H, H, H, X, H, H];
[ X, X, L, A] -> [ H, H, H, H, H, H, L, H, H];   "P2 read cycle
[ L, X, L, B] -> [ H, H, H, H, H, H, L, H, H];
[ L, X, L, C] -> [ L, H, H, H, L, H, L, L, H];
[ L, X, L, C] -> [ L, H, H, H, L, H, L, L, H];
[ L, X, L, E] -> [ H, H, H, H, H, H, L, H, H];
[ L, X, L, A] -> [ H, H, H, H, H, H, L, H, H];
[ X, X, L, A] -> [ H, H, H, H, H, H, L, H, H];   "P2 write cycle
[ H, X, L, B] -> [ H, H, H, H, H, H, L, H, H];
[ H, X, L, D] -> [ H, H, H, L, H, H, L, L, H];
[ H, X, L, D] -> [ H, H, H, L, H, H, L, L, H];
[ H, X, L, E] -> [ H, H, H, H, H, H, L, L, H];
[ H, X, L, A] -> [ H, H, H, H, H, H, L, H, H];

[ X, X, L, A] -> [ H, H, H, H, H, H, L, H, H];   "interrupt ack. cycle
[ L, X, L, B] -> [ H, H, H, H, H, H, L, H, H];
[ L, X, L, F] -> [ H, H, H, H, L, H, H, H, L];
[ L, X, L, F] -> [ H, H, H, H, L, H, H, H, L];
[ L, X, L, F] -> [ H, H, H, H, L, H, H, H, L];
[ L, X, L, F] -> [ H, H, H, H, L, H, H, H, L];
[ L, X, L, F] -> [ H, H, H, H, L, H, H, H, L];
[ L, X, L, F] -> [ H, H, H, H, L, H, H, H, L];
[ L, X, L, F] -> [ H, H, H, H, L, H, H, H, L];
[ L, X, L, F] -> [ H, H, H, H, L, H, H, H, L];
[ L, X, L, F] -> [ H, H, H, H, L, H, H, H, L];
[ L, L, L, G] -> [ H, H, H, H, L, L, H, H, H];   "cascade addr. latched here
[ L, L, L, G] -> [ H, H, H, H, L, L, H, H, H];   "software must drive data
                                                 " bit low from the 82380"
```

FIG. 20C

```
TEST_VECTORS
([MIO,INTO7,AEN,STAT]->[IORC,IOWC,MRDC,MWTC,DATAIN,IOUT,ADEN,DATEN,ILATCH])
  M  I  A  S        I  I  M  M  D  I  A  D  I
  I  N  E  T        O  O  R  W  A  O  D  A  L
  O  T  N  A        R  W  D  T  T  U  E  T  A
     0     T        C  C  C  C  A  T  N  E  T
     7                          I     N     C
                                N           H
[ X, L, L, G] -> [ H, H, H, H, L, L, H, H, H];    "4 idle states
[ X, L, L, G] -> [ H, H, H, H, L, L, H, H, H];
[ X, L, L, G] -> [ H, H, H, H, L, L ,H, H, H];
[ X, L, L, G] -> [ H, H, H, H, L, L, H, H, H];
[ X, L, L, G] -> [ H, H, H, H, L, L, H, H, H];
[ X, L, L, G] -> [ H, H, H, H, L, L, H, H, H];
[ X, L, L, G] -> [ H, H, H, H, L, L, H, H, H];
[ X, L, L, G] -> [ H, H, H, H, L, L, H, H, H];
[ L, L, L, I] -> [ H, H, H, H, L, L, H, L, H];    "2nd inta cycle
[ L, L, L, I] -> [ H, H, H, H, L, L, H, L, H];
[ L, L, L, I] -> [ H, H, H, H, L, L, H, L, H];
[ L, L, L, I] -> [ H, H, H, H, L, L, H, L, H];

```
24 PINS DIP
80386 A0 & A1 GENERATOR PLD.

CLK2C,RES386,CSMBM,INTAA,LOCKK,NC,WR,BE3,BE2,BE1,BE0,CSMBIO,GND
       pin  1,2,3,4,5,6,7,8,9,10,11,14,13;

BHEN,ONC,INIT,LOCK,INTA,CSMBMO,A0,A1
       pin  15,16,17,18,19,20,21,22;

INIT,BHEN,CSMBMO,A0,A1 ISTYPE 'POS,COM';

LOCK,INTA ISTYPE 'NEG,COM' ;

equations

A0 =  !BE1 & BE0
       #  BE2 & BE0 ;   "capture A0 "

A1 =   BE1 & BE0; "capture A1 "

CSMBMO = CSMBM  & CSMBIO ; "address is vaild for the p2 bus window"

BHEN = BE3 & BE2 & BE1 & !BE0
        # BE3 & !BE2 & BE1 & BE0 ; "capture bhen signal"

!INTA =  !INTAA ;

!LOCK =  !LOCKK ;

INIT =  !RES386 ;

test_vectors ([RES386,CSMBM,INTAA,LOCKK,BE3,BE2,BE1,BE0,CSMBIO]
 ->[INIT,LOCK,CSMBMO,BHEN,A0,A1,INTA])
     R
     E C                   C
     S S I L         S     I L S B     I
     3 M N O B B B B I     N O M H     N
     8 B T C E E E E B     I C B E A A T
     6 1 A K 3 2 1 0 1     T K M N 0 1 A
    [L,H,H,H,H,H,H,H,H]->[H,H,H,X,X,X,H];  "NONE"
    [L,H,H,L,H,L,H,H,H]->[H,L,H,H,L,H,H];  "A1"
    [L,H,H,H,H,H,L,H,H]->[H,H,H,L,H,L,H];  "A0"
    [L,H,H,H,H,H,H,L,H]->[H,H,H,H,L,L,H];  "BHEN"
    [H,H,H,H,X,X,X,X,H]->[L,H,H,X,X,X,H];  "INIT"
    [L,H,H,H,L,L,H,H,H]->[H,H,H,L,L,H,H];  "A0"
    [L,H,H,H,H,H,L,H,L]->[H,H,L,L,H,L,H];  "CSMBM"
    [H,L,H,H,L,L,L,H,H]->[L,H,L,L,H,L,H];  "CSMBM"
    [L,H,H,H,H,H,H,H,H]->[H,H,H,X,X,X,H];  "A1"
    [X,X,L,X,X,X,X,X,X]->[X,X,X,X,X,X,L];  "NONE"
```

*FIG. 23B*

```
20 PINS DIP
INIT GENERATOR CONTROL PLD.

GND,AEN,INT7,INT6,INT5,INT4,INT0,INT1,INT2,INT3
       pin  1,2,3,4,5,6,7,8,9,11 ;

P2INT,IRQ12,IRQ13,IRQ14,IRQ20,IRQ21,IRQ22,IRQ23
       pin  19,18,17,16,15,14,13,12;

equations

!IRQ23 = (!AEN &  !INT7);

!IRQ22 = (!AEN &  !INT6);

!IRQ21 = (!AEN &  !INT5);

!IRQ20 = (!AEN &  !INT4);

!IRQ14 = (!AEN &  !INT3);

!IRQ13 = (!AEN &  !INT2);

!IRQ12 = (!AEN &  !INT1);

!P2INT = (!INT7 # !INT6 # !INT5 # !INT4 # !INT3 # !INT2 # !INT1);
```

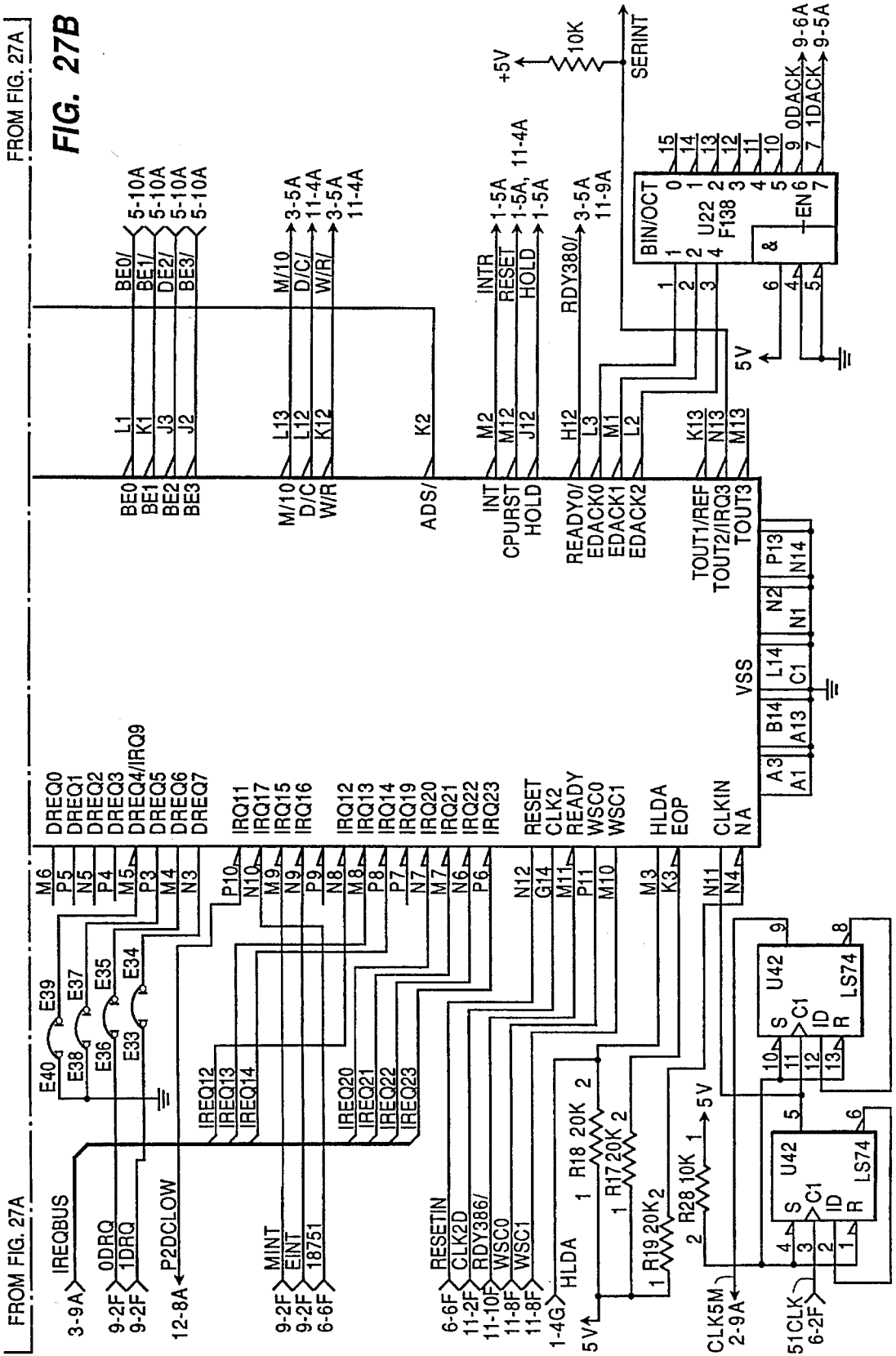

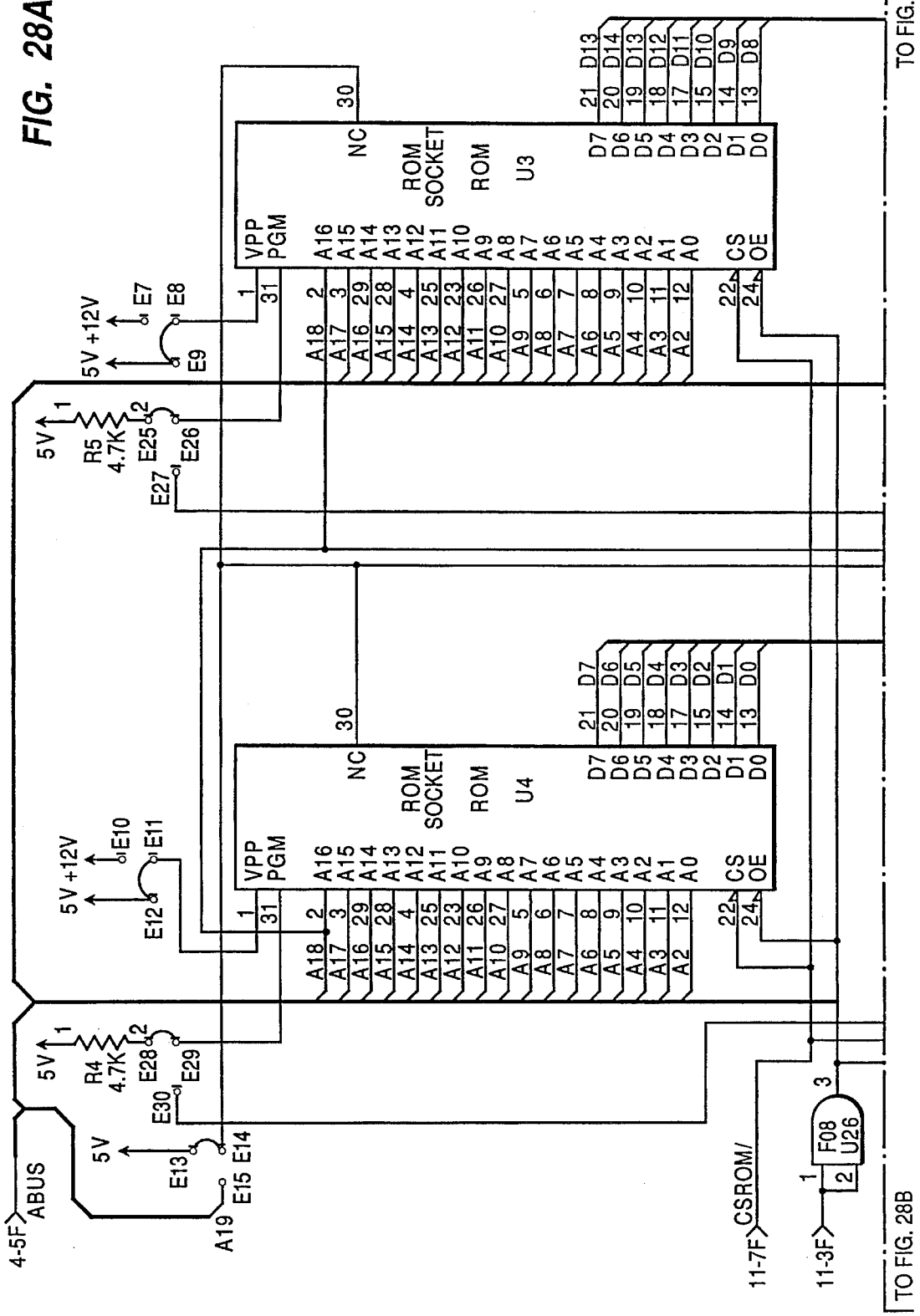

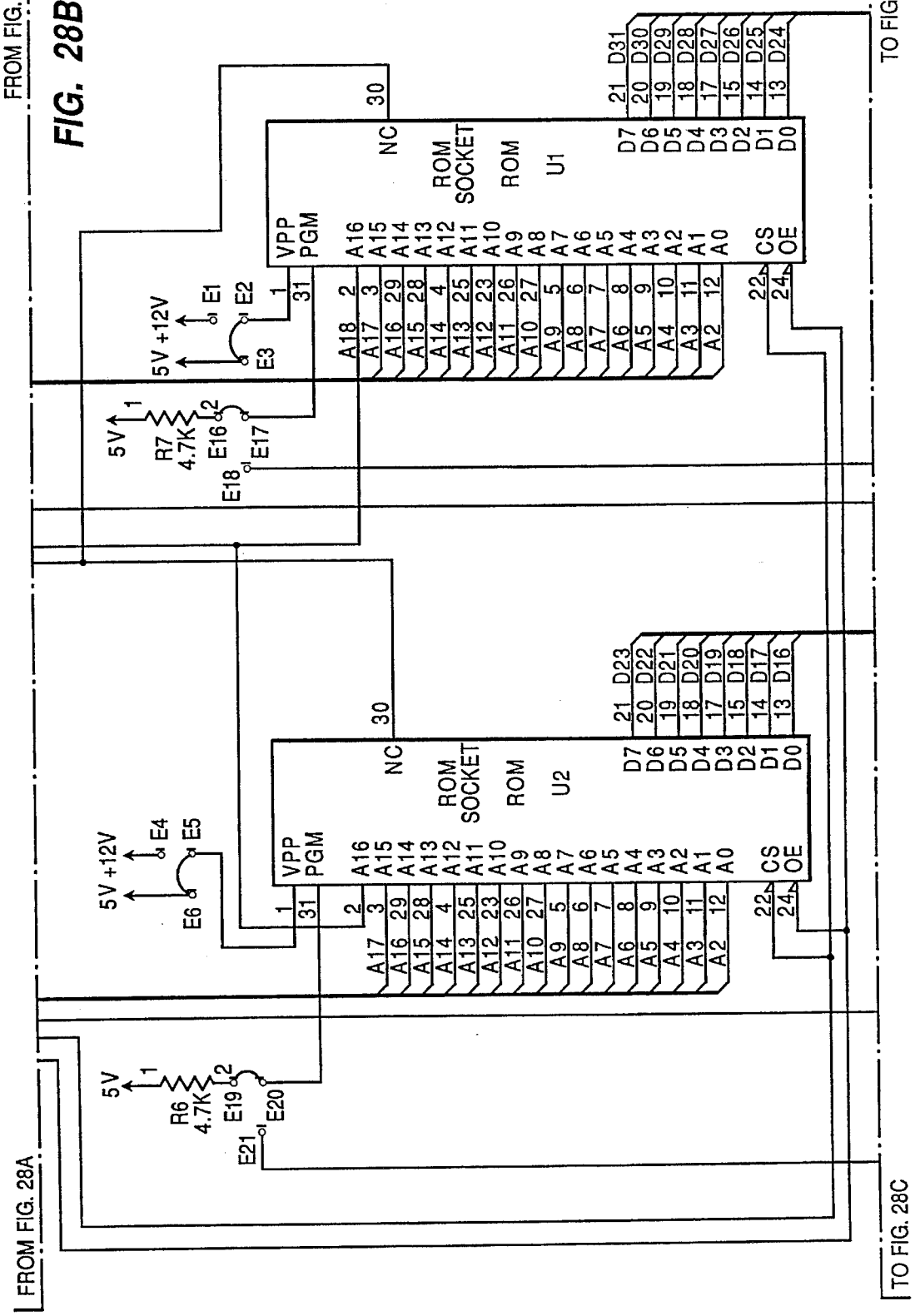

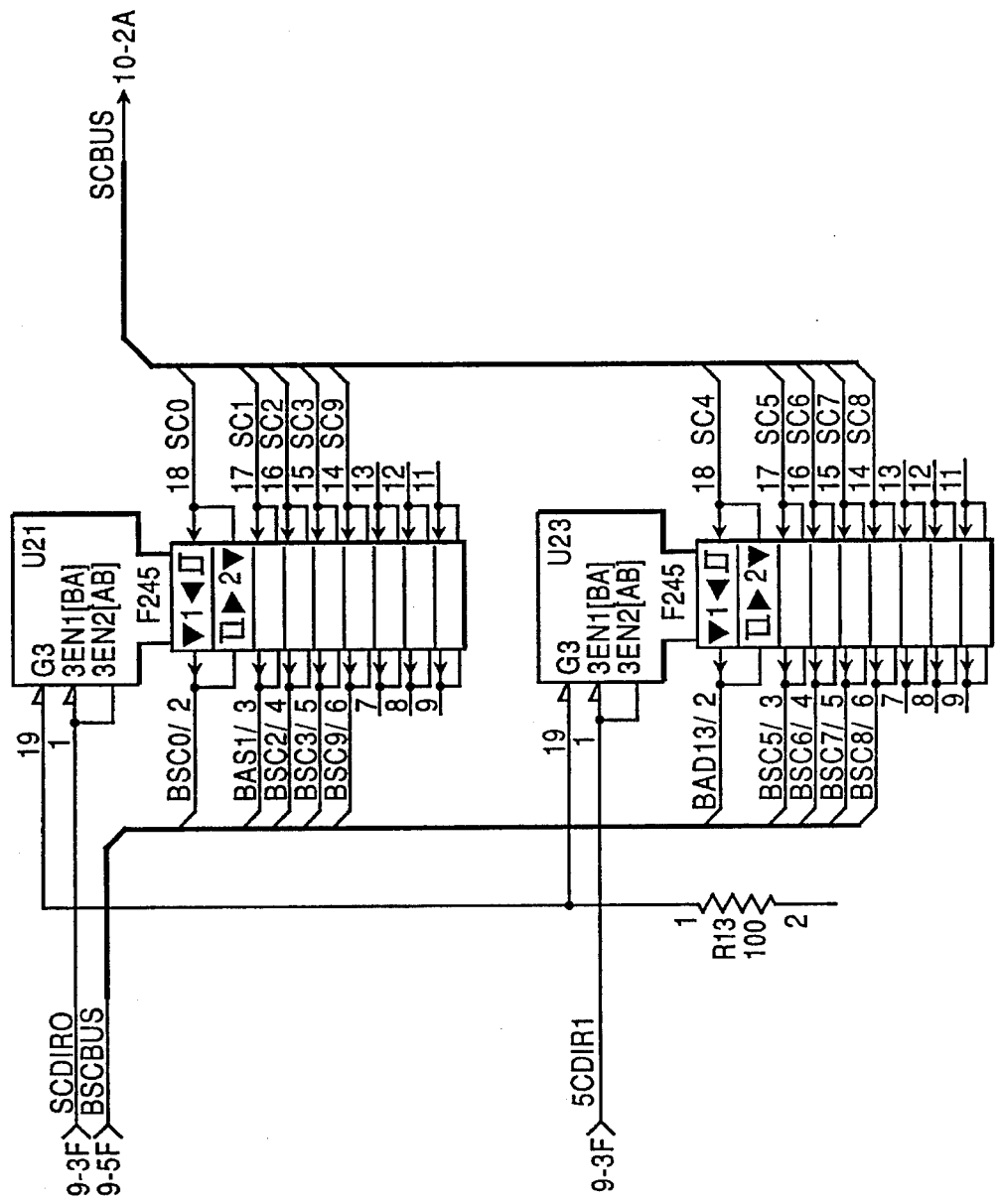

FIG. 37B

```
20 PINS DIP
80386 CPU MPC POWER PLD

BCLK      pin 1;
    PSBRST    pin 2;        "input combinatorial"
    DCLOW     pin 3;        "input combinatorial"
    WDT       pin 4;        "input combinatorial"
    LOWDC     pin 5;        "input combinatorial"
    RESET1    pin 6;        "input combinatorial"
    REDLED    pin 7;        "input combinatorial"
    PBRST     pin 8;        "input combinatorial"
    RESET2    pin 9;        "input combinatorial"
    !OE       pin 11;
    NMI       pin 12;       "active low"
    RESETIN   pin 13;       "active low"
    !WARMRST  pin 14;       "active low registered"
    !COLDST   pin 15;       "active low registered"
    RST51     pin 16;       "active low registered"
    UNINT     pin 17;       "active low registered"
    !RED      pin 18;       "active low"
    !YEL      pin 19;       "active low"

equations

NMI    =   DCLOW # !LOWDC ;

UNINT  =   WDT & !NMI & PBRST & WARMRST ;

COLDST =   PSBRST & !DCLOW
        #   PSBRST &  COLDST ;

RST51  =   PSBRST &  DCLOW ;

RESETIN =  PSBRST # !RESET2 # RESET1 # !PBRST ;

YEL    =   REDLED ;

RED    =   COLDST ;

WARMRST =  !PBRST ;
```

*FIG. 38B*

```
20 PINS DIP
80386 READY GENERATOR CONTROL PLD.

A31,A30,A29,A19,A18,A17,A21,A20,HOL,MIO
        pin  1,2,3,4,5,6,7,8,9,11 ;

CSROM,CSRAM,EN245,CSMBM,ONC2,ONC3,WSC0,WSC1
        pin  19,18,14,16,15,17,12,13;

equations

!CSROM = A31 & A30 & A29 & MIO; "address FFFFFFFF to FFFE0000"

!CSRAM = !A31 & !A30 & !A29 & MIO; "address 00000000 to 1FFFFFFF
             read write data"

!CSMBM = !A31 & !A30 & A29 & MIO ; "address 20000 to 2FFFF
             P2 bus window for I/O"

!WSC0 = !A31 & !A30 & !A29 & MIO; "wait state reg one in 82380
             ram wait state"

EN245= HOL # !MIO & A31;   "note because of bus contention added
             this enable"

!WSC1 =  A31 & A30 & A29 & MIO; "wait state reg two in 82380
             rom wait state"
```

FIG. 39B

```
20 PINS DIP
80386 READY GENERATOR CONTROL PLD.

A15,A14,A13,A12,A11,A10,A9,A8,A5,MIO,A4
        pin  1,2,3,4,5,6,7,8,9,11,15 ;

SSCS,REGSEL,CSMBIO,LATCH,WSC0,WSC1,MPCIC
        pin 12,13,14,16,17,18,19;
equations !MPCIC = !A15 & !A14 & !A13 & !A12 & !A11 & !A10
        & A9 & !A8 & A5 & A4 & !MIO ; "address 230 to 23f"

!REGSEL = !A15 & !A14 & !A13 & !A12 & !A11 & !A10
        & A9 & !A8 & !MIO ; "address 200 to 2ff"

!CSMBIO = A15 & !MIO ; "address 8000 to 8fff"

!LATCH = !A15 & !A14 & !A13 & !A12 & !A11 & !A10
        & A9 & A8  & !MIO ; "address 300 to 3ff"

!SSCS = !A15 & !A14 & !A13 & !A12 & !A11 & A10
        & !A9 & !A8 & !MIO; "address 400 to 4ff"

WSC0.OE = !MIO ;

!WSC0 =  !A15 & !A14 & !A13 & !A12 & !A11 & A10
        & !A9 & !A8 & !MIO; "wait state reg one in 82380"

WSC1.OE = !MIO ;

!WSC1 = !A15 & !A14 & !A13 & !A12 & !A11 & !A10
        & A9 & A8  & !MIO ; "wait state reg two in 82380"

test_vectors ([A15,A14,A13,A12,A11,A10,A9,A8,A5,MIO,A4]->[WSC0,SC1,SSCS,
LATCH,MPCIC,REGSEL,CSMBIO])
                                  R C
                              L M E S
                           W W S A P G M
    A A A A A A       M    S S T C S B
    1 1 1 1 1 1 A A A I A  C C C I E I
    5 4 3 2 1 0 9 8 5 0 4  0 1 S H C L O
    [L,L,L,L,L,L,H,L,H,L,H]->[H,H,H,H,L,L,H]; "MPCIC"
    [L,L,L,L,L,H,L,X,L,X]->[H,H,H,H,H,L,H]; "REGSEL"
    [H,X,X,X,X,X,X,X,X,L,X]->[H,H,H,H,H,H,L]; "CSMBIO"
    [L,L,L,L,L,L,H,H,X,L,X]->[H,L,H,L,H,H,H]; "LATCH"
    [L,L,L,L,L,H,L,L,X,L,X]->[L,H,L,H,H,H,H]; "SSCS"
    [L,L,L,L,L,L,H,H,X,L,X]->[H,L,H,L,H,H,H]; "WSC1"
    [L,L,L,L,L,H,L,L,X,L,X]->[L,H,L,H,H,H,H]; "WSC0"
    [L,L,L,L,L,L,H,H,H,H,L]->[Z,Z,H,H,H,H,H];
    [H,L,L,H,L,L,H,H,H,H,L]->[Z,Z,H,H,H,H,H];
    [L,L,L,L,H,L,H,H,H,H,L]->[Z,Z,H,H,H,H,H];
```

FIG. 40B

```
20 PINS DIP
80386 CPUL READ WRITE TIMING GENERATOR CONTROL PLD.

CLK,GND1,RESET,ADS,RDY386,MIO,DC,WR,SSCS,GND3
         pin  1,2,3,4,5,6,7,8,9,11;

ONC2,ONC3,ONC4,DTR,SSWR,SSRD,BWR,BRD
         pin  12,13,14,15,16,17,18,19;

equations

!SSWR:=  !RESET & RDY386 & ONC4 & !SSWR & SSRD
         #  !RESET & !MIO & DC & WR & !SSCS & !ONC4 & SSWR & SSRD;

!SSRD:=  !RESET & RDY386 & ONC4 & SSWR & !SSRD
         #  !RESET & !MIO & DC & !WR & !SSCS & !ONC4 & SSWR & SSRD;

!ONC4:=  !RESET & RDY386 & !MIO & DC & !SSCS & ONC4 & SSWR
         & SSRD;

DTR := WR ;

!BRD :=  !RESET & !MIO & DC & !WR & !ADS & SSCS   " io read "
         #  !RESET & MIO & !DC & !WR & !ADS & SSCS   " code read "
         #  !RESET & MIO & DC & !WR & !ADS & SSCS    " data read "
         #  !BRD & !RESET & ADS & RDY386 ;           " hold until ready low"

!BWR :=  !RESET & !MIO & DC & WR & !ADS & SSCS   " io write "
         #  !RESET & MIO & DC & WR & !ADS & SSCS    " data write "
         #  !BWR & !RESET & ADS & RDY386 ;           " hold until ready low"
```

FIG. 41B

```
20 PINS DIP
80386 READY GENERATOR CONTROL PLD.

RDY387,RDY380,RDYSLOW,MBRDY,INT07
       pin   9,4,6,7,8;

RDY386 pin 18;
   MBRDYT pin 19;
   CLK pin 1;
   GND,VCC  pin 10,20;

equations

MBRDYT := MBRDY;
   !RDY386 = !RDY387
       # !RDY380 & INT07
       # !RDYSLOW
       # !MBRDYT;

test_vectors ([CLK,RDY387,RDY380,INT07,RDYSLOW,MBRDY]->
              [RDY386,MBRDYT])
    --INPUTS-;   ---OUTPUTS---
              R
     R R      D            R  M
     D D  I   Y  M         D  B
     Y Y  N   S  B         Y  R
   C 3 3  T   L  R         3  D
   L 8 8  0   O  D         8  Y
   K 7 0  7   W  Y         6  T
   [C,H,H,L,H,H]-> [H, H];
   [C,L,H,L,H,H]-> [L, H];   RDY387 CYCLE
   [C,H,L,L,H,H]-> [H, H];
   [C,H,L,H,H,H]-> [L, H];   RDY380 CYCLE
   [C,H,H,H,H,H]-> [H, H];
   [C,H,H,L,L,H]-> [L, H];   RDYSLOW CYCLE
   [C,H,H,L,H,L]-> [L, L];   MBUS READY
```

FIG. 42B

```
24 PINS DIP
80386 CPU MPC READY SYC CONTROL PLD.

CLK,NC1,NC2,NC3,REGSEL,MPCWT,NC4,MPCIC,T50,T100,NC5,RD,WR,
   TX100,TX50,NC6
       pin  1,2,3,4,5,6,7,8,9,10,11,13,14,16,17,22;

RDYEND,DELAY2,CYC,DELAY,ONE,RDYSLOW
       pin  15,18,19,20,21,23;

RDYEND,DELAY,CYC,DELAY2 ISTYPE 'NEG,COM';
   ONE,RDYSLOW ISTYPE 'NEG,REG' ;

equations

!DELAY =  !REGSEL & CYC & !RD & !MPCIC
         #  !REGSEL & CYC & !WR & !MPCIC;

!CYC  =   !REGSEL & !T100 & !MPCIC
         #  !CYC & !REGSEL & !RD & !MPCIC
         #  !CYC & !REGSEL & !WR & !MPCIC;

!DELAY2  = MPCWT & !CYC & TX100 ;

!ONE  :=  !REGSEL & MPCIC & !WR
         #   !REGSEL & MPCIC & !RD ;

!RDYSLOW :=   !REGSEL & MPCIC & !ONE
             #  !REGSEL & !RDYEND & !CYC ;

!RDYEND = !REGSEL & !TX50 & !RD & !MPCIC
          #  !REGSEL & !TX50 & !WR  & !MPCIC
          #  !REGSEL & !RDYEND & !WR & !MPCIC ;  "this releases ready"
```

– # PROPULSION CONTROL SYSTEM CENTAL PROCESSING UNIT BOARD

CROSS-REFERENCE TO RELATED APPLICATIONS

This application is a divisional of application Ser. No. 07/686,927, filed Apr. 18, 1991, now U.S. Pat. No. 5,377,356, granted Dec. 27, 1994, which was a continuation of application Ser. No. 07/584,933, filed Sep. 19, 1990, now abandoned.

BACKGROUND OF THE INVENTION

1. Field of the Invention

The invention relates to the field of propulsion control system central processing unit (CPU) boards, and more particularly, to bus interface controller design in a CPU board in an Intel 80386 based propulsion control system for use with subway cars or the like.

2. Background Information

A propulsion control system for an advanced design subway car requires high-speed data acquisition, an ability to communicate with a host computer, and an ability to communicate to control slave input/output (I/O) boards for controlling servo systems of the subway car. These varied requirements have caused compromises in communications bus design in the past, and thus limited overall system performance and efficiency.

There are known a variety of buses, bus interfaces, and bus controllers in various microprocessor systems. One known industrial bus standard is the IEEE 796, or Multibus I, and another is the IEEE 1296, or Multibus II. "Multibus" is a trademark of the Intel Corporation for its unified bus architecture, which uses a single integrated bus for data, address and control information. The Intel Multibus is used, for example, for connecting random access memory (RAM), read only memory (ROM) and input/output (I/O) boards in a microprocessor based system. The Multibus carries five types of signals, including data, address, control, multilevel interrupt and timing signals. Modules connected to the bus act as either masters or slaves, masters having the ability to control the bus. Arbitration logic is provided for on the bus to handle requests from multiple bus masters. Data rates on the bus are a factor of the master and slave devices data rates. The Intel bus is configured with two connectors, the primary (P1) and the secondary (P2) connectors. P1 signals include the address, data, control and interrupt signals, as well as the power supply. Most of the signals on the bus operate with negative logic, i.e., they are true when low.

The Multibus I and Multibus II busses are both usable with Intel IAPX 86 CPU based systems, for instance an 80386 CPU based system. Various Multibus I and Multibus II interfaces are known. A device attached to a Multibus I interface has the capability to operate as a bus master and share a bus with other masters that reside on the bus. A device on the Multibus I interface also has the capacity to generate and receive both vectored and nonvectored interrupts as well as read/write references to input/output (I/O) and memory space. Because of the bus protocol used on the Multibus I, and other factors, it is suitable for communication with relatively slow slave I/O boards and the like. The Multibus II, on the other hand, allows interprocessor communications via message passing, and is suitable for high-speed communications.

In typical Multibus I designs, latching of data transceivers is required. Also, the existing devices, for instance the Intel 8288 and 8289 bus controller and arbiter respectively, limit the achievable data throughput of the bus system. Improved performance and a marriage of Multibus I and II capabilities in an integrated system are desirable.

Therefore, a propulsion control CPU board which overcomes the above limitations and provides system design flexibility by having both Multibus I and II interfaces on a single 80386 CPU board is proposed.

SUMMARY OF THE INVENTION

According to the present invention, the above described drawbacks and limitations existent in the field are overcome by providing a propulsion system CPU board containing both the Multibus I and the Multibus II interfaces. Higher data throughput is achieved by implementing the Multibus I (IEEE 796) control in programmed logic design (PLD) technology, and by elimination of the need for latching data transceivers.

It is therefore an object of the present invention to provide a Multibus I master interface, which when combined with an asynchronous slave interface, eliminates the need for latching transceivers used in conventional Multibus I designs.

It is a further object of the present invention to provide higher data throughput than achievable using typical devices, such as the Intel 8288 and 8289, by designing bus control in programmed logic (PLD) technology.

According to one aspect of the invention, a CPU board is provided with both the Multibus I and Multibus II interfaces. The Multibus II interface allows interprocessor communications via message passing. The Multibus I interface acts as a master and shares a bus with other masters residing thereon. The Multibus I receives both vectored and nonvectored interrupts and reads/writes references to I/O and memory space.

According to another aspect of the invention, the Multibus I master interface is designed using PLD technology facilitating higher data throughput.

According to another aspect of the invention, a novel Multibus I master interface is coupled with a novel Multibus I asynchronous slave interface, so as to eliminate the need for latching data transceivers used in typical Multibus I designs.

According to another aspect of the invention, the slave bus interface timing is controlled within a single PLD state machine device, allowing wait states to be added if required by changing only the state machine PLD. This allows the slave interface design to be usable over a wide range of I/O boards without requiring timing information on components before design implementation of the slave board can begin.

According to another aspect of the invention, the propulsion control CPU board is designed within a 160mm by 233.4mm format, allowing use in high vibration environments, such as exist in subway cars, and meets the industrial temperature range of −40° C. to +85° C.

When the propulsion control system slave CPU board of the present invention is used as an invertor controller, it will generate pulse patterns for firing the gate turn on (GTO) devices in a subway car control application.

These and other objects and aspects of the invention are better understood with reference to the detailed description and accompanying drawings, and it will be understood that changes in the specific structure shown and described may be made within the scope of the claims without departing from the spirit of the invention.

BRIEF DESCRIPTION OF THE DRAWINGS

FIG. 4A is a table listing for the multibus slave interface control device of FIG. 4 according to an embodiment of the invention;

FIG. 4B is a table listing test vector inputs and outputs for the device of FIG. 4;

FIGS. 7A to 7F are a schematic diagram of part of a slave bus interface according to an embodiment of the invention;

FIG. 16 is a functional black box diagram of an embodiment of an arbiter Programmable Logic Device (PLD) (item 1101 in FIG. 11) according to an embodiment of the invention;

FIG. 17 is a table listing for the arbiter PLD of FIG. 16;

FIGS. 18 and 19 are table listings for the multibus control Programmable Logic Device (PLD) of FIGS. 2 and 3 (item 1102 in FIG. 11;

FIG. 20A is a table listing for the latch controller PLD of FIG. 20 (item 1103 of FIG. 11);

FIGS. 20B and 20C are table listings for the latch control PLD of FIG. 20;

FIG. 22 is the table listing for the decoder PLD of FIG. 21 (item 1103 in FIG. 11);

Figure 25A:
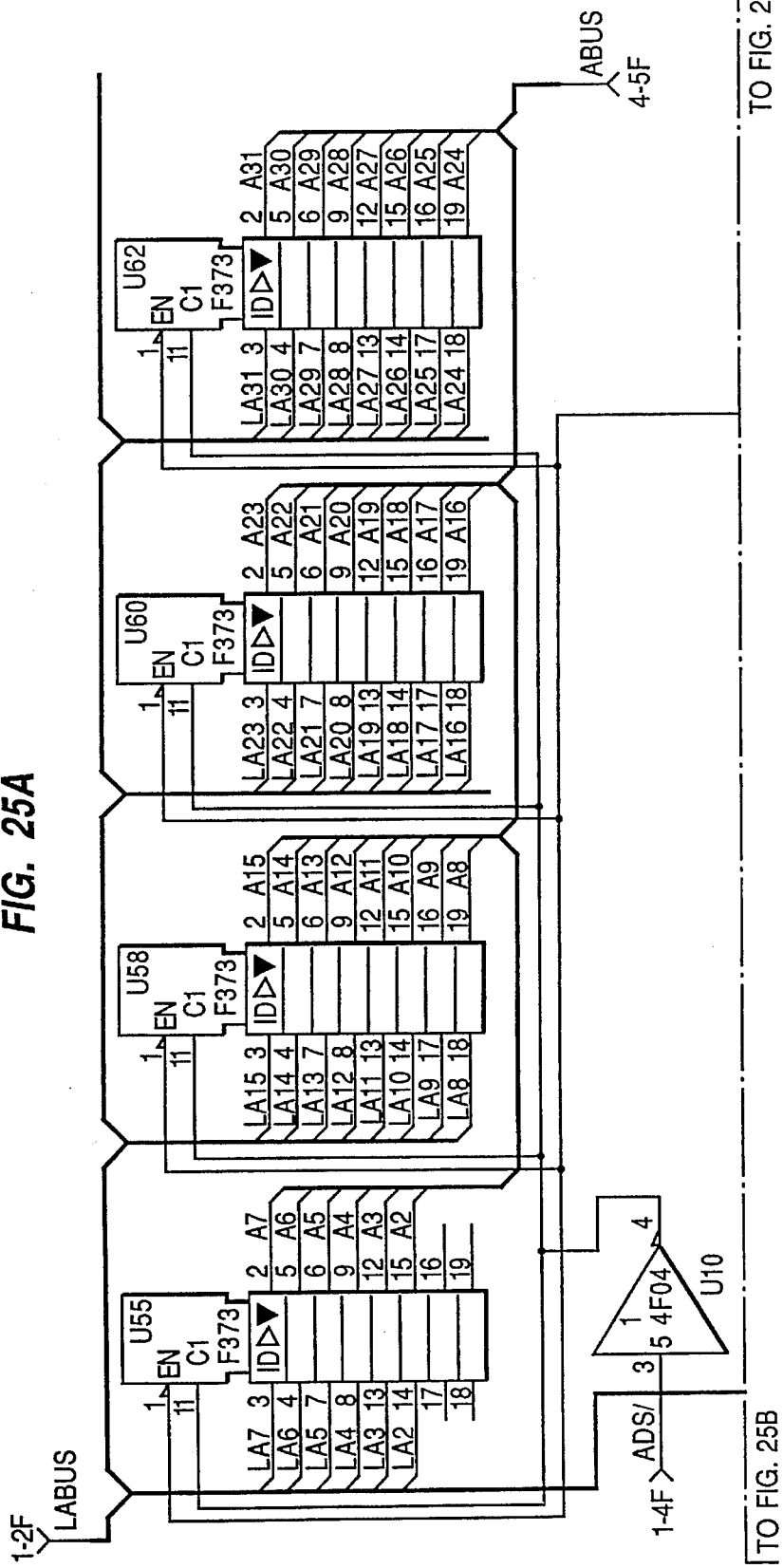
Figure 25B:
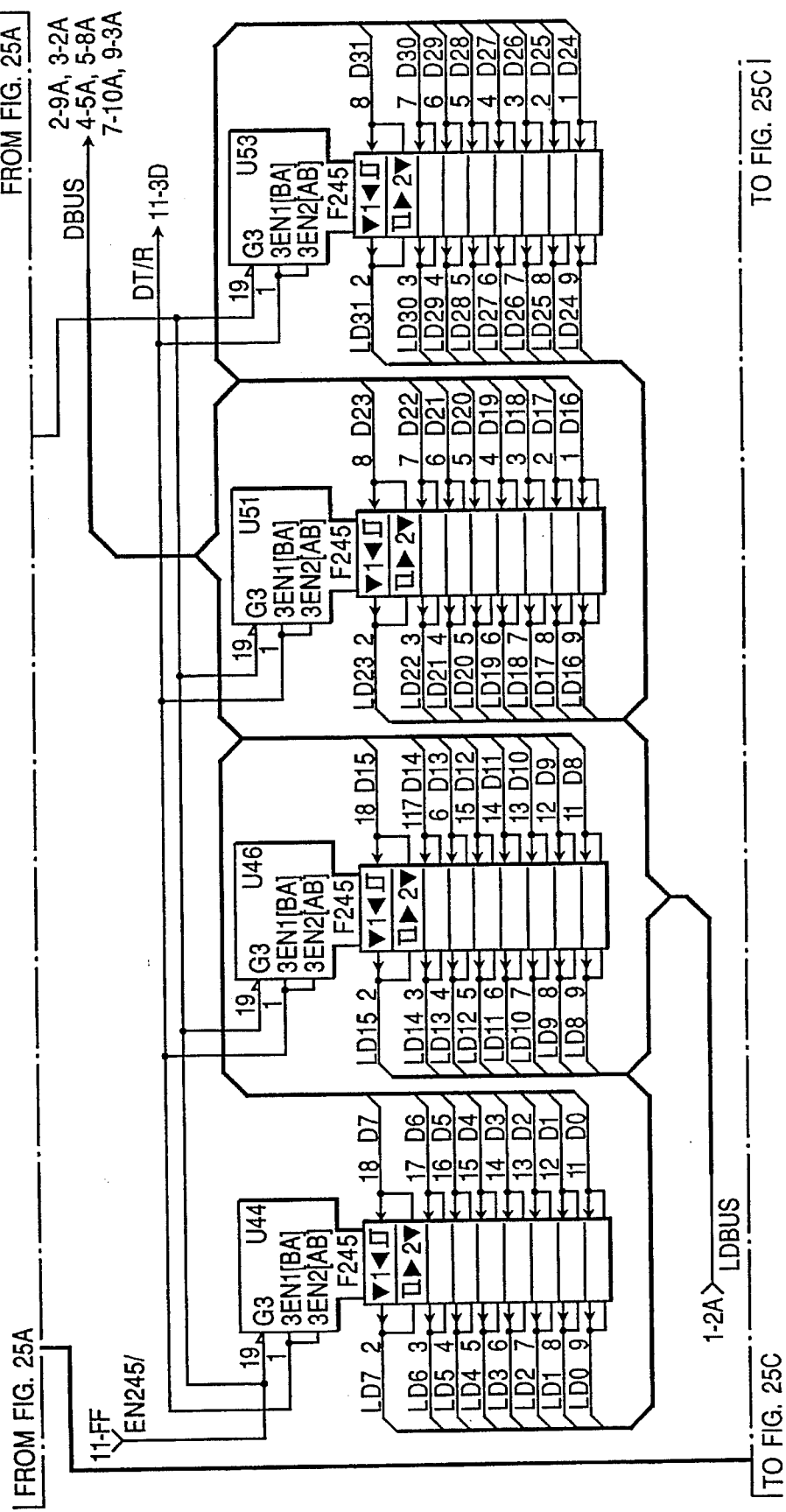
Figure 25C:
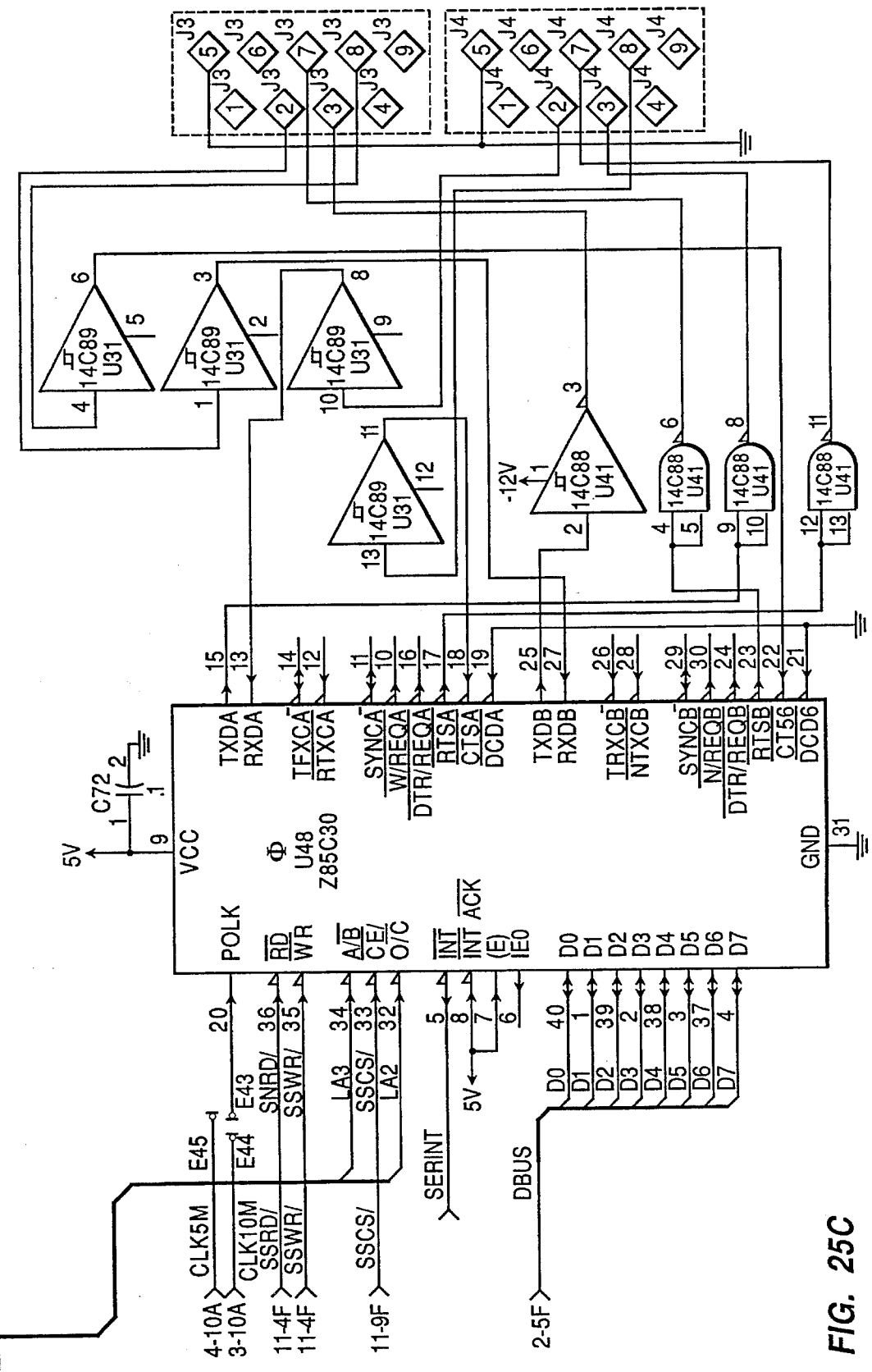
Figure 27A:
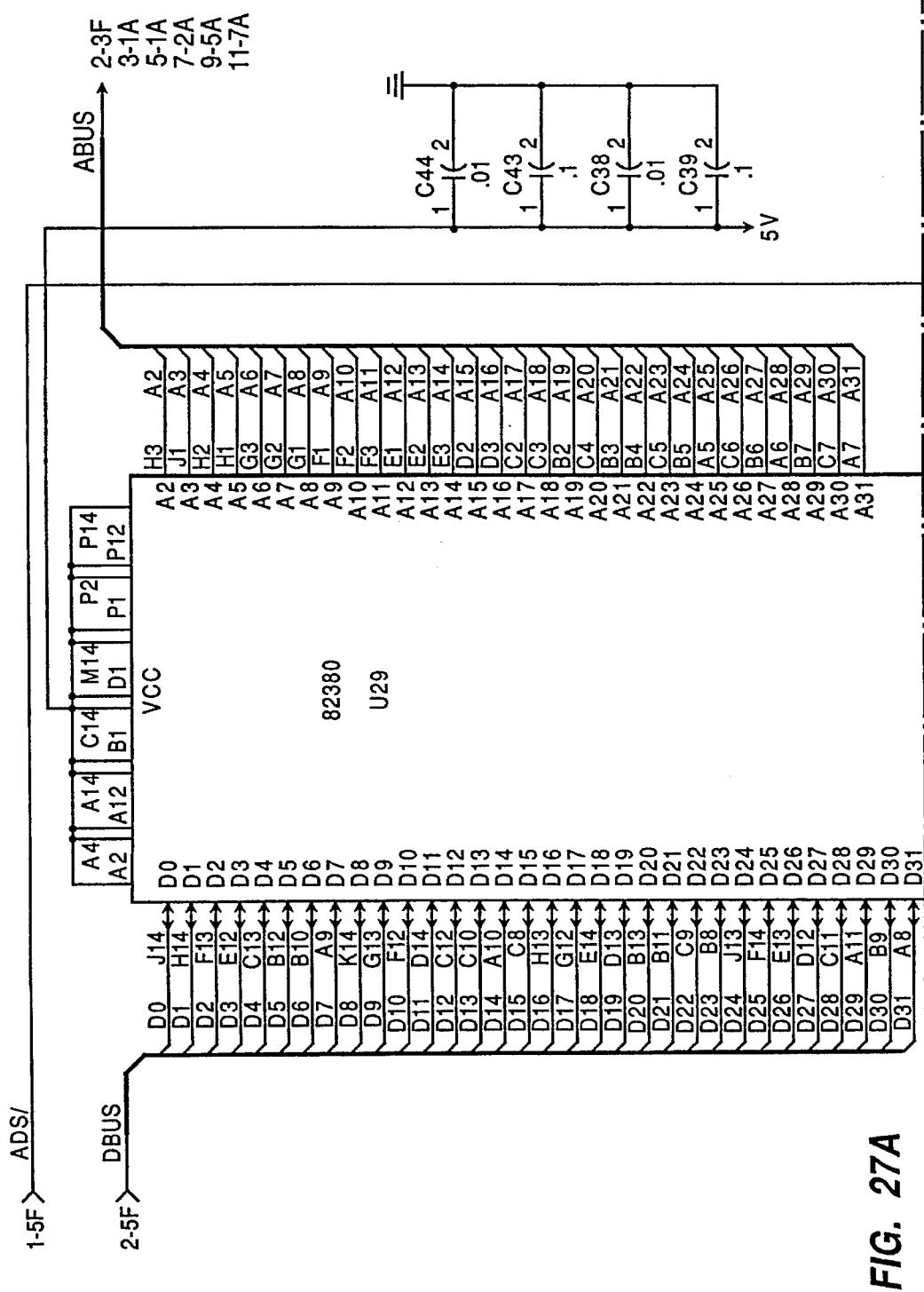
Figure 28C:
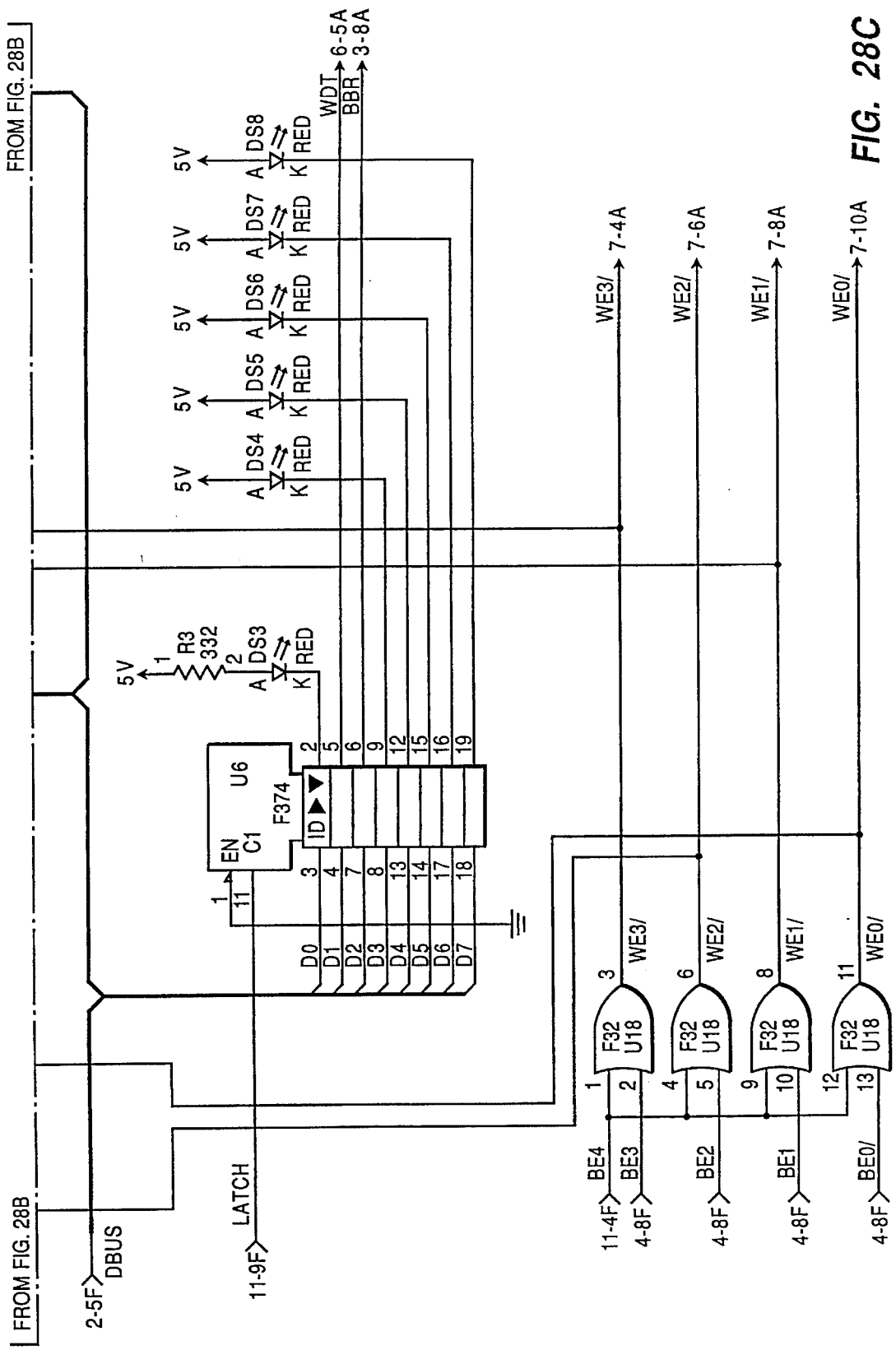
Figure 29A:
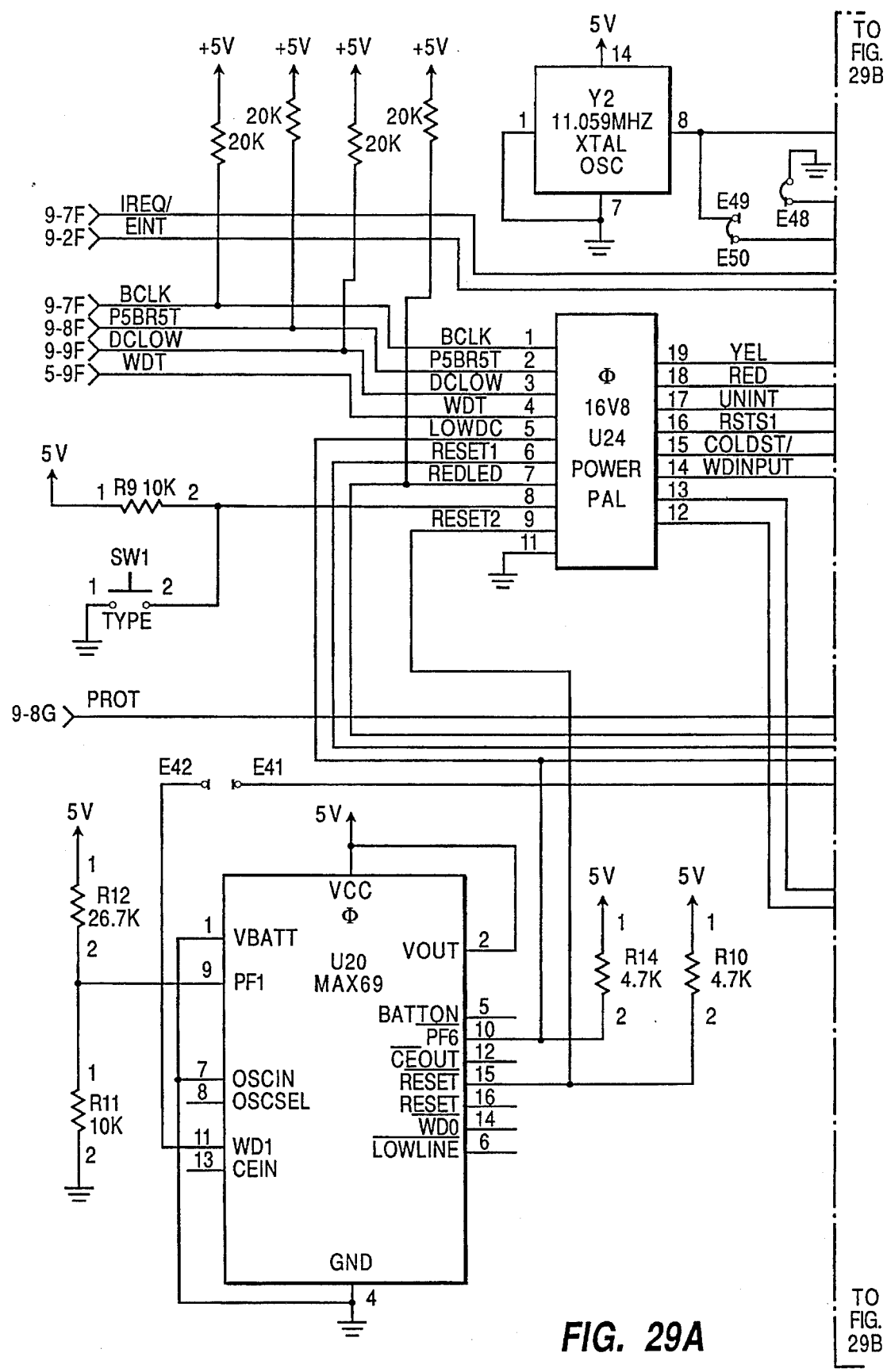
Figure 29B:
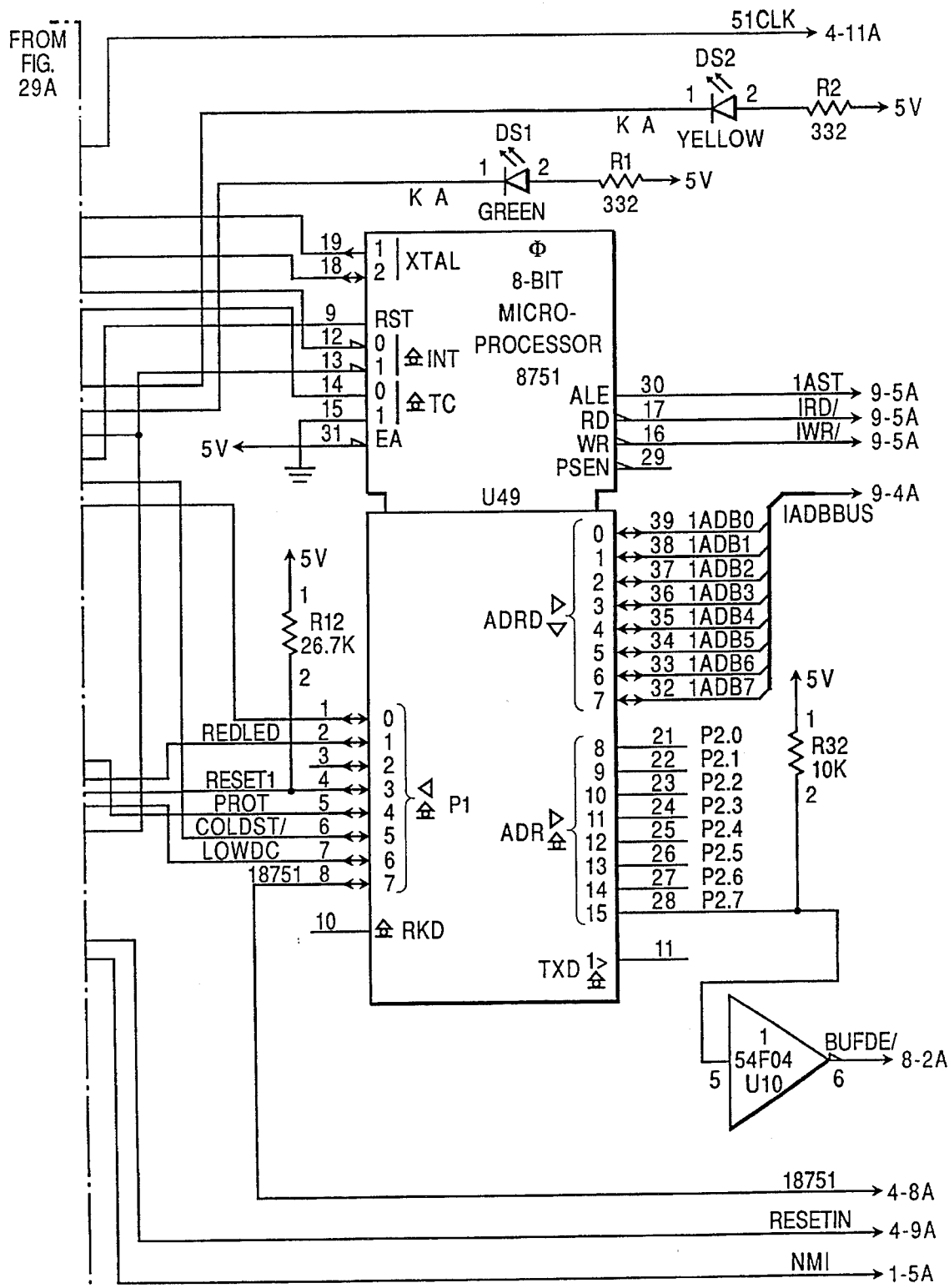
Figure 30A:
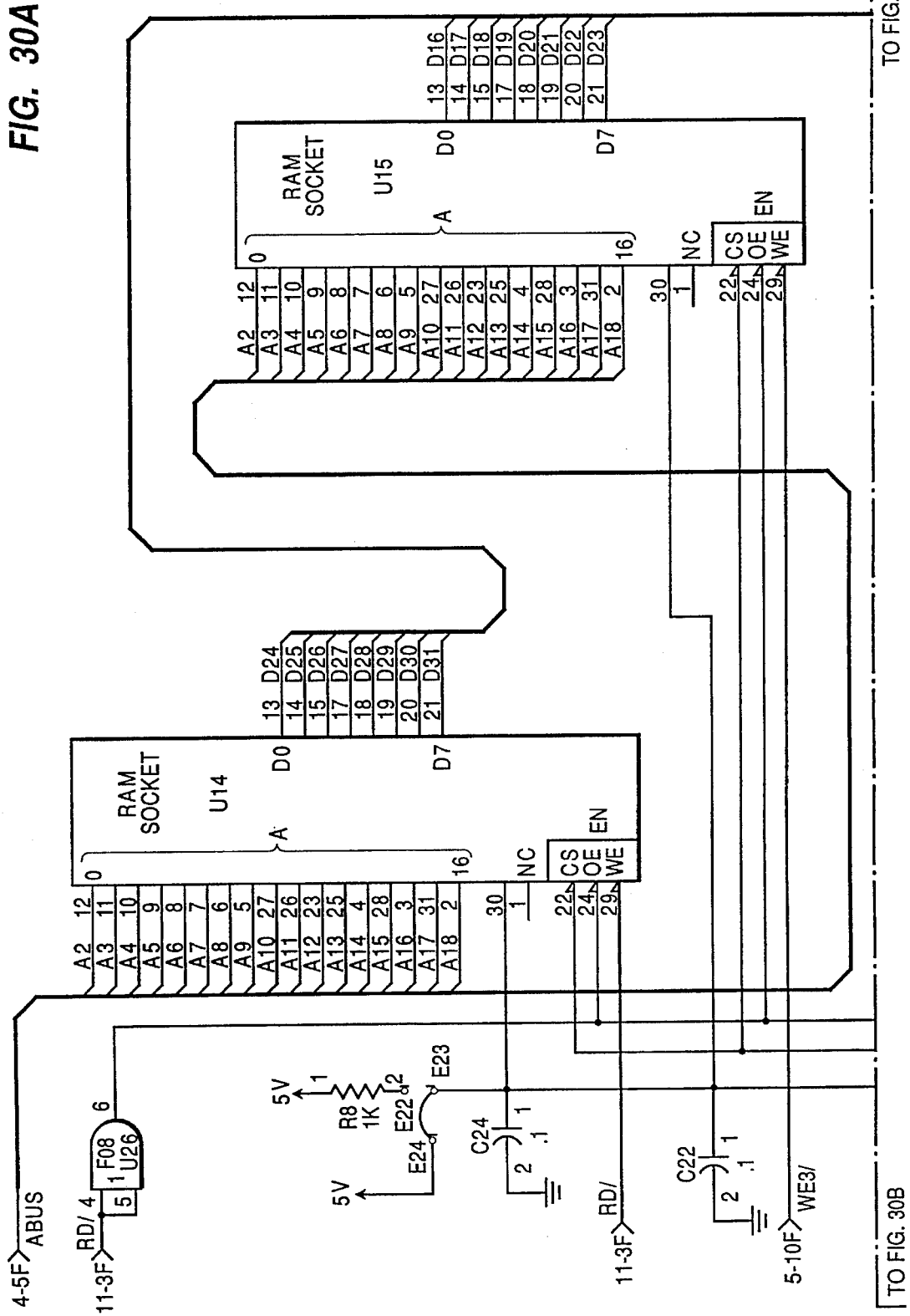
Figure 30B:
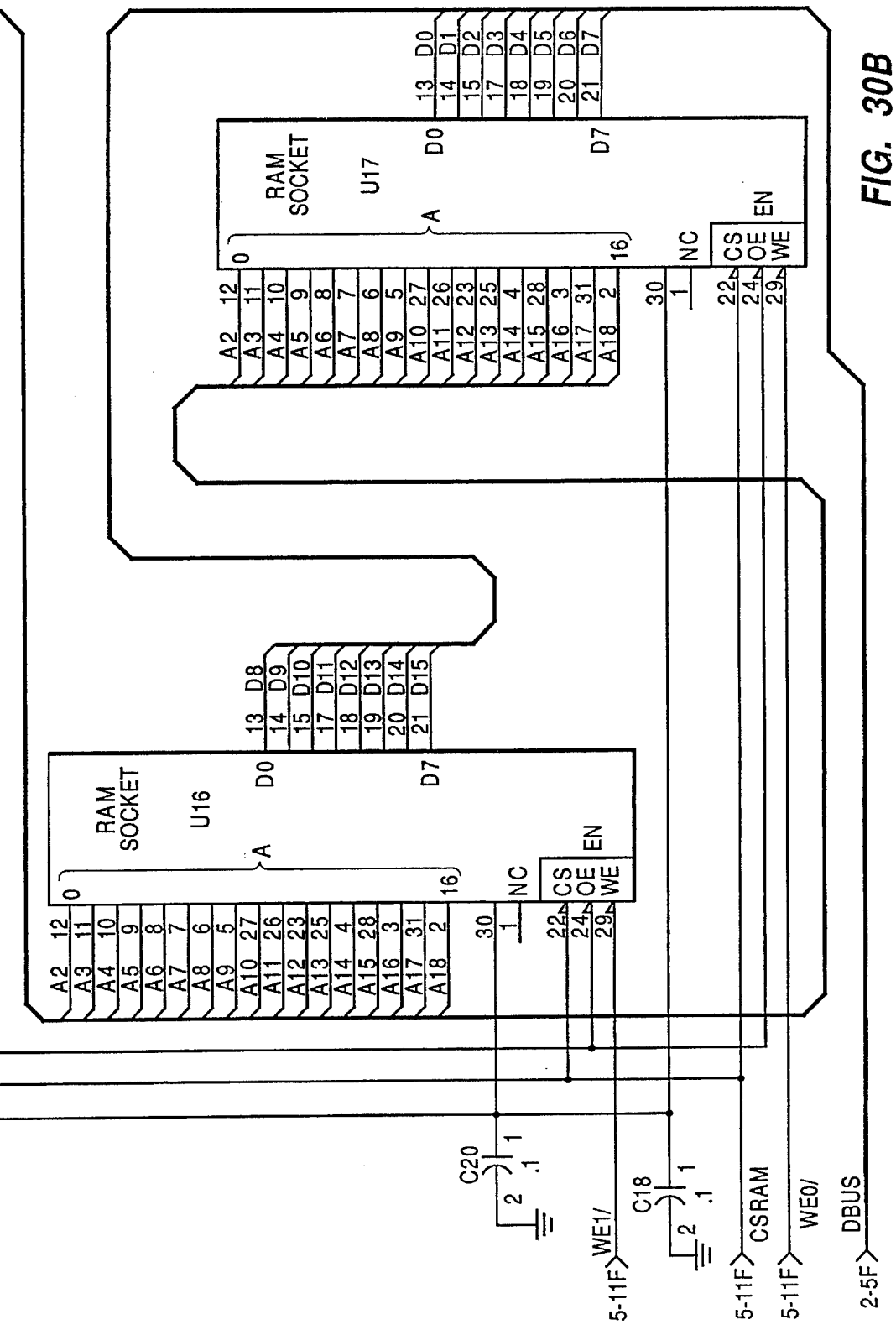
Figure 31A:
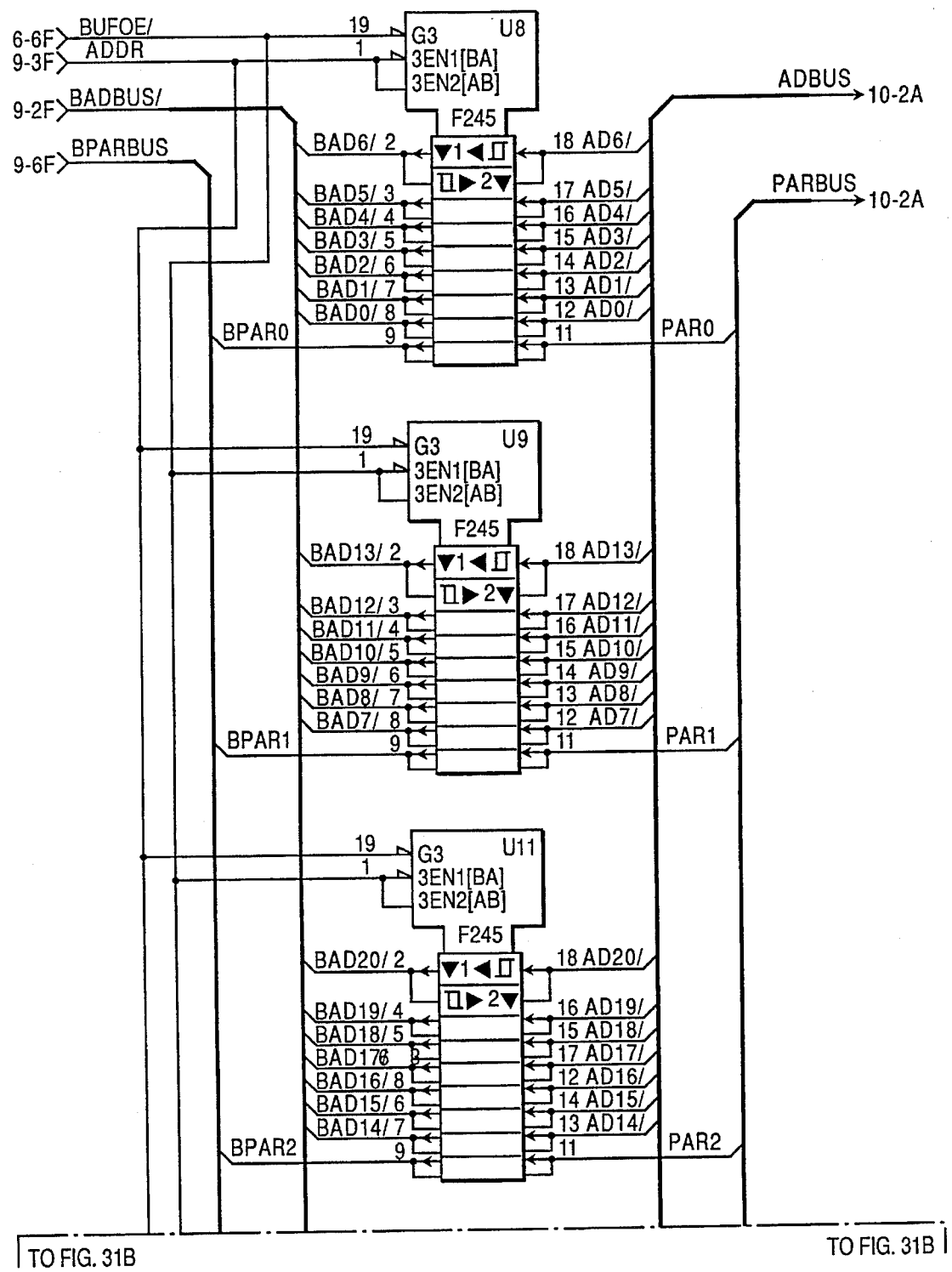
Figure 31B:
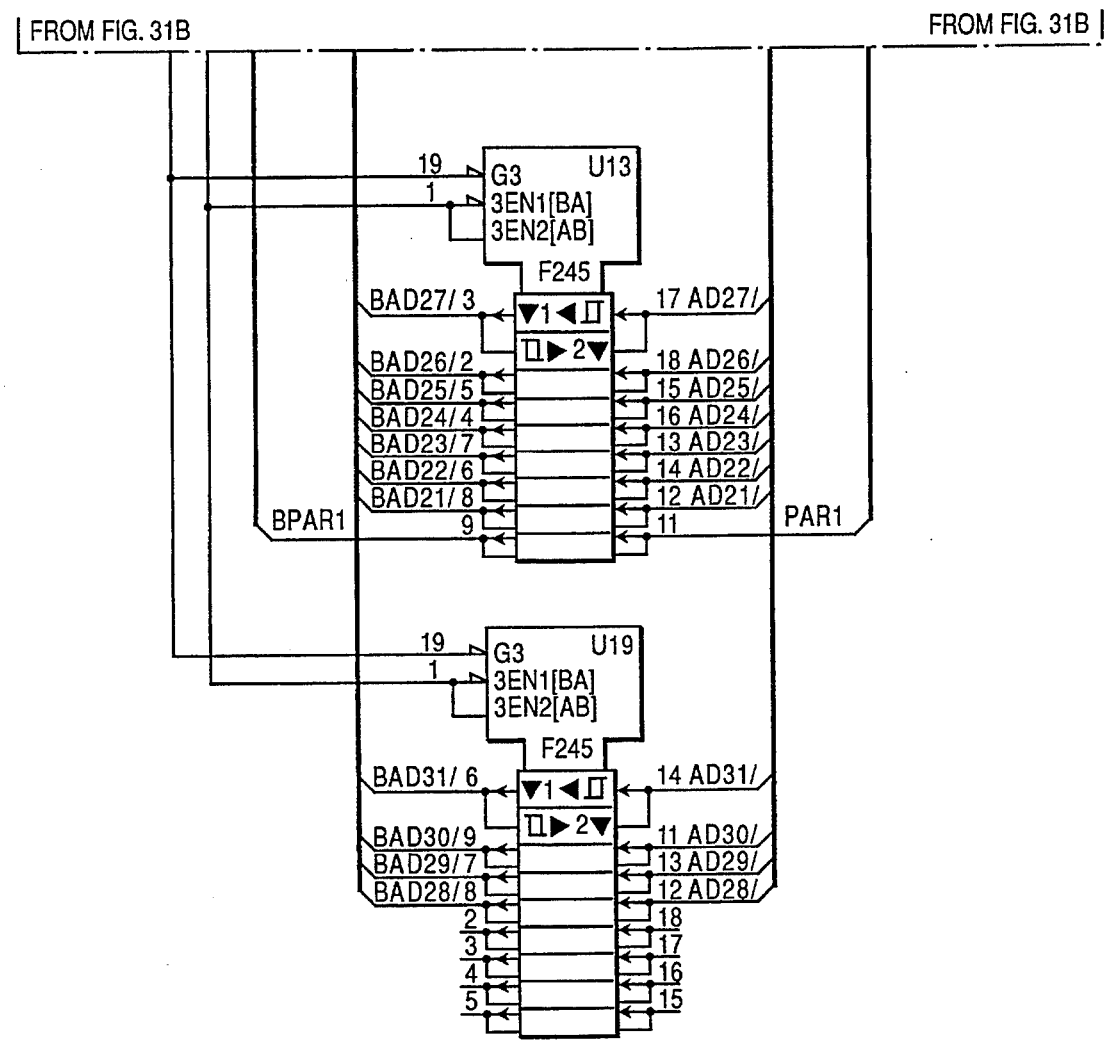
Figure 32A:
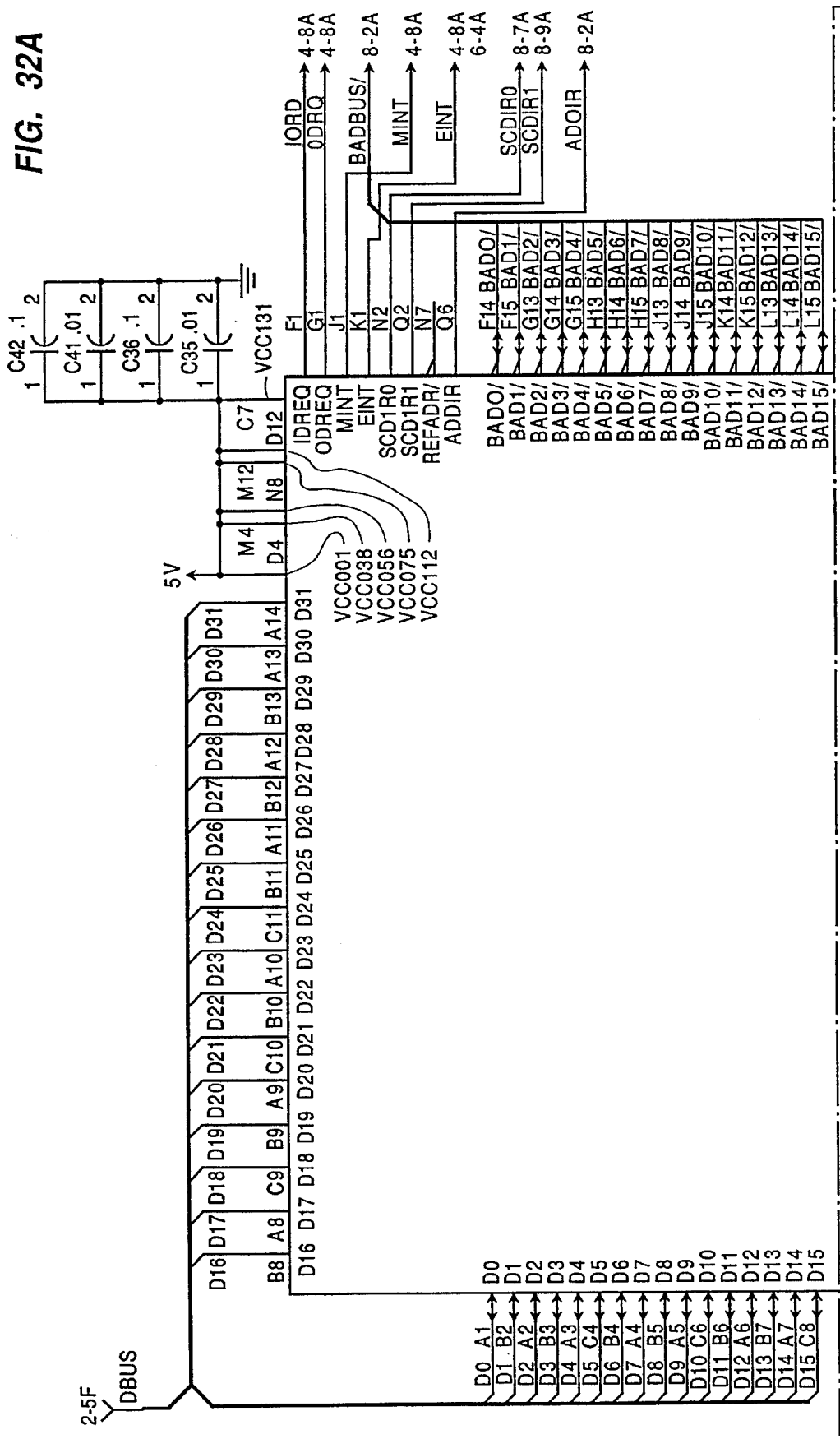
Figure 32B:
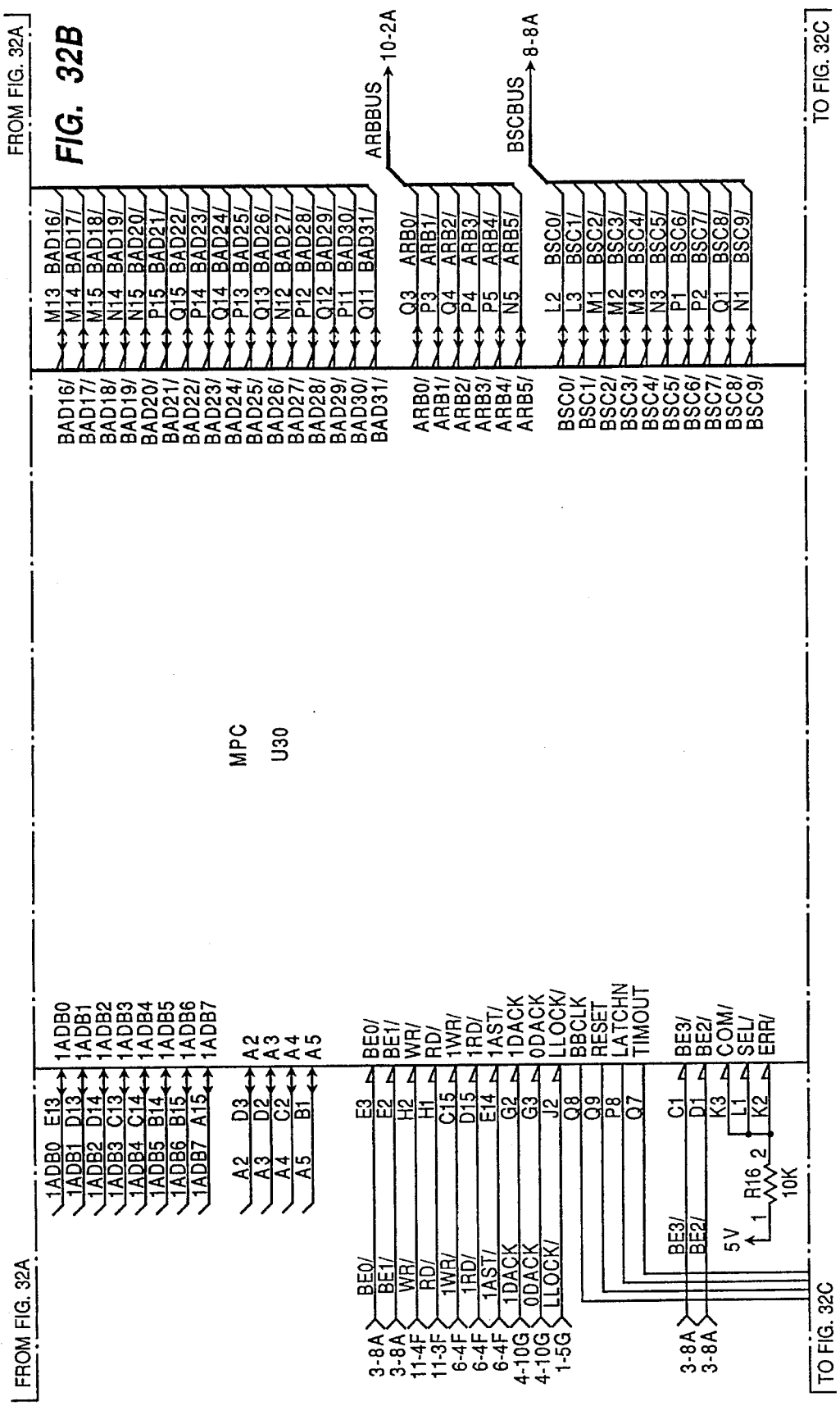
Figure 32C:
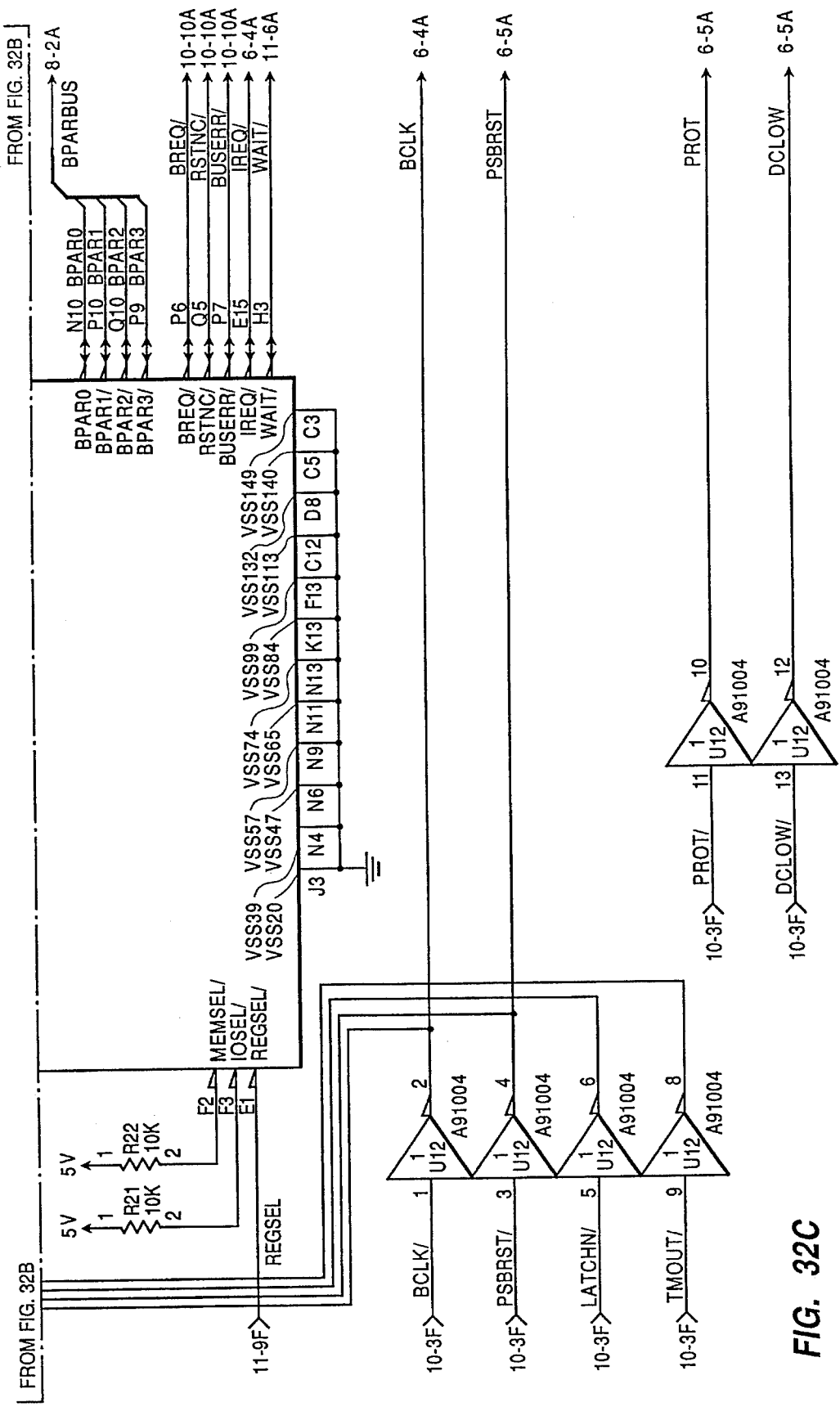
Figure 33A:
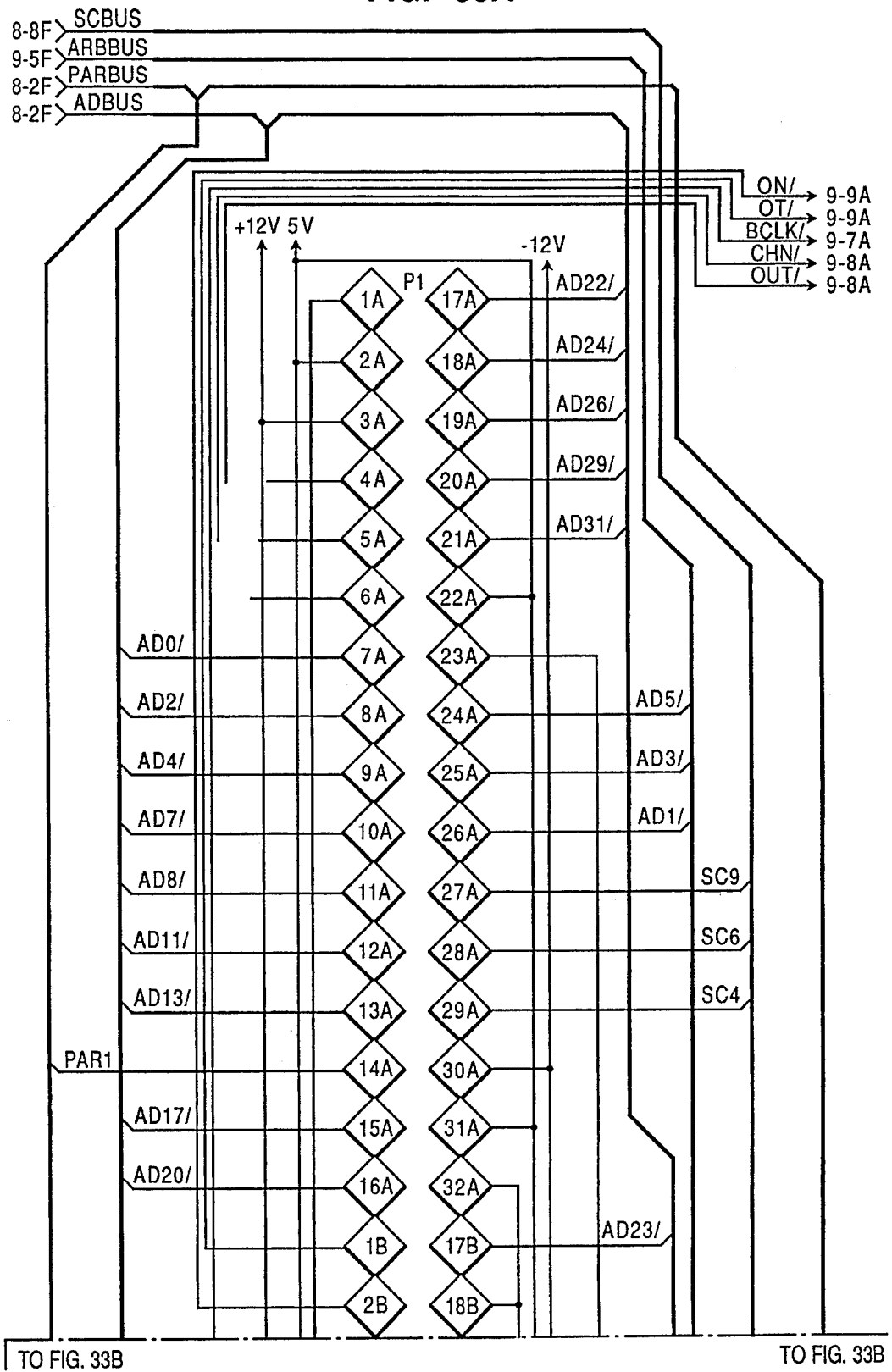
Figure 33B:
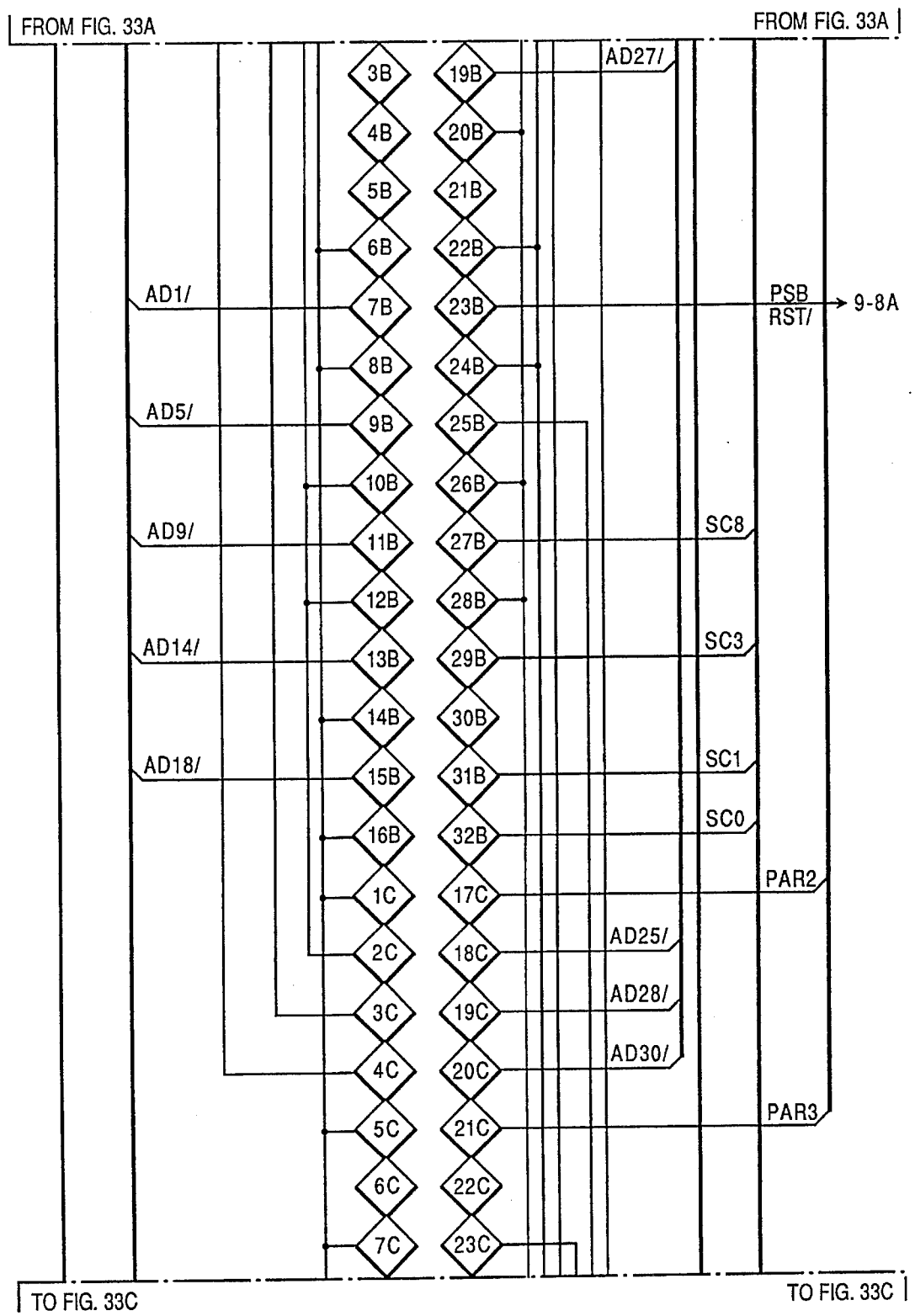
Figure 33C:
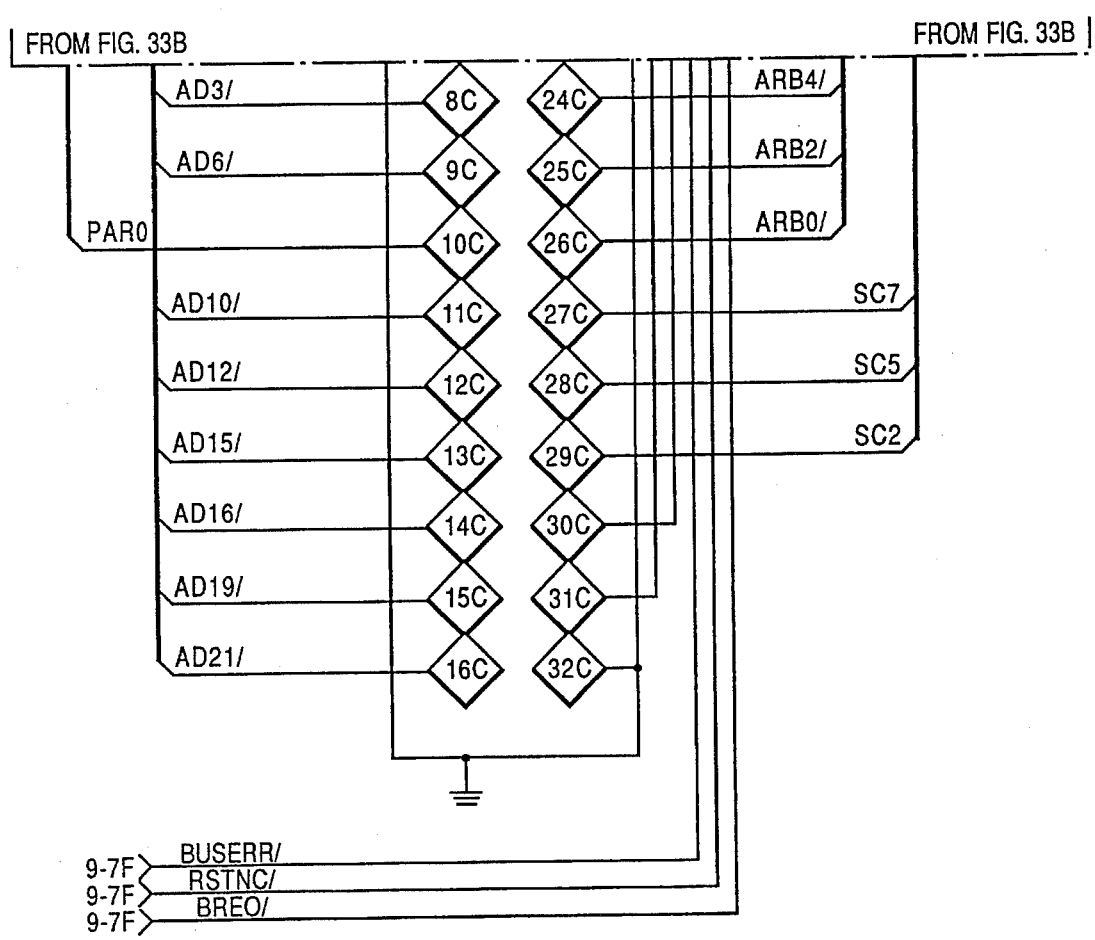
Figure 34A:
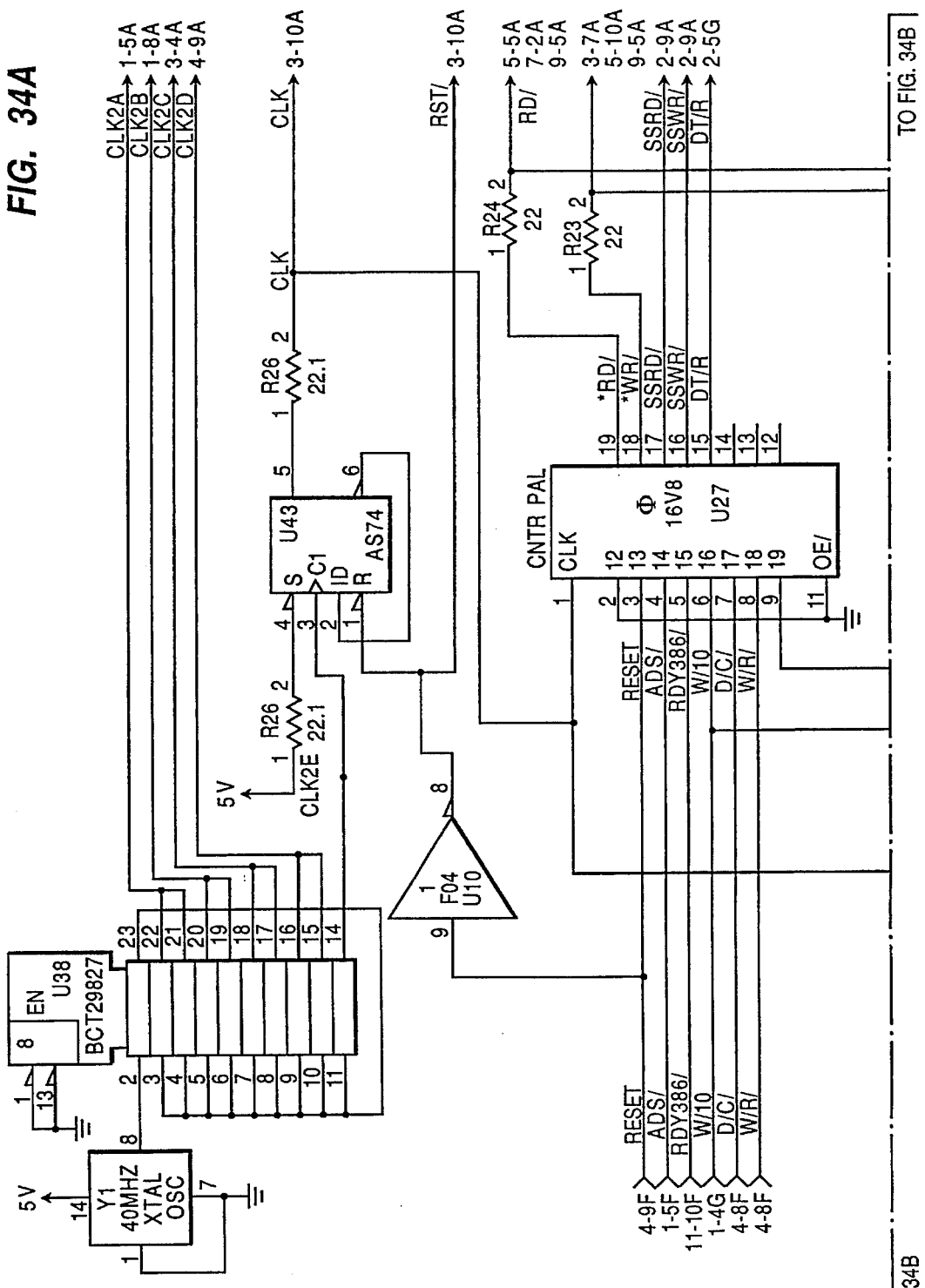
Figure 34B:
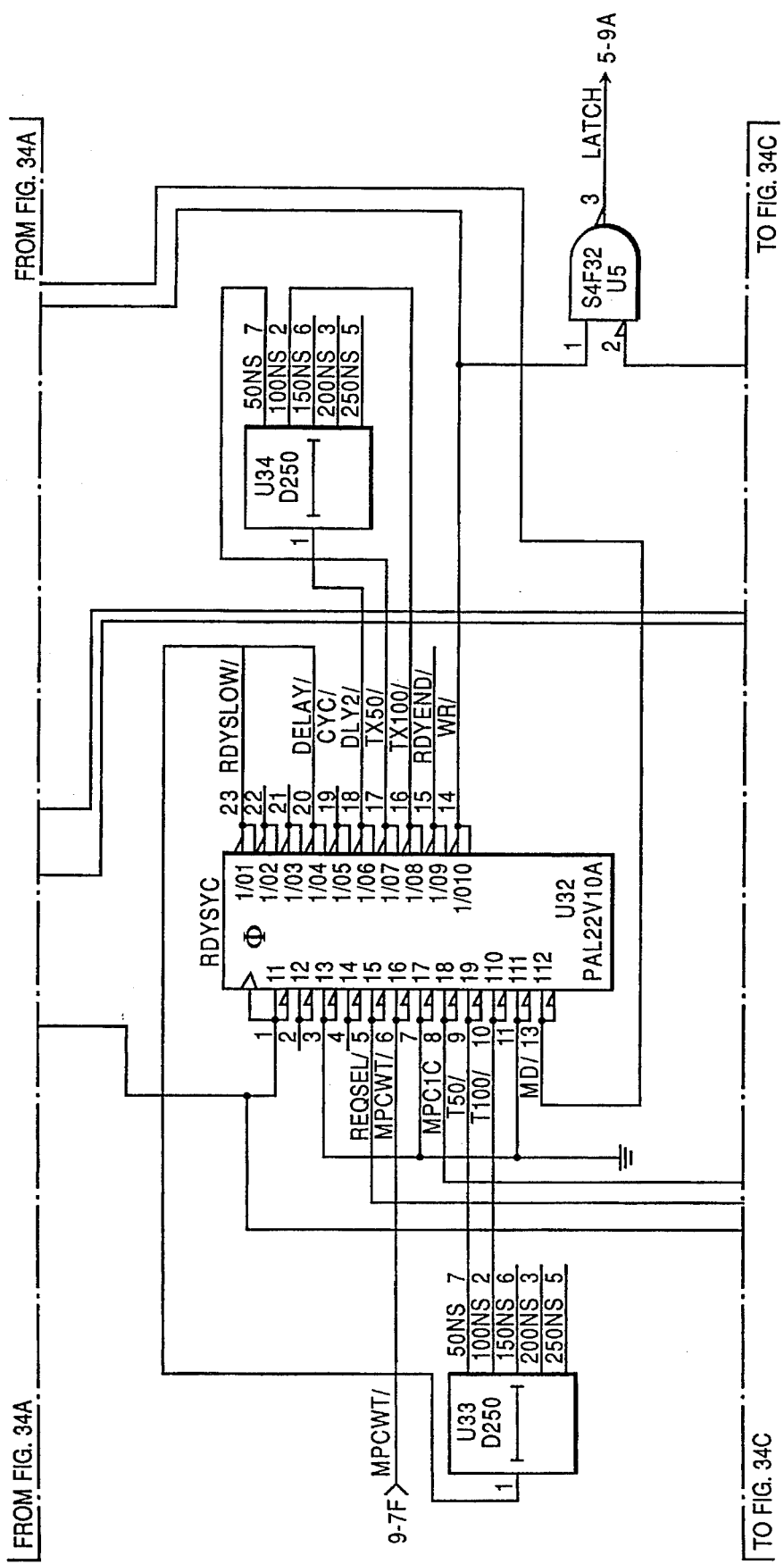
Figure 34C:
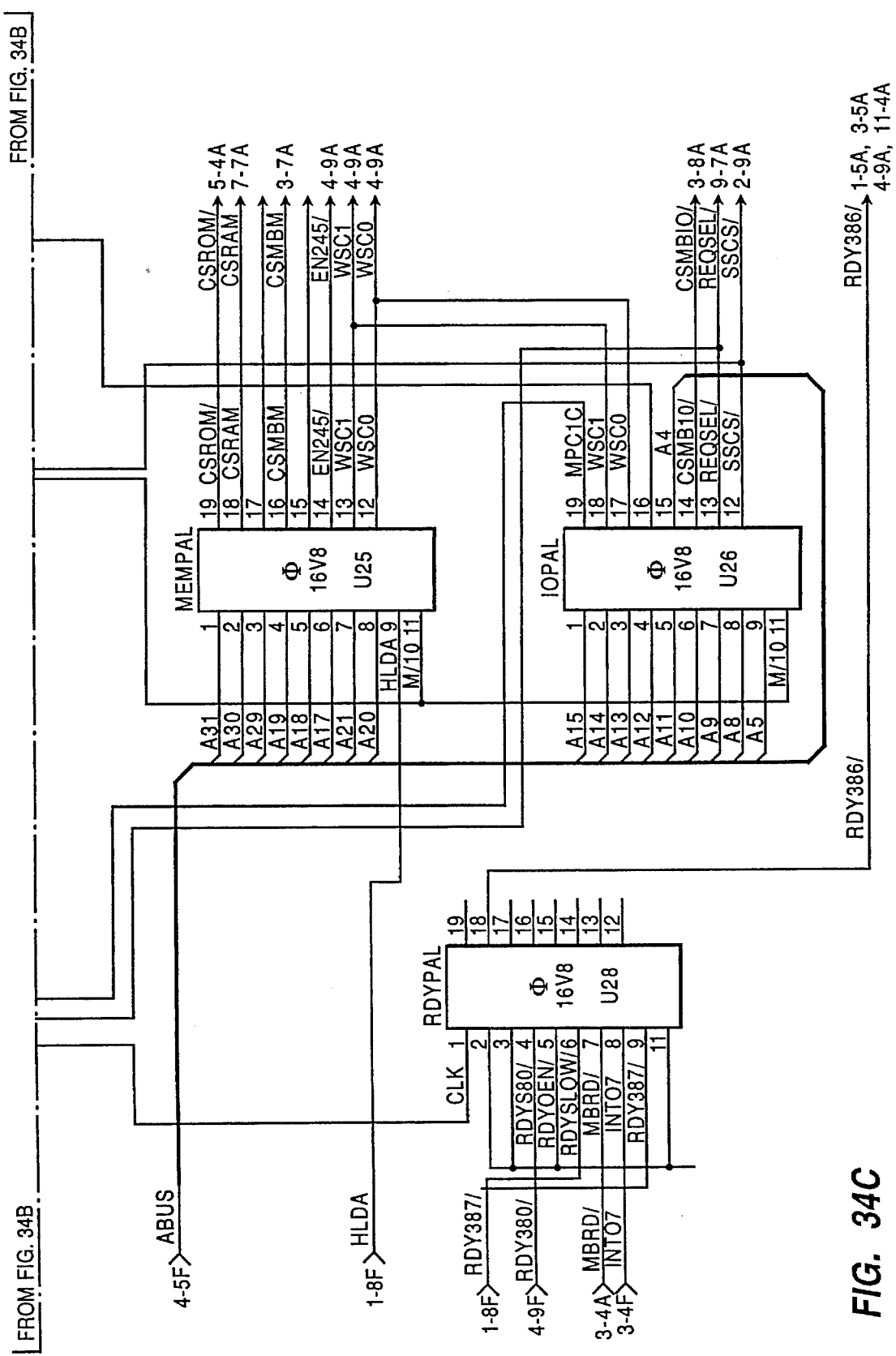
Figure 35A:
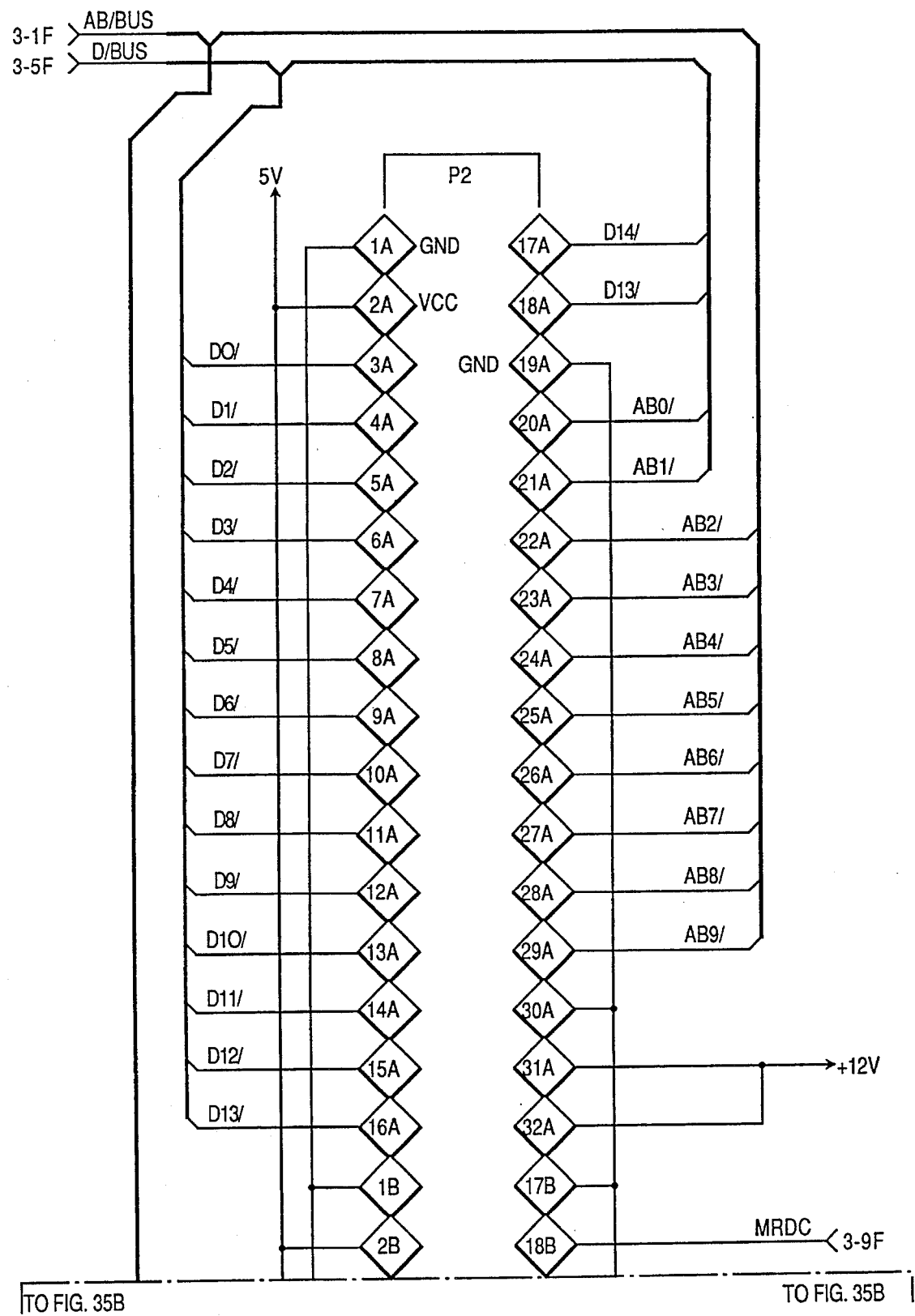
Figure 35B:
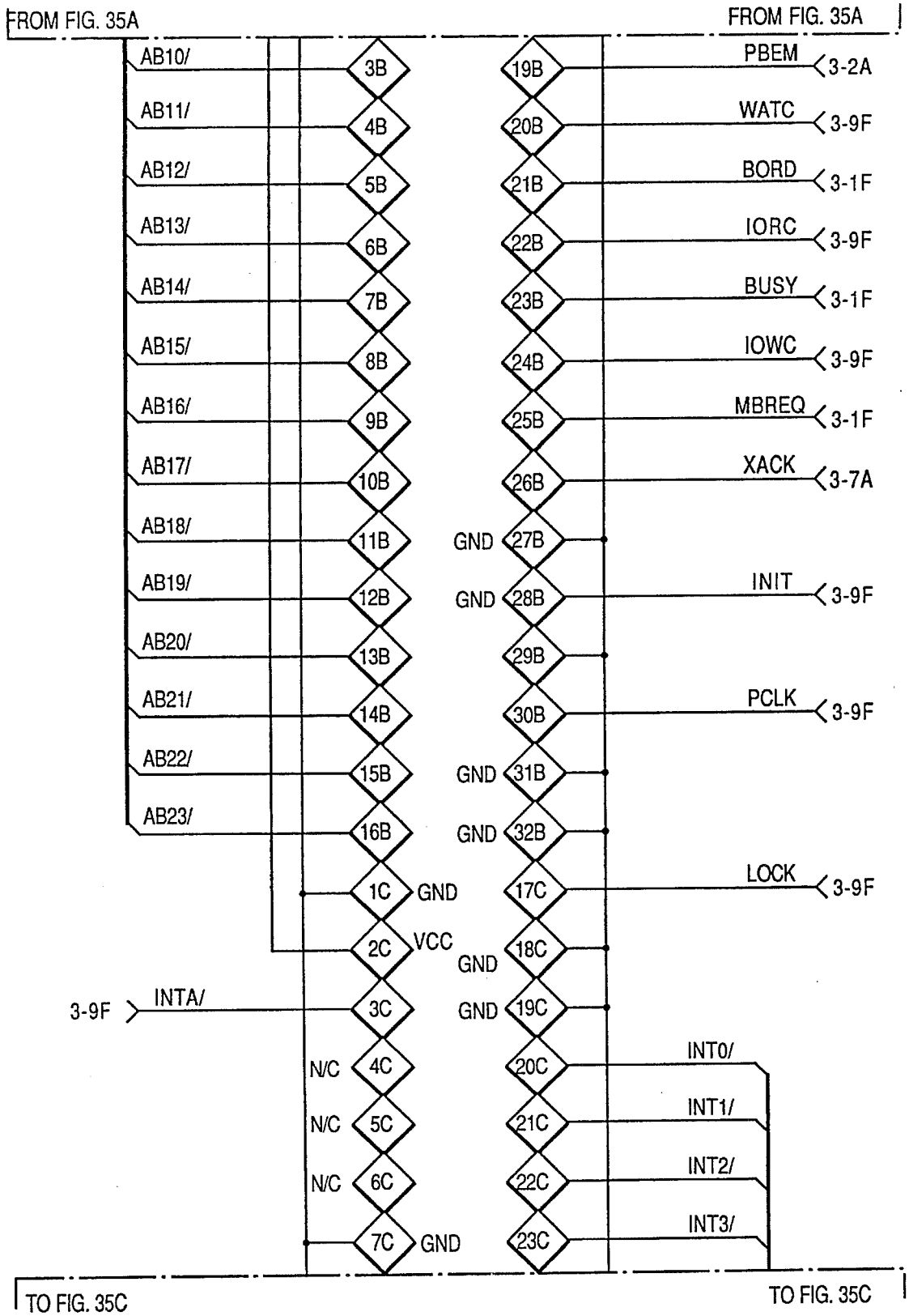
Figure 35C:
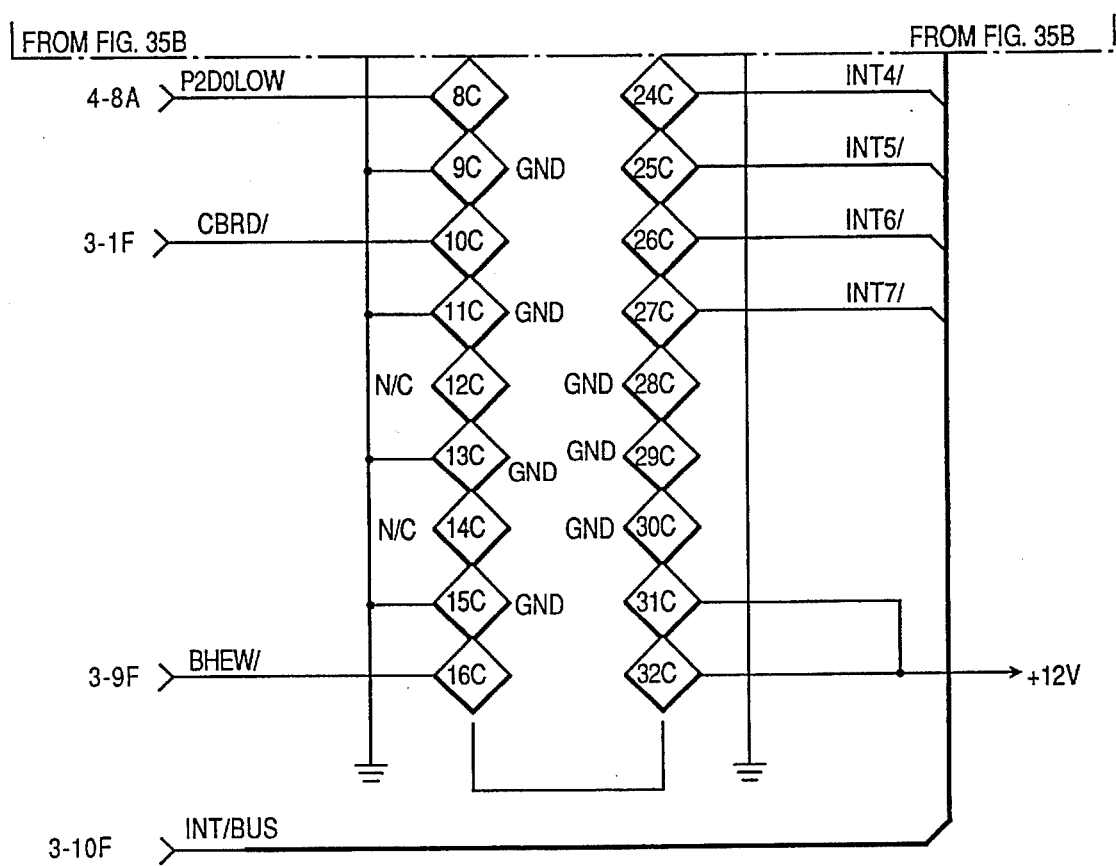
Figure 36A:
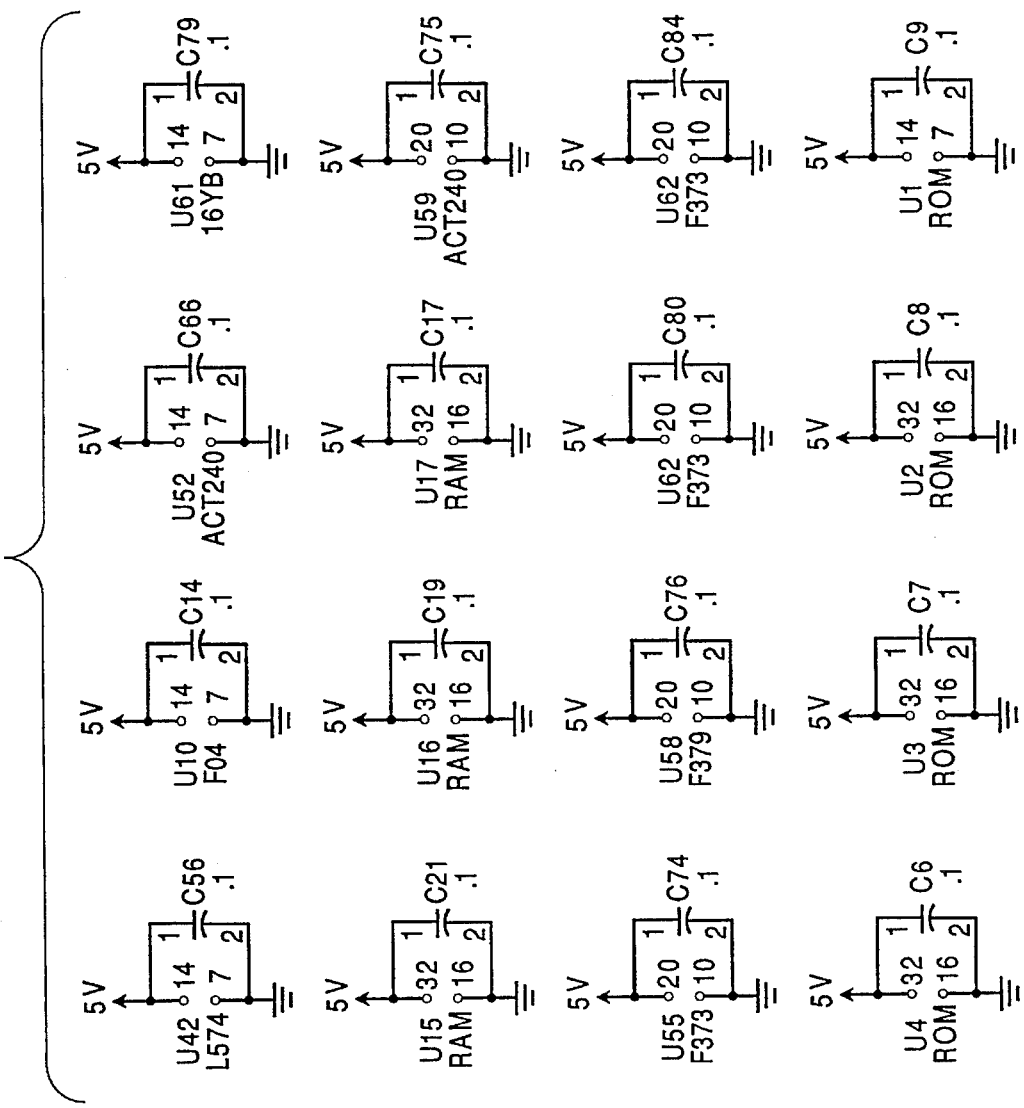
Figure 36B:
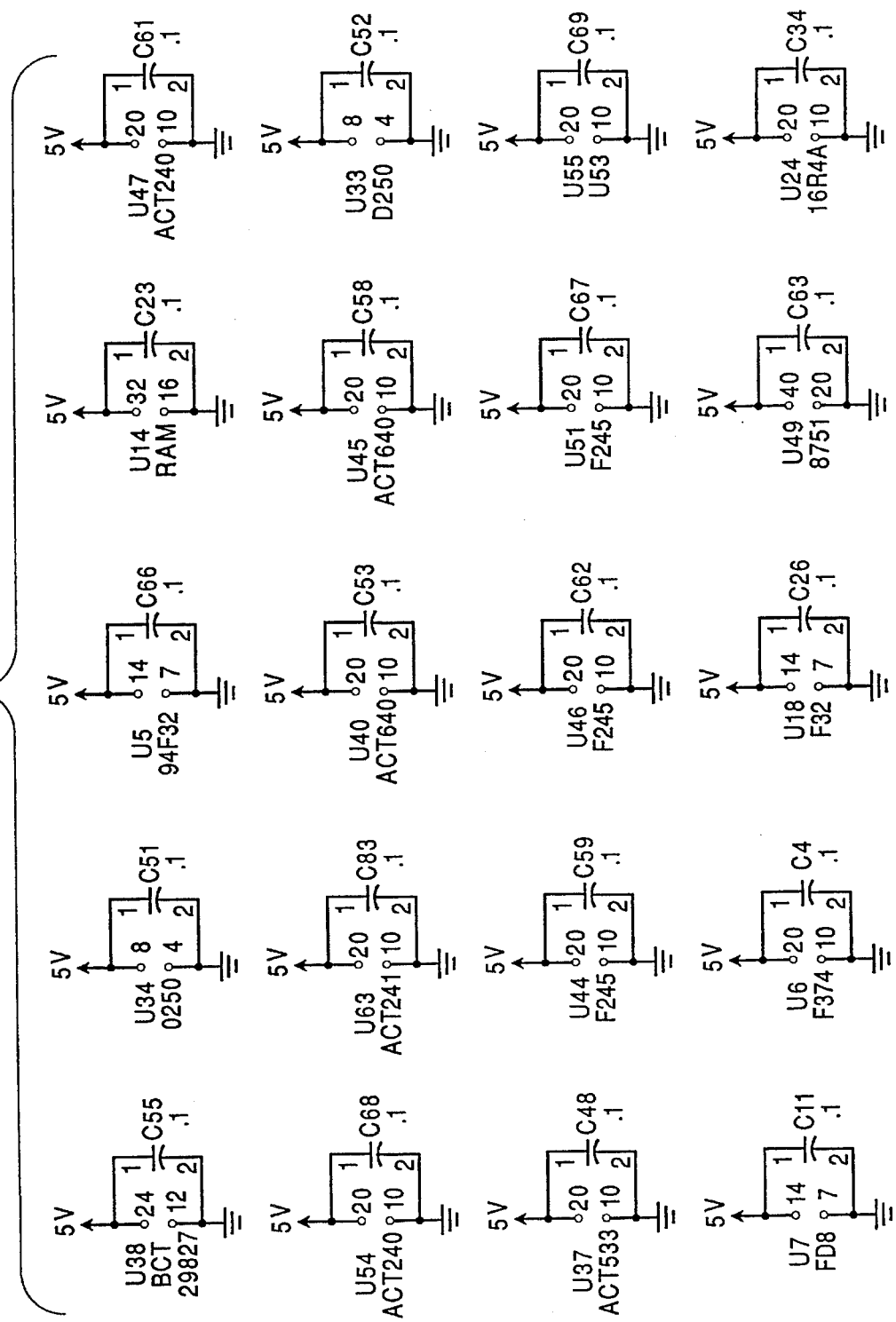
Figure 36C:
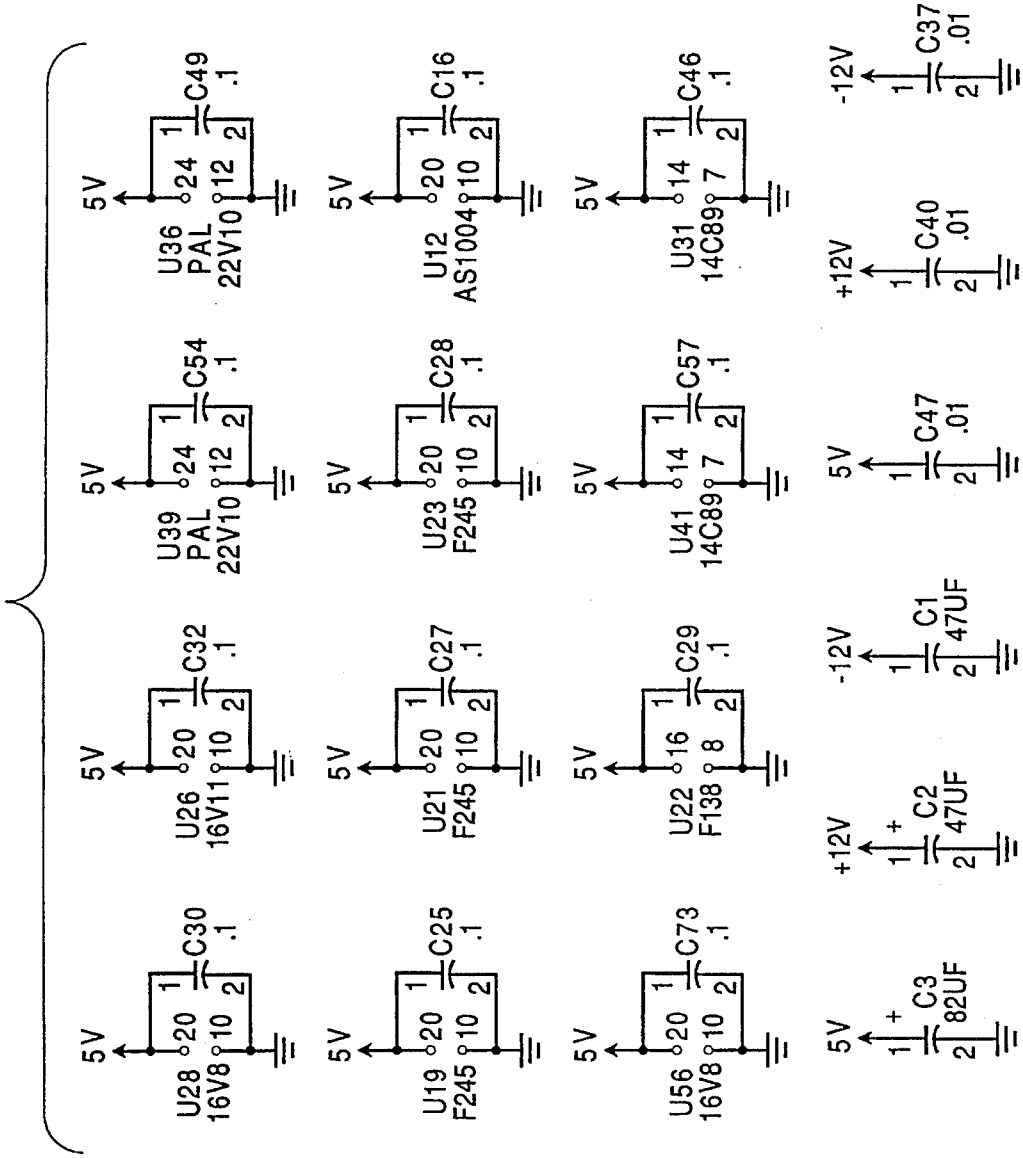
Figure 36D:
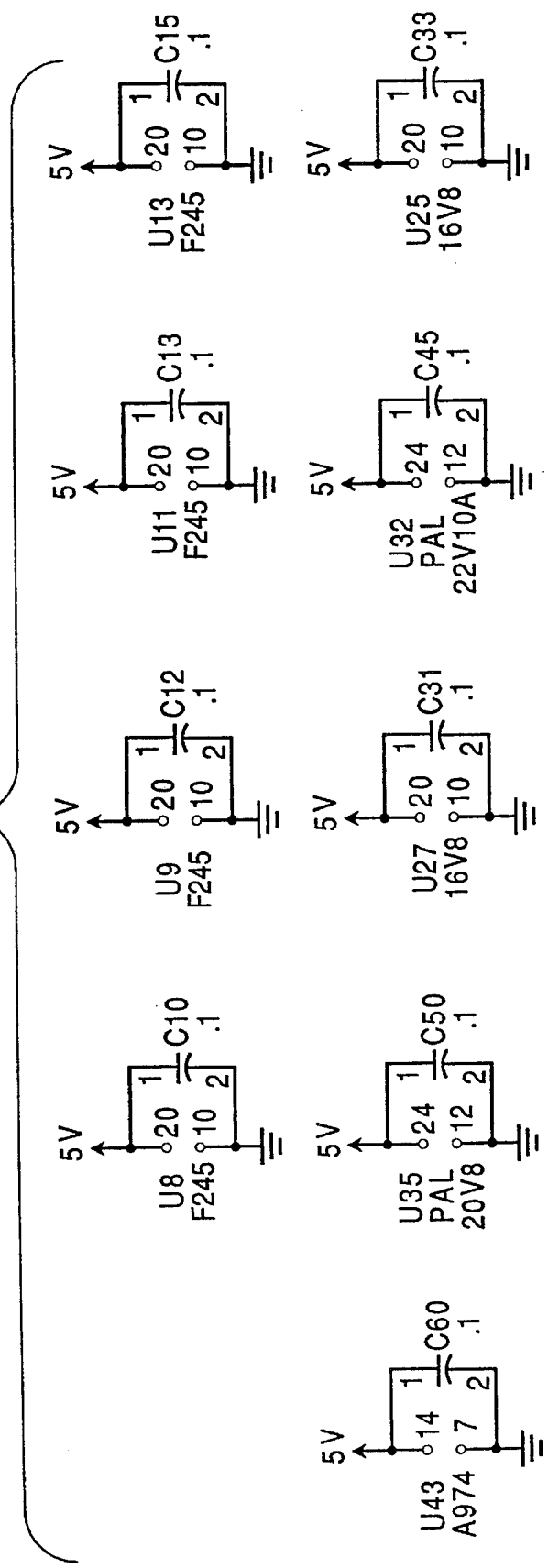

FIG, 23B is a listing of the specifications for the interrupt PLD of FIG, 23;

FIGS. 24A through 36D together comprise a schematic diagram of an embodiment of the propulsion control system CPU board of the present invention, wherein:

FIG. 24A to 24D are a schematic diagram which shows the 80386 CPU and its 80387 numeric compressor;

FIGS. 25A to 25C are a schematic diagram which shows the serial interface CPU board;

FIGS. 26A to 26D are the interconnection of the system with the Multibus I control logic PLD's shown here in more detail;

FIGS. 27A and 27B are a schematic diagram which shows the interconnection of the multifunction peripheral device with the system;

FIGS. 28A to 28C are a schematic diagram which shows read only memory (ROM) connected to the system;

FIGS. 29A and 29B are a schematic diagram which shows the interconnect device and power PLD with pull-up resistors interconnected to the system and the feature that allows for a removable Multibus II interface;

FIGS. 30A and 30B are a schematic diagram which shows random access memory (RAM) connected to the system;

FIGS. 31A to 31C are a schematic diagram which show buffers;

FIGS. 32A to 32C are a schematic diagram which shows the Multibus II control logic device, e.g., the message passing coprocessor;

FIGS. 33A to 33C are a schematic diagram which shows a connector;

FIGS. 34A to 34C are a schematic diagram which shows various system programmed logic devices (PLD's);

FIGS. 35A to 35C are a schematic diagram which shows a connector; and

Figure 37A:
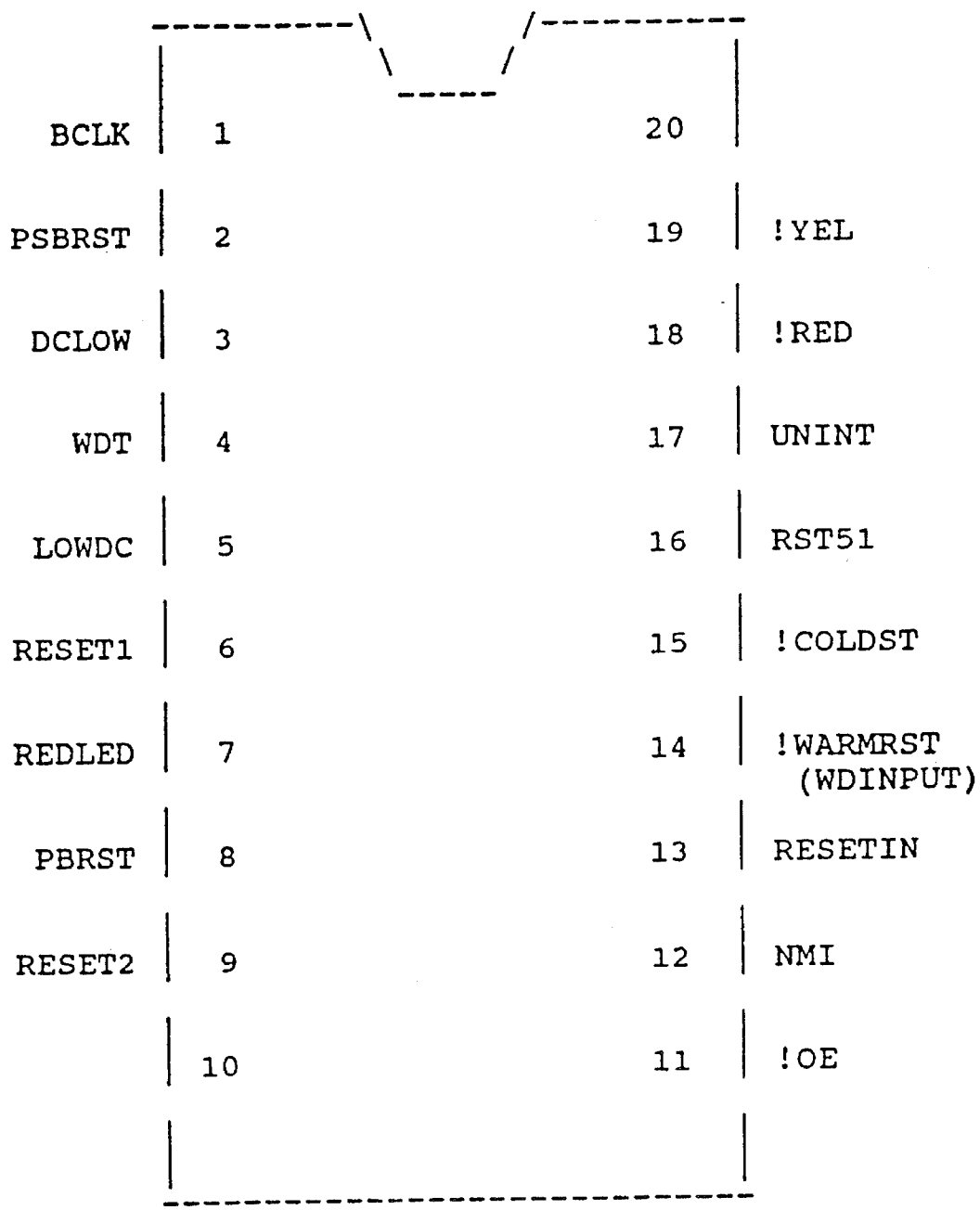
Figure 38A:
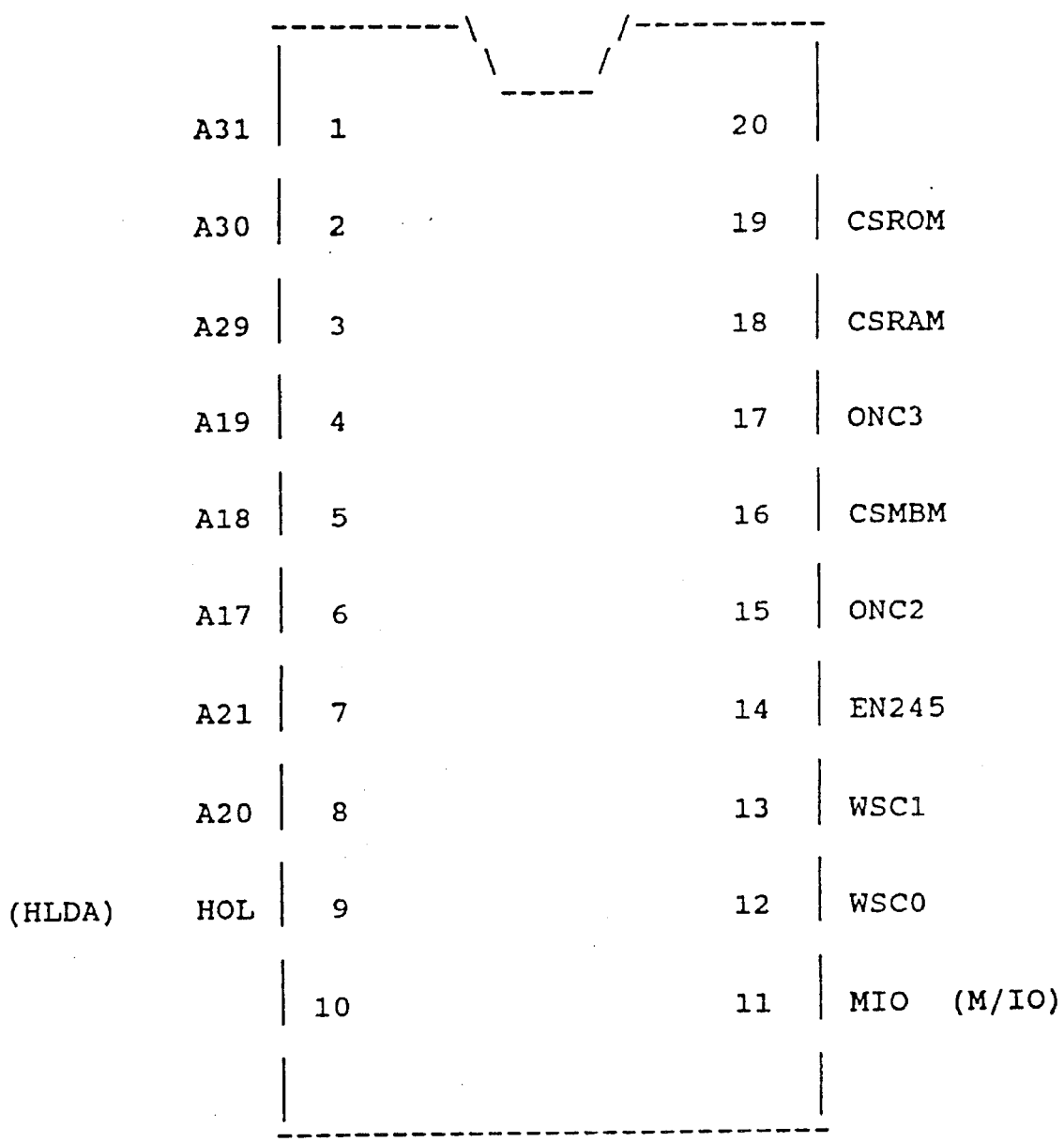
Figure 39A:
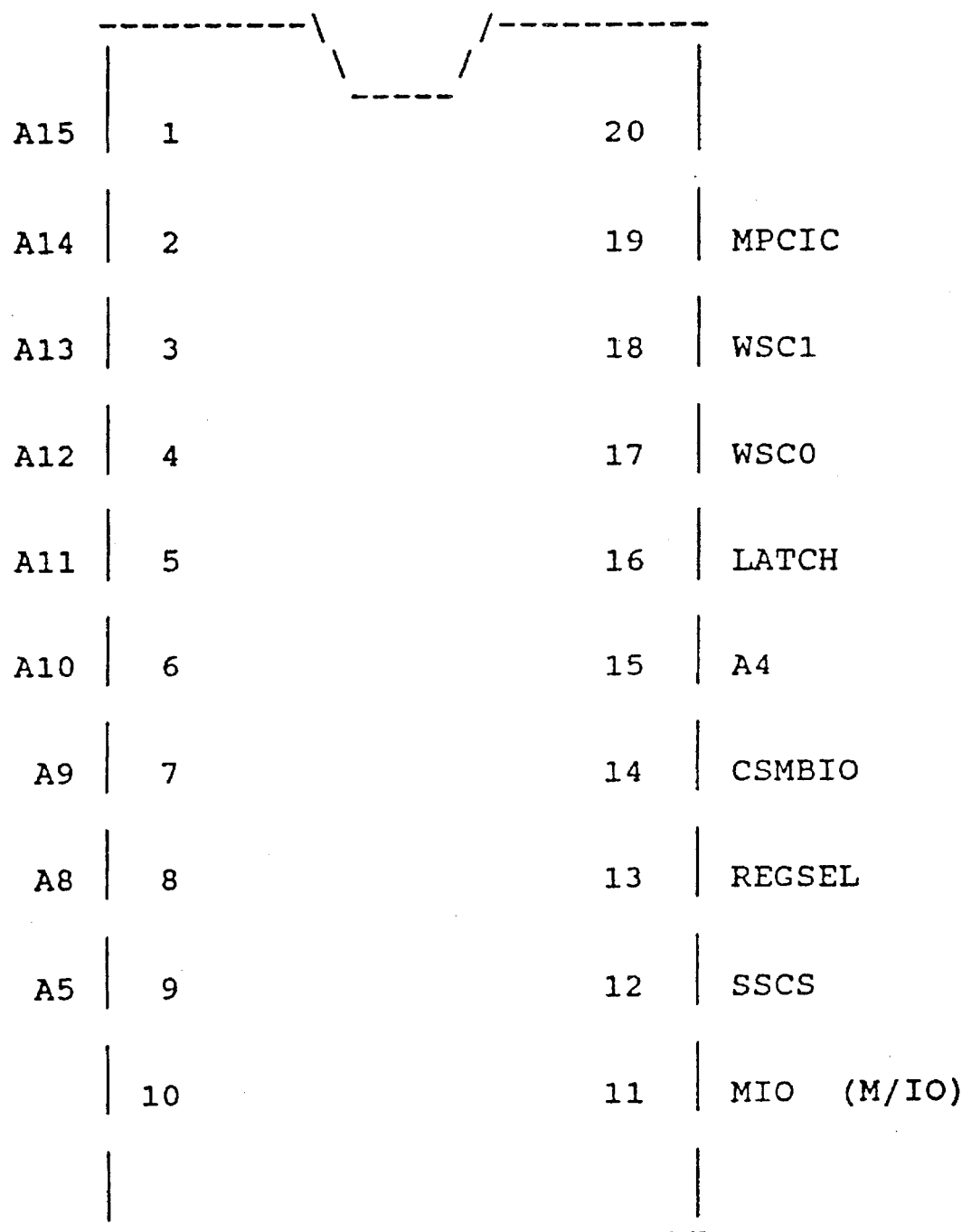
Figure 40A:
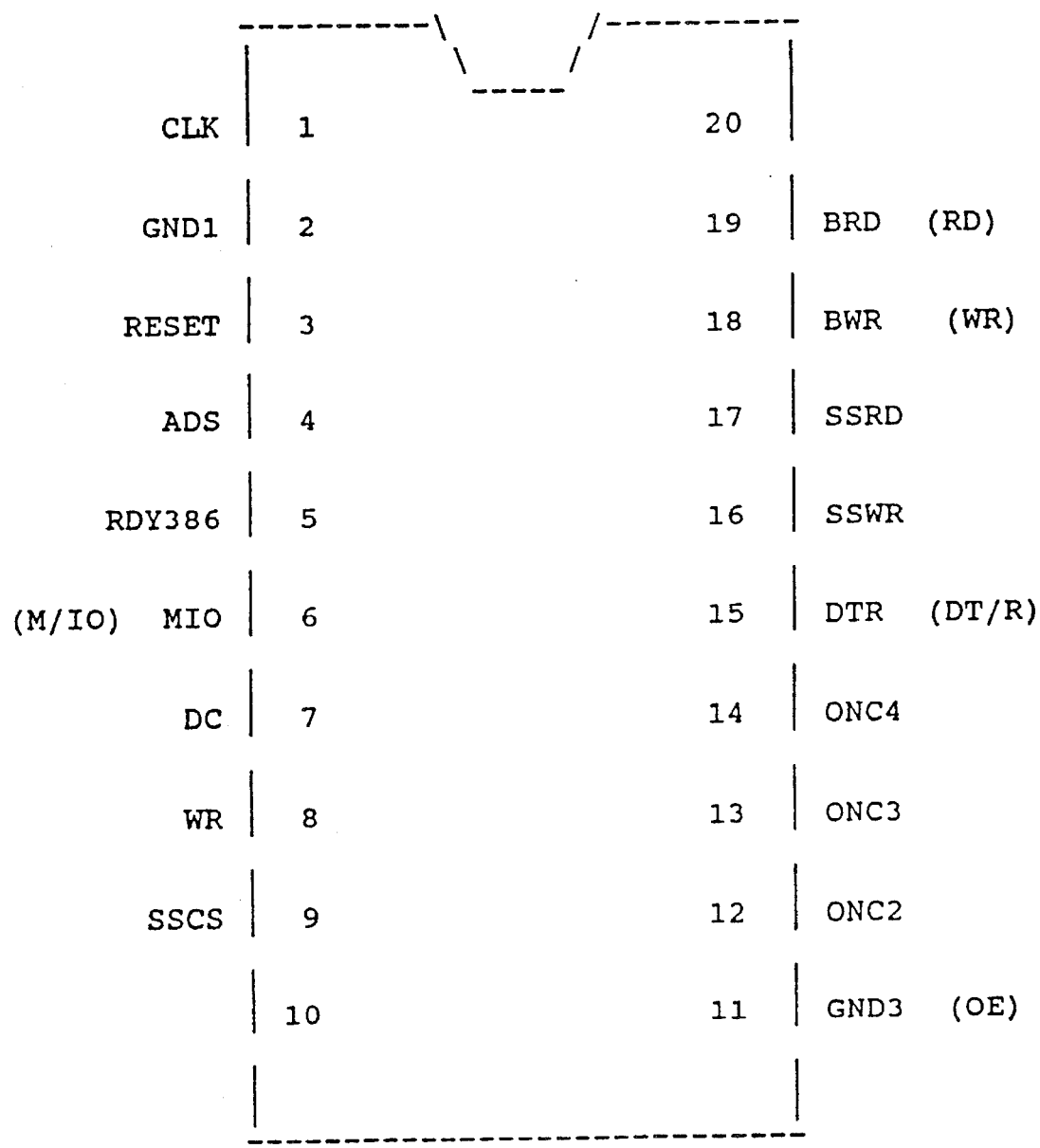
Figure 41A:
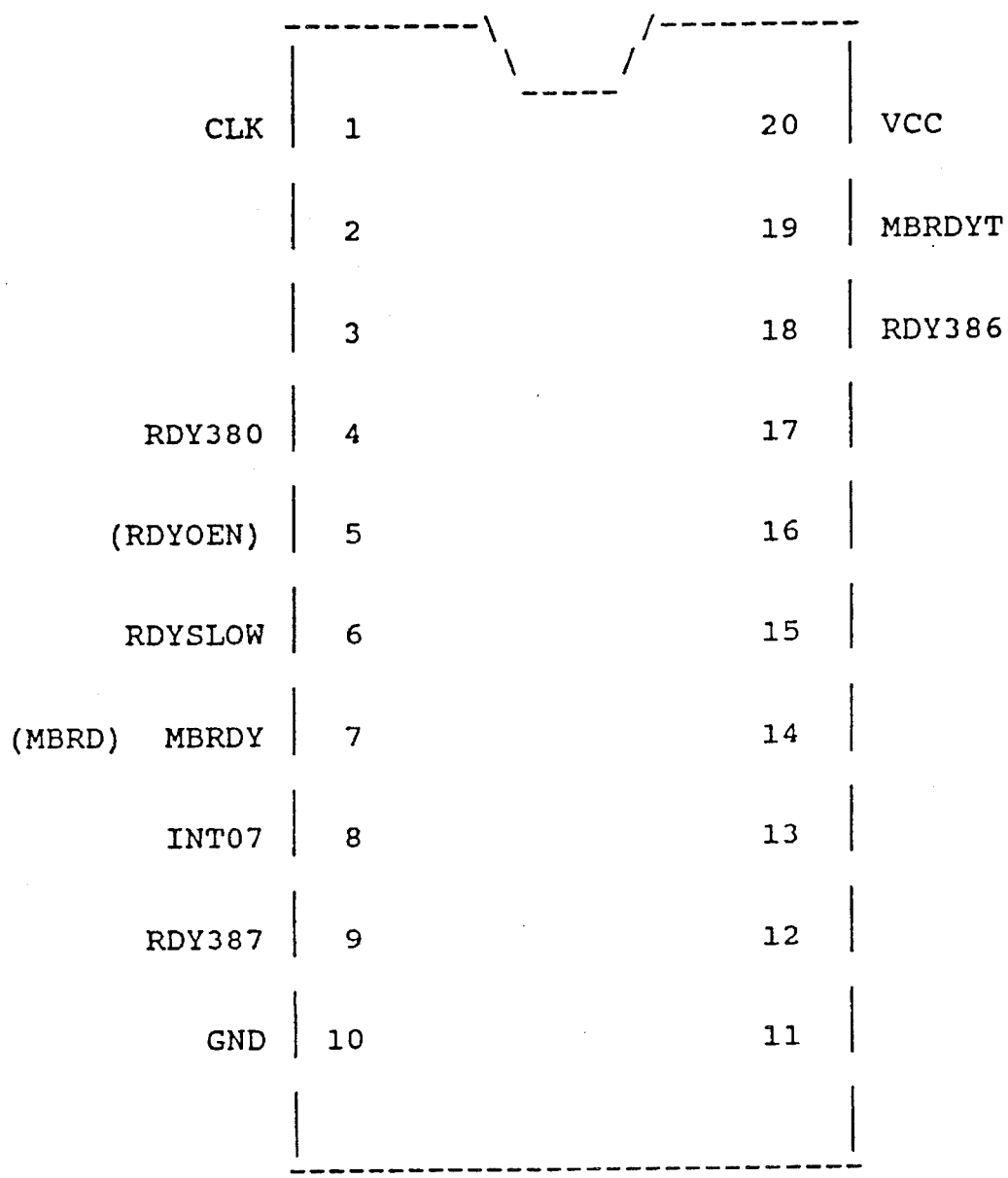
Figure 42A:
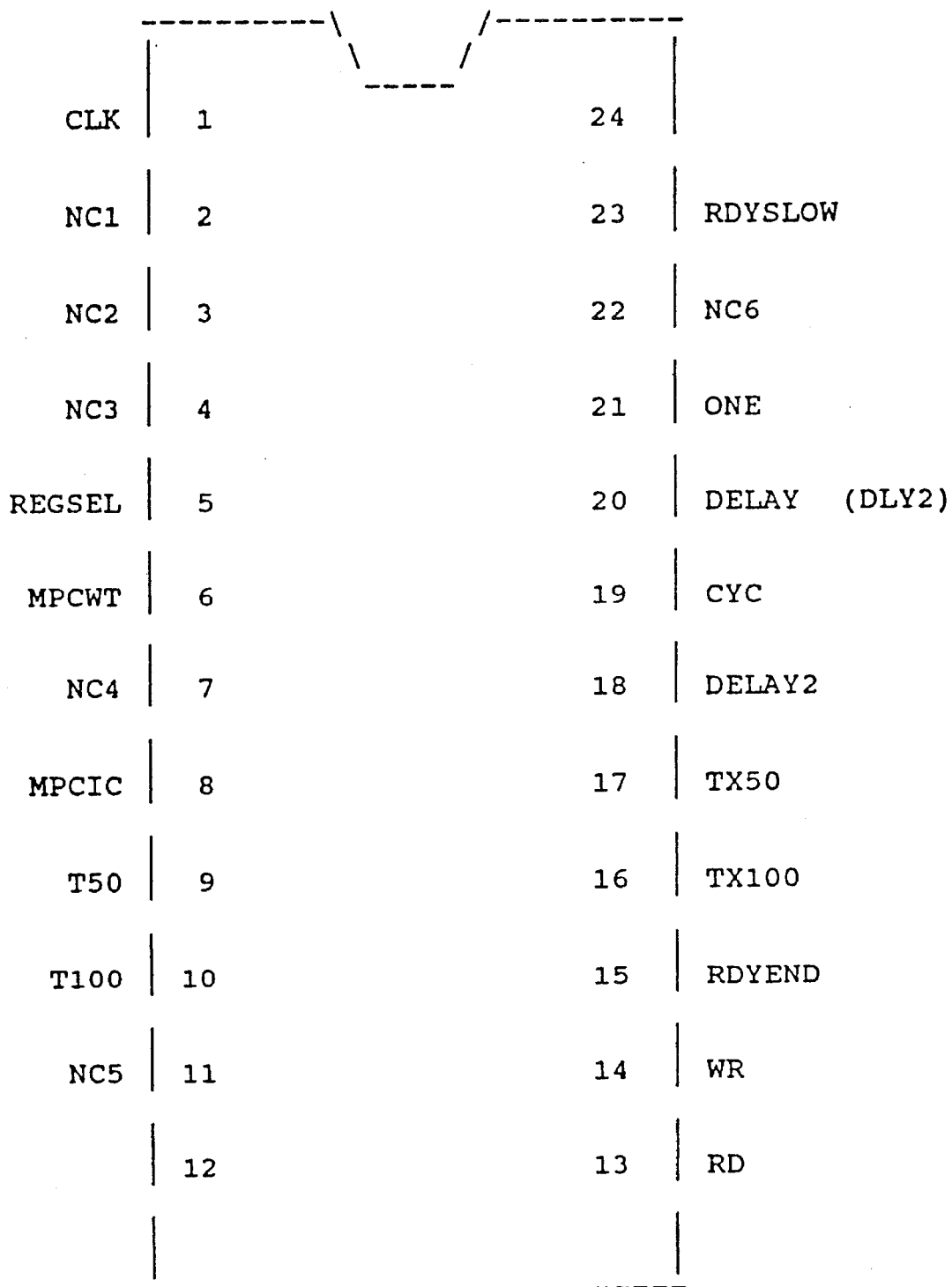

FIGS. 36A to 36D are a schematic diagram showing the bypassing capacitors for the various devices;

FIG. 37A is a functional black box diagram of an embodiment of a power PLD according to the invention;

FIG. 37B is a table listing for the power PLD of FIG. 37A;

FIG. 38A is a functional black box diagram of an embodiment of a ready generator control memory PLD according to the invention;

FIG. 38B is a table listing for the ready generator control memory PLD of FIG. 38A;

FIG. 39A is a functional black box diagram of an embodiment of a ready generator control input/output (I/O) PLD according to the invention;

FIG. 39B is a table listing for the ready generator control I/O PLD of FIG. 39A;

FIG. 40A is a functional black box diagram of an embodiment of a read write timing generator control PLD according to the invention;

FIG. 40B is a table listing for the read write timing generator control PLD of FIG. 40A;

FIG. 41A is a functional black box diagram of an embodiment of an 80386 ready generator control PLD according to the invention;

FIG. 41B is a table listing for the 80386 ready generator control PLD of FIG. 41A;

FIG. 42A is a functional black box diagram of an embodiment of a ready system (RDYSYS) control PLD according to the invention; and FIG. 42B is a table listing for the ready system (RDYSYS) control PLD of FIG. 42A.

DETAILED DESCRIPTION OF THE PREFERRED EMBODIMENT(S)

System Overview

Figure 1:
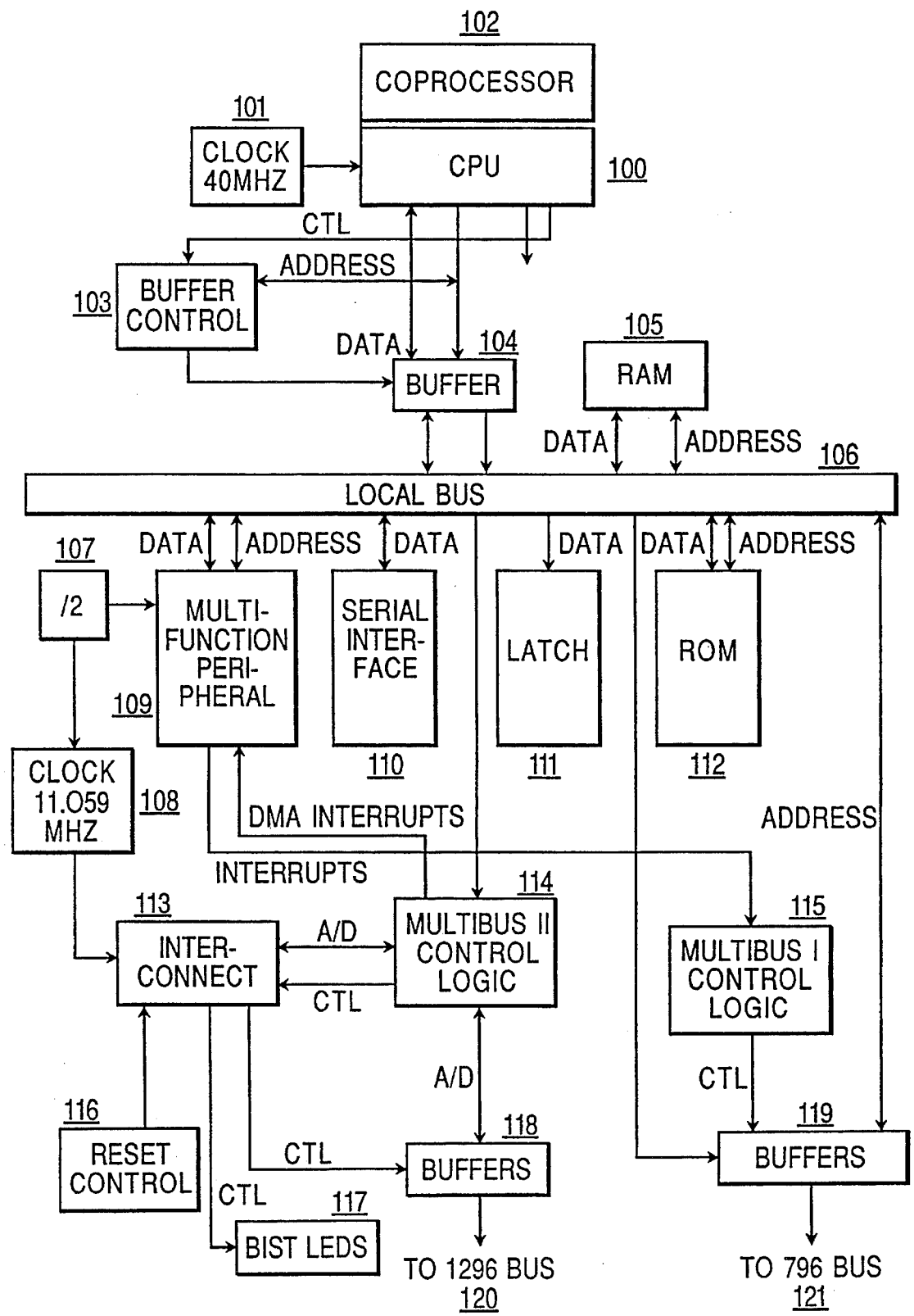
FIG. 1 is a block diagram of the major hardware components of an embodiment of the invention.

Referring to FIG. 1, shown is a block diagram of a microprocessor based propulsion control central processing unit board according to a preferred embodiment of the invention. The system components shown in FIG. 1 and their operation will now be described. The board is described later in more detail with respect to FIGS. 24A to 36D, which comprise a complete schematic for the preferred embodiment.

In the preferred embodiment, the microprocessor 100 is an Intel 80386 central processing unit (CPU). The 80386 CPU 100 (U50 in FIGS. 24A and 24B) in this embodiment is fed a 40 MHz clock signal from clock 101. The CPU 100 is connected with an optional coprocessor 102 (U57 in. FIGS. 24C and 24D) in this embodiment. The coprocessor 102 is preferably an Intel 80387 math coprocessor or its equivalent, which is specifically designed to handle mathematically intensive data processing more efficiently than the CPU 100. The CPU 100 communicates with the rest of the system by means of control (CTL), address (ADDRESS) and data (DATA) lines as shown in simplified form. A buffer 104 and buffer control logic 103 serve to interface the CPU 100 to a local bus 106. Attached to this local bus 106, various system components are shown, including, for example, memory (RAM 105 and EPROMS 112) and data latch 111, and some special purpose devices. These may include the multifunction peripheral device 109 (U29 in FIGS. 27A and 27B) and serial interface 110 (U48 in FIG. 25C) as shown, which in a preferred embodiment are an Intel 82380 and 8530 respectively, or their equivalents.

The multifunction peripheral 109 connects to the local bus 106 via address and data lines and is fed by a clock 107 as shown. It receives and generates certain control signals, including generating interrupts to the Multibus I control logic 115, and receiving direct memory access (DMA) interrupts from the Multibus II message passing coprocessor 114, which in a preferred embodiment is an Intel MPC 82389 (U30 in FIGS. 32A and 32C), or its equivalent. The multifunction peripheral device 109 includes on-board a direct memory access controller, fifteen levels of interrupt, and a wait state generator. Local memory and input/output timing use the wait state generator. In this respect, it is used to control read and write strobe times by delaying the ready signal to the processor 100. The DMA function of the device 109 is used to control access to and from the 1296 BUS (Multibus II) 120 via the message passing coprocessor (CONTROL LOGIC) 114. The fifteen levels of interrupt in the device 109 are used to respond to interrupts generated by slave boards that may reside on the 796 BUS (Multibus I) 121.

The serial interface device 110 connects to the local bus 106 to send and receive data over data lines as shown, facilitating serial data communication with, for instance, a standard terminal device (not shown). The device may provide two serial channels.

The data latch 111 connects to the local bus 106 to receive data over data lines as shown.

The programmable read only memory (ROM) 112 and the random access memory (RAM) 105 attach to the local bus 106 with address and data lines as shown, for storage and retrieval of program instructions and data.

The Multibus II message passing coprocessor (CONTROL LOGIC) 114 is connected to the multifunction peripheral 109 as described above. Coprocessor 114 connects to an interconnect device 113, which in a preferred embodiment is an Intel 8751 microcontroller (U49 in FIG. 29B), or its equivalent, via control (CTL) and address/data lines (A/D). Coprocessor 114 is also connected to the Multibus II bus 120 (1296 BUS) via buffers 118 using address/data lines (A/D). Buffers 118 are also connected to the interconnect device 113 by control (CTL) lines. The Multibus II message passing coprocessor 114 is designed to function as a Multibus II controller. It has a bus interface and several transmit and receive FIFO's (first-in first-out registers) which are used to pass messages over the Multibus II bus. The interconnect device 113 provides a convenient way to augment the Multibus II message passing coprocessor 114 to interface with the Multibus II bus 120 and the rest of the system, described below.

The interconnect device 113 is connected to the Multibus II message passing coprocessor 114 and buffers 118 as described above. It is fed by an 11,059 MHz clock signal from clock 108. The interconnect device 113 receives signals from reset control logic 116, and outputs control signals to both the buffers 118 as earlier described, and to bus interface signal test light emitting diodes 117 (BIST LEDS), used for test and diagnostic purposes. Interconnect device 113 includes registers and programmable memory useful in interfacing the Multibus II message passing coprocessor 114. Interconnect device 113 provides what is known as "interconnect space." This interconnect space is implemented as an EPROM (electronically programmable read only memory) area where board identification information is stored. The interconnect device 113 also functions to disable the Multibus II interface devices (114, 118) and reset the processor 100 if the processor 100 does not write to the Multibus II control logic 114 within the first twenty seconds after power-up of the system as a fault check.

The reset control logic 116 causes the interconnect device 113 to reset the processor 100 as just described.

The bus interface signal test LED's 117 (BIST LEDS) are connected to receive control signals (CTL) from the interconnect device 113 for testing and diagnostic purposes as shown.

Figure 11A:
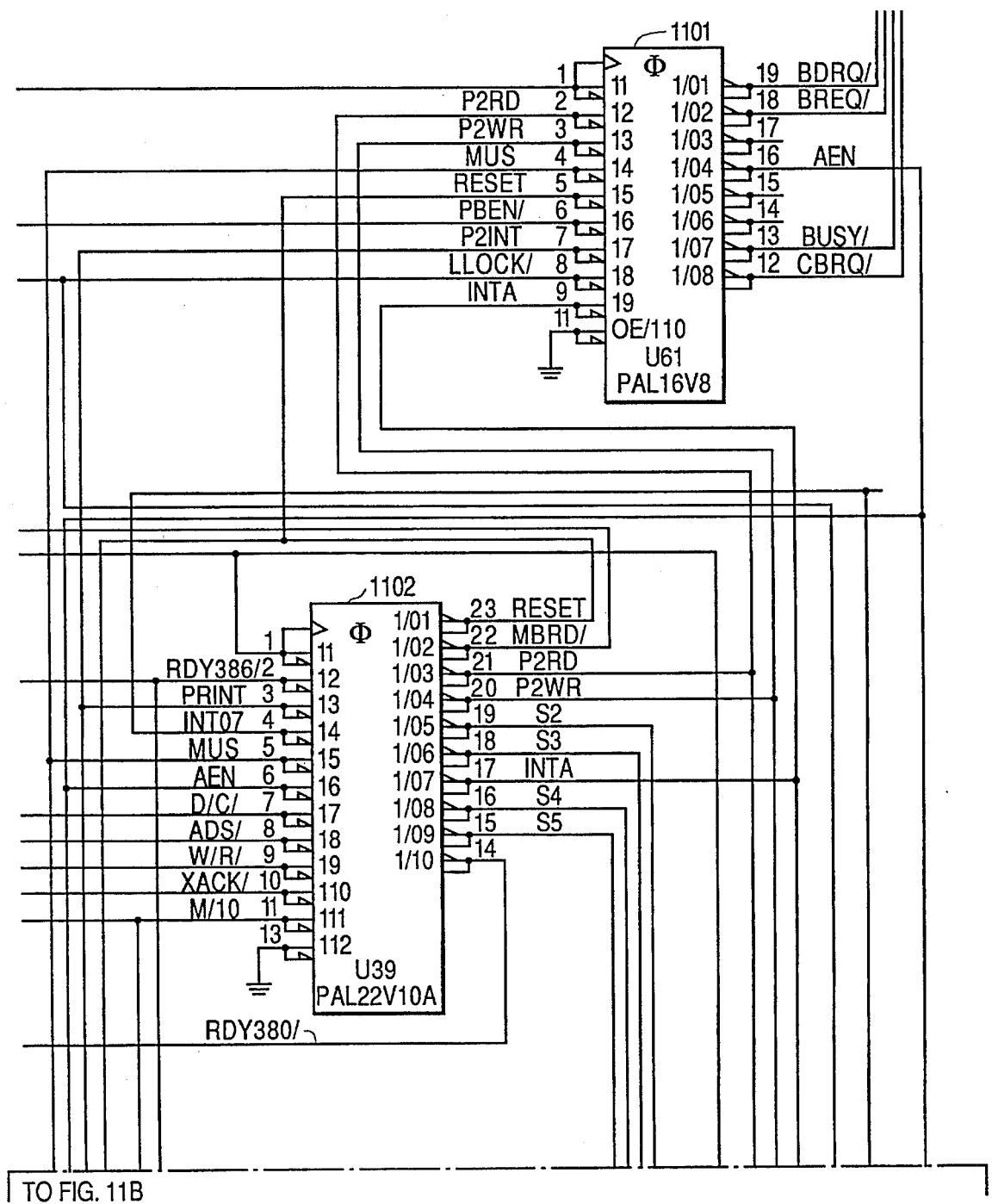
FIGS. 11A and 11B are a schematic diagram of a Multibus I control logic according to an embodiment of the invention.
Figure 20:
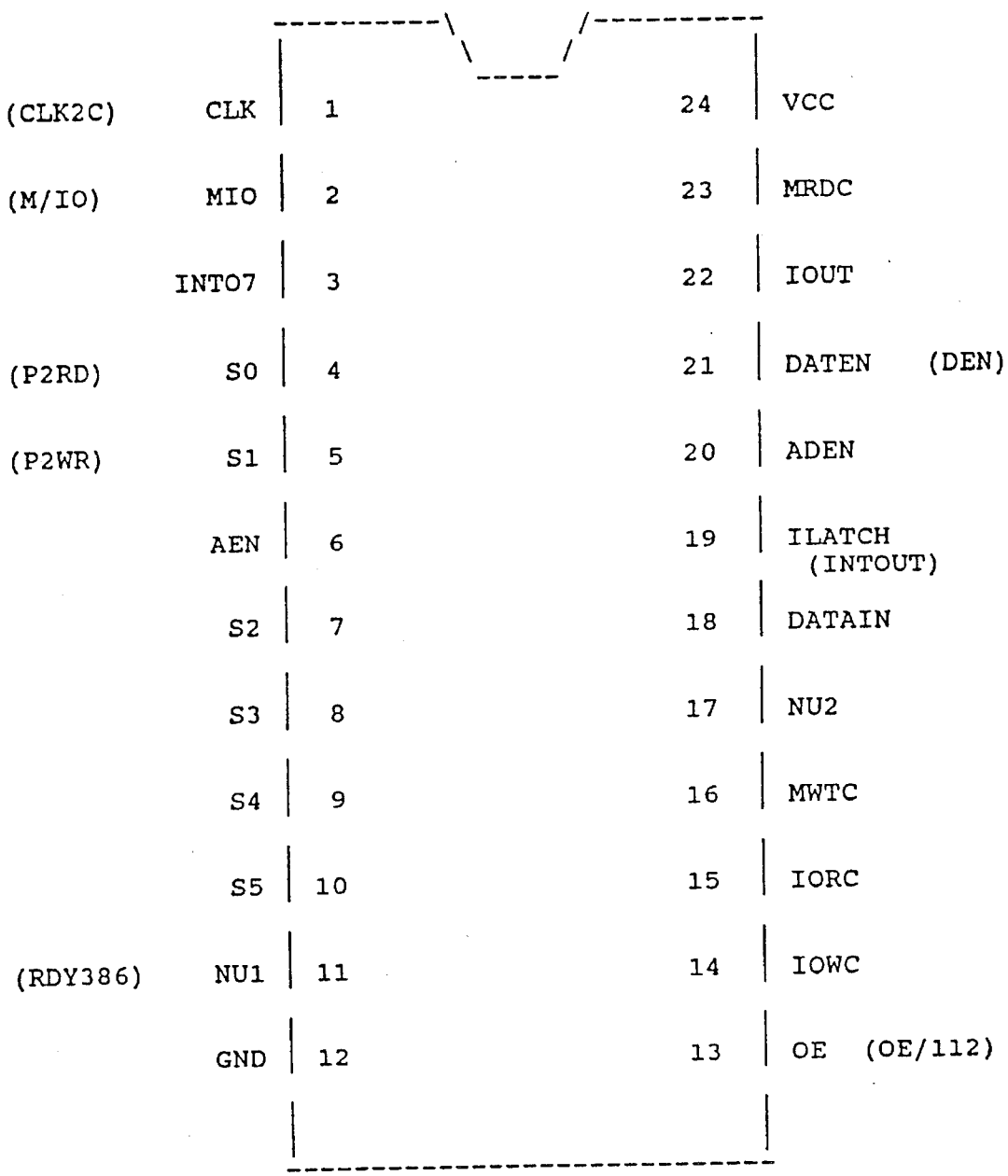
FIG. 20 is a functional black box diagram of an embodiment of a latch control PLD according to the invention.

The Multibus I control logic 115 is comprised of several programmed logic devices in a preferred embodiment (shown in more detail in FIGS. 11A. 11B and 26A to 26D). These include a master bus controller PLD (U39, FIG. 2), an arbiter PLD (U61, FIG. 16), a decoder PLD (U35, FIG. 21) and a latch controller PLD (U36, FIG. 20 to 20C). The master bus controller PLD is described in detail below. The arbiter PLD, in cooperation with the rest of the preferred embodiment, essentially performs all of the functions that a conventional Intel 8289 performs, while the latch controller PLD, in cooperation with the rest of the preferred embodiment, essentially performs all of the functions that a conventional Intel 8288 performs. The control logic 115 receives signals (INTERRUPTS) from the multifunction peripheral device 109 and outputs control signals (CTL) to buffers 119 which connect to the Multibus I bus 121. These buffers 119 also connect to the local bus 106 via address and data lines. The Multibus I control logic 115 is composed of the programed logic devices (PLD's) mentioned above which perform, in cooperation with the rest of the preferred embodiment, the functions required of a Multibus I bus controller and arbiter in a superior manner than the conventional Intel 8288 and 8289 devices.

Master Controller U39

Figure 2:
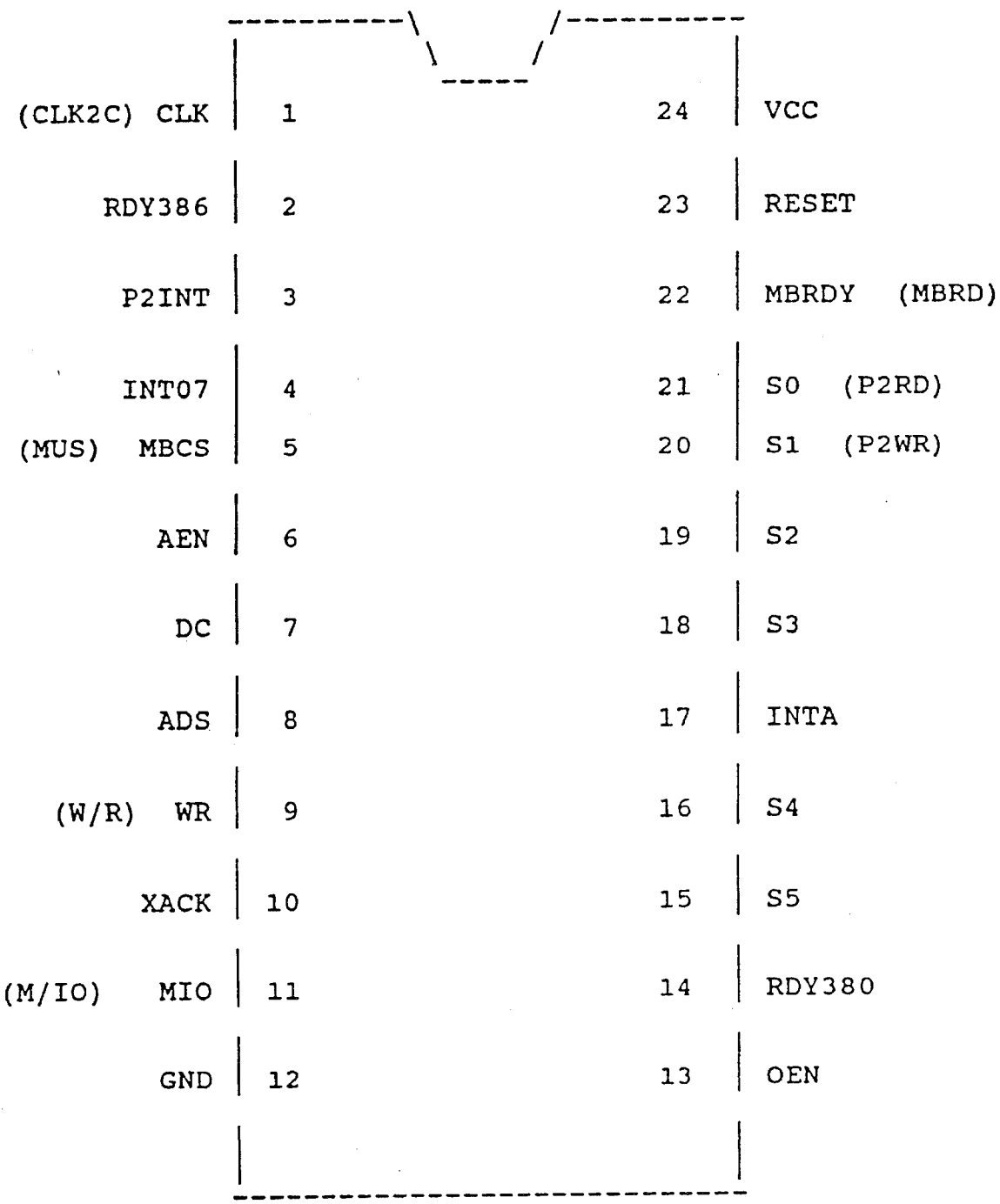
FIG. 2 is a functional black box diagram of a master bus (multibus I) control device according to an embodiment of the invention.

A master bus controller implemented as a program logic device (PLD), described as a state machine, according to a preferred embodiment of the invention is shown in FIG. 2 (also 1102 in FIG. 11A). For the master bus controller shown in FIG. 2, the signals labeled around the periphery thereof are set forth in the table below (see also FIG. 18). Numbers in parenthesis are pin numbers.

| CLK (1) | 40 MHz clock |
|---|---|
| RDY386 (2) | Ready signal to '386 CPU |
| P2INT (3) | Multibus I interrupt |
| INT07 (4) | Multibus I interrupt request |
| MBCS (5) | Multibus I chip select |
| AEN (6) | Arbiter enable |
| DC (7) | Data code control signal from CPU |
| ADS (8) | Address data strobe signal from CPU |
| WR (9) | Write/read from signal from CPU |
| XACK (10) | Multibus I acknowledge |
| MIO (11) | Memory or Input/Output signal from CPU |
| GND (12) | ground |
| OEN (13) | output enable |
| RDY380 (14) | Ready signal from 82380 |
| S5 (15) | State five |
| S4 (16) | State four |
| INTA (17) | Interrupt cycle active |
| S3 (18) | State three |
| S2 (19) | State two |
| S1 (20) | State one |
| S0 (21) | State zero |
| MBRDY (22) | Multibus ready |
| RESET (23) | Processor reset |
| VCC (24) | supply voltage |

Figure 3:
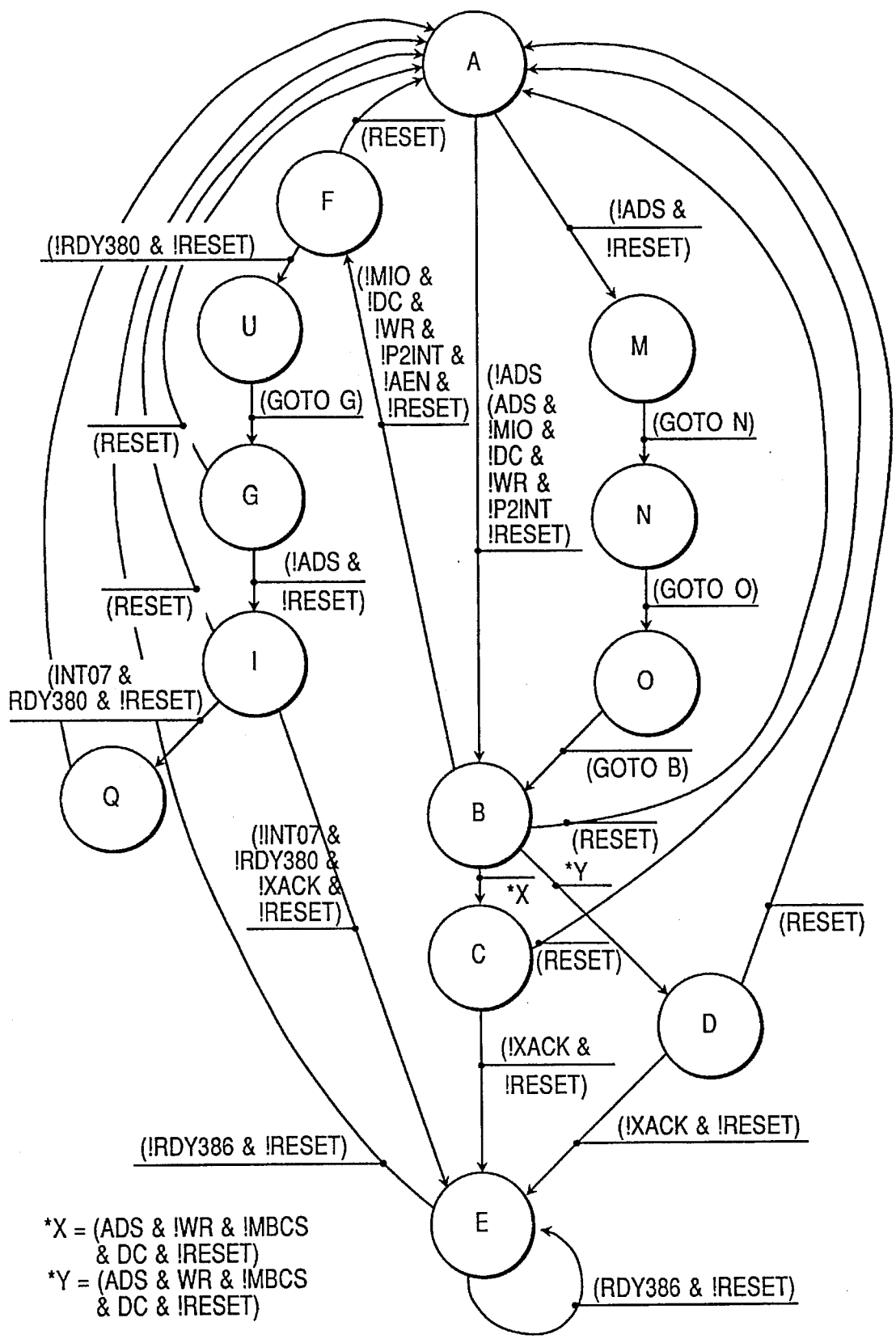
FIG. 3 is a state diagram for the master bus controller according to an embodiment of the invention.

The state diagram of a master bus controller according to the preferred embodiment of the invention is shown in FIG. 3 and listed in tabular form in FIG. 19. The master bus controller according to FIG. 3 has twelve states which define the sequence of its operation. The signals which cause a transition between the states are shown in FIG. 3, and are also listed in the table of FIG. 19.

Referring to FIG. 3, and beginning with state "A" the transitions between states in the preferred embodiment will now be described. The "!" is read as "NOT". As can be readily seen, the only transition paths out of state "A" are into states "B" and "M". The transition path logic is as follows: if (!ADS & !RESET) then go to state "M"; else if (!ADS & !MIO & !DC & !WR & !P2INT & !RESET) then go to state "B"; else stay in state "A". In other words, if the signals Address Data Strobe (ADS) and Processor reset (RESET) are negative, then transition to state "M" from state "A" will occur. And, if the signals Address Data strobe (ADS), Memory or input/output control signal from the CPU (MIO), Data code (DC), Write/read from CPU (WR), Multibus interrupt (P2INT), and Processor reset (RESET) are negative, then transition to state "B" from state "A" will occur. If neither of these if's occur, then there is no transition out of state "A". The first "if" corresponds to the Multibus cycle, and the second "if" to the interrupt (INTA) cycle.

The other state transitions proceed as shown in FIG. 3 and are tabulated in FIG. 19 in the same manner as described above, each transition path being defined by a set of signals causing the transition.

For instance, the transition from state "B" to state "D" corresponds to the Multibus write cycle. The transition from state "B" to state "C" corresponds to the Multibus read cycle. The transition from state "B" to state "F" corresponds to the first Multibus interrupt cycle. The transition back to state "A" from state "B"(and the other states) is a reset condition.

As can be determined from the table in FIG. 19, the remaining states and their corresponding activities or indications are listed below:

States M, N and O: (delay states three cycles before B)
State U: (end of first INTA cycle)
State G: (generate ready for end of first INTA cycle)
State I: (next or second INTA cycle started)
State Q: (goto A)
State E: (wait for ACK then end)

Figure 11B:
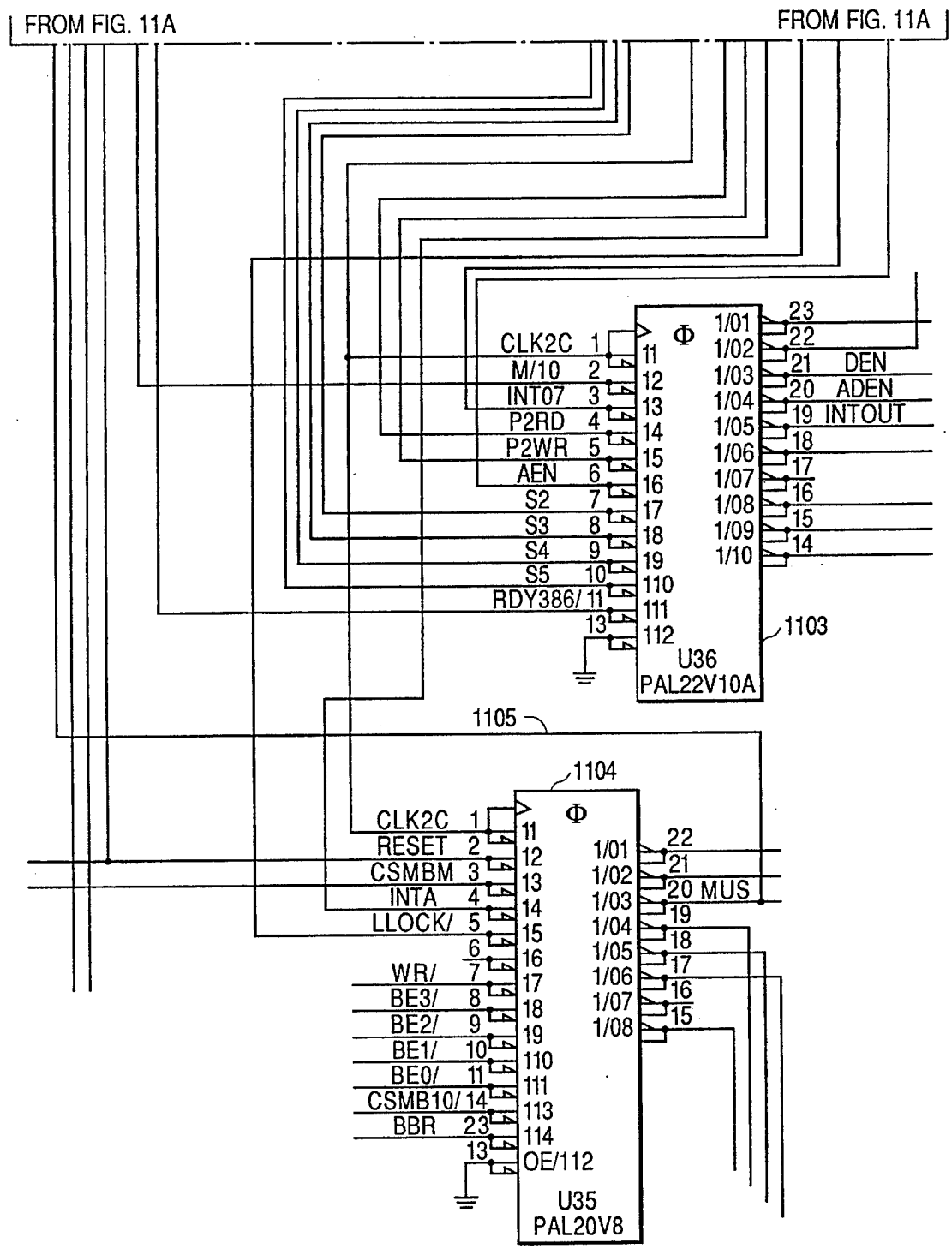

The master bus controller PLD is interconnected with the other PLD's which together make up the Multibus I control logic 115 as is shown in FIGS. 11A and 11B, and discussed in more detail below.

Slave bus interface

Figure 4:
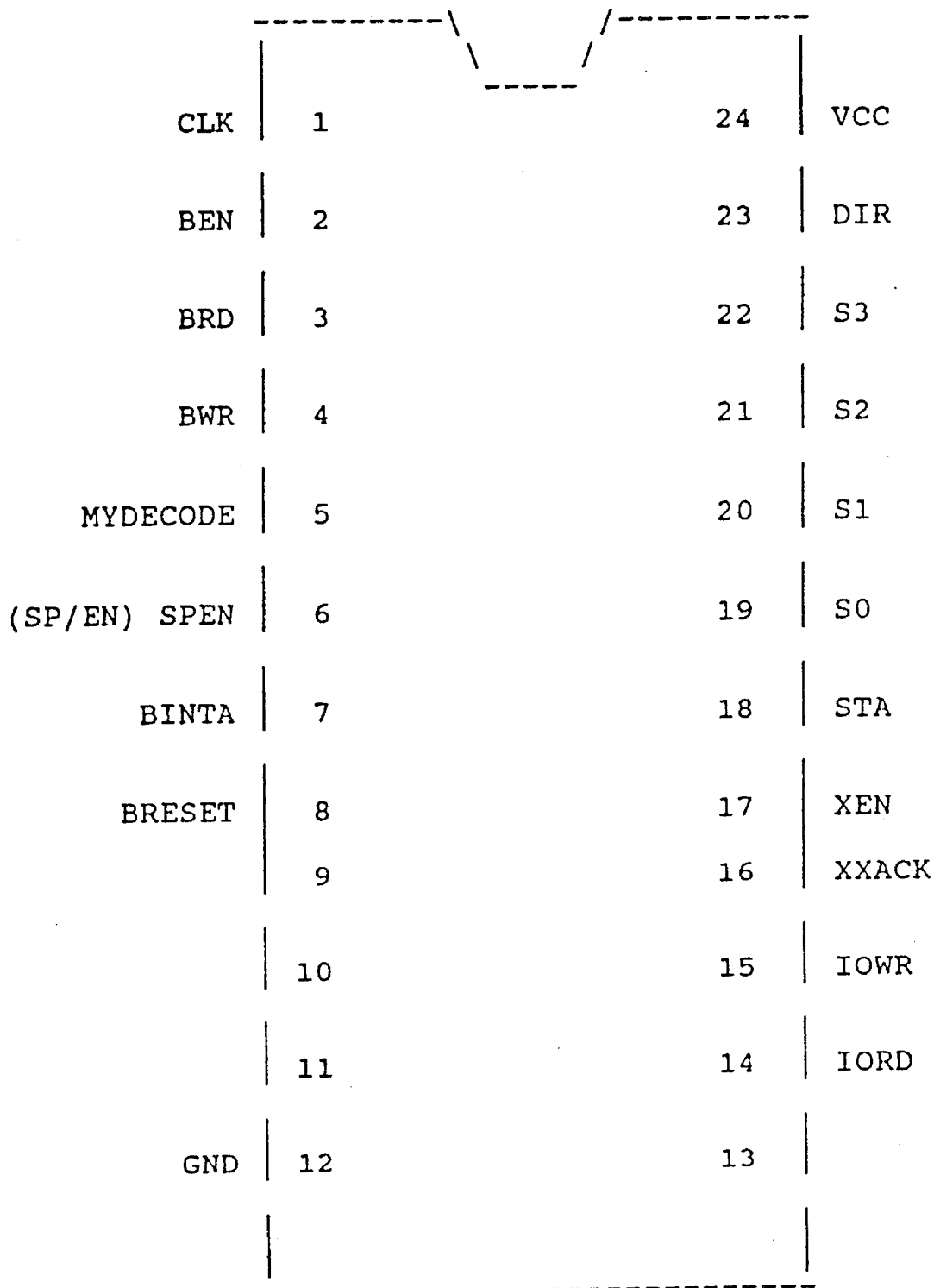
FIG. 4 is a functional black box diagram of a multibus slave interface control device according to an embodiment of the invention.
Figure 5:
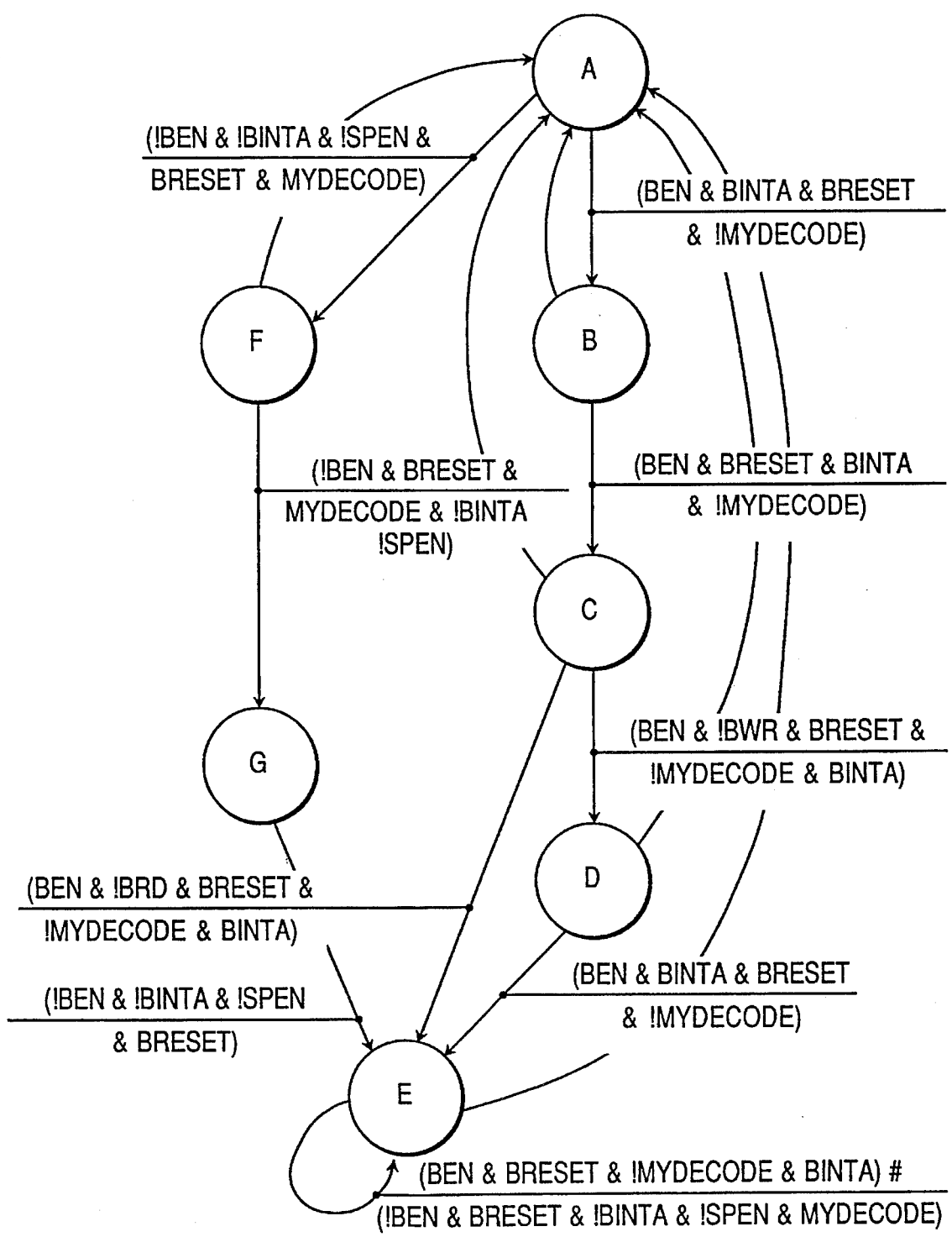
FIG. 5 is a state diagram for the multibus slave interface face control device of FIG. 4.

A functional black box diagram of a slave interface controller which connects to the Multibus I bus and is thereby controlled by the master according to a preferred embodiment of the invention is shown in FIG. 4. Definitions and test vector inputs and outputs are shown in tabular form FIGS. 4A and 4B, respectively. A state diagram of the preferred embodiment of a slave interface controller according to the invention is shown in FIG. 5. The signals which cause the transitions between states are shown in FIG. 5, in the same manner as for the master controller. The input signals (reference numbers in parenthesis) for the slave device shown in FIG. 4 are listed below:

| CLK(1) | Clock |
|---|---|
| BEN(2) | Board enable |
| BWR(4) | Board write |
| BRD(3) | Board read |
| MYDECODE(5) | This board selected |
| SPEN(6) | 8259 acknowledge of interrupt |
| BINTA(7) | Board interrupt cycle |
| BRESET(8) | System reset signal from CPU or cntr logic |

The slave interface produces the following output signals:

| DIR(23) | Direction |
|---|---|
| STA(18) | Start |
| XXACK(16) | Output complete |
| IOWR(15) | Write strobe |
| IORD(14) | Read strobe |
| XEN(17) | Enable XXACK |

The transitions between states for the slave controller are shown in tabular form in FIG. 4A and graphically depicted in FIG. 5, in the same manner as for the master controller.

FIGS. 6A to 6C, 7A to 7F and 8 are a schematic diagrams of a slave bus interface board implementation designed according to the invention. The board is designed to be a bus slave with interrupt support. The bus interface section is accessed via single even/double even byte transfers.

Figure 6A:
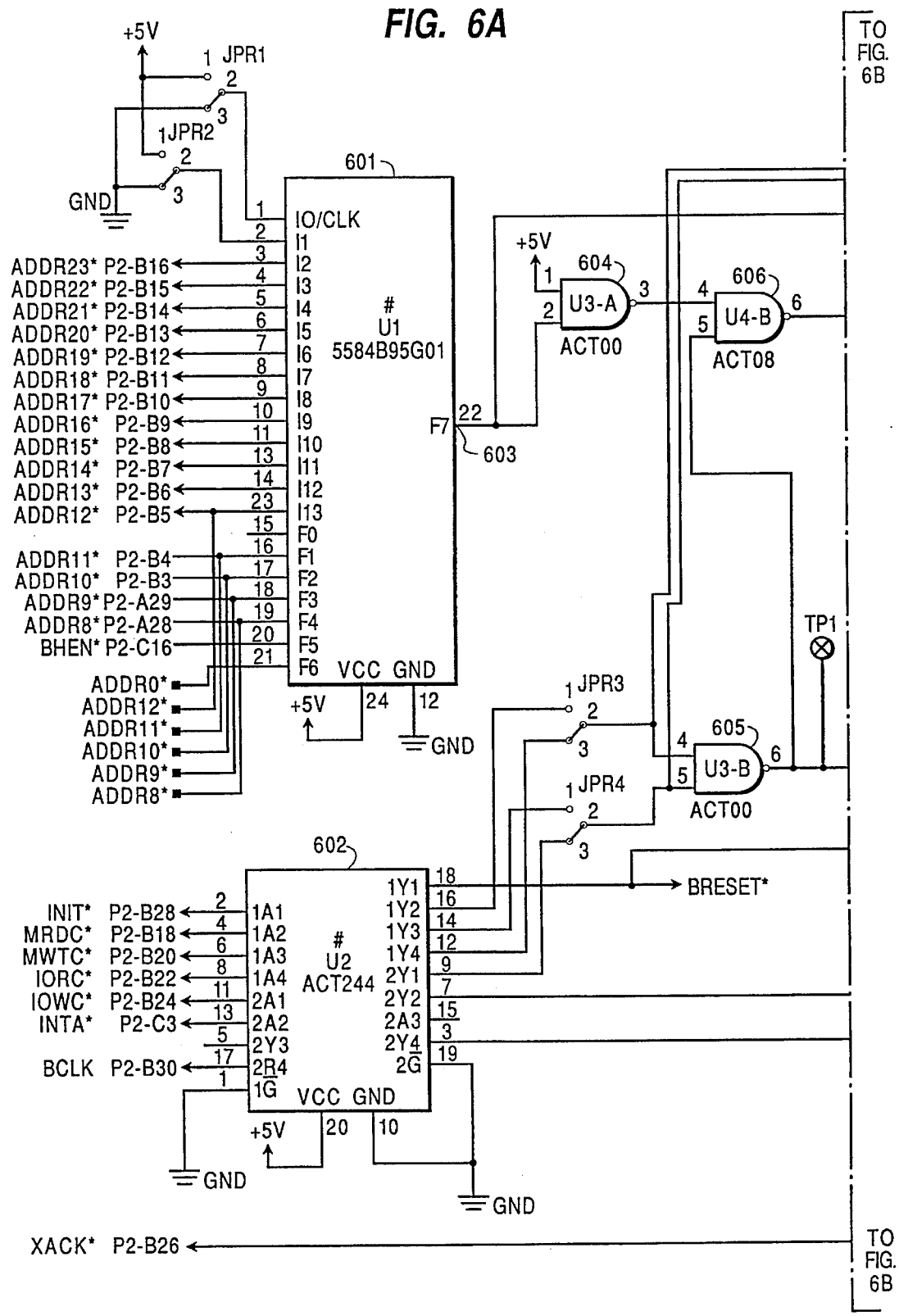
FIGS. 6A to 6C are a schematic diagram of part of a slave bus interface according to an embodiment of the invention.
Figure 6B:
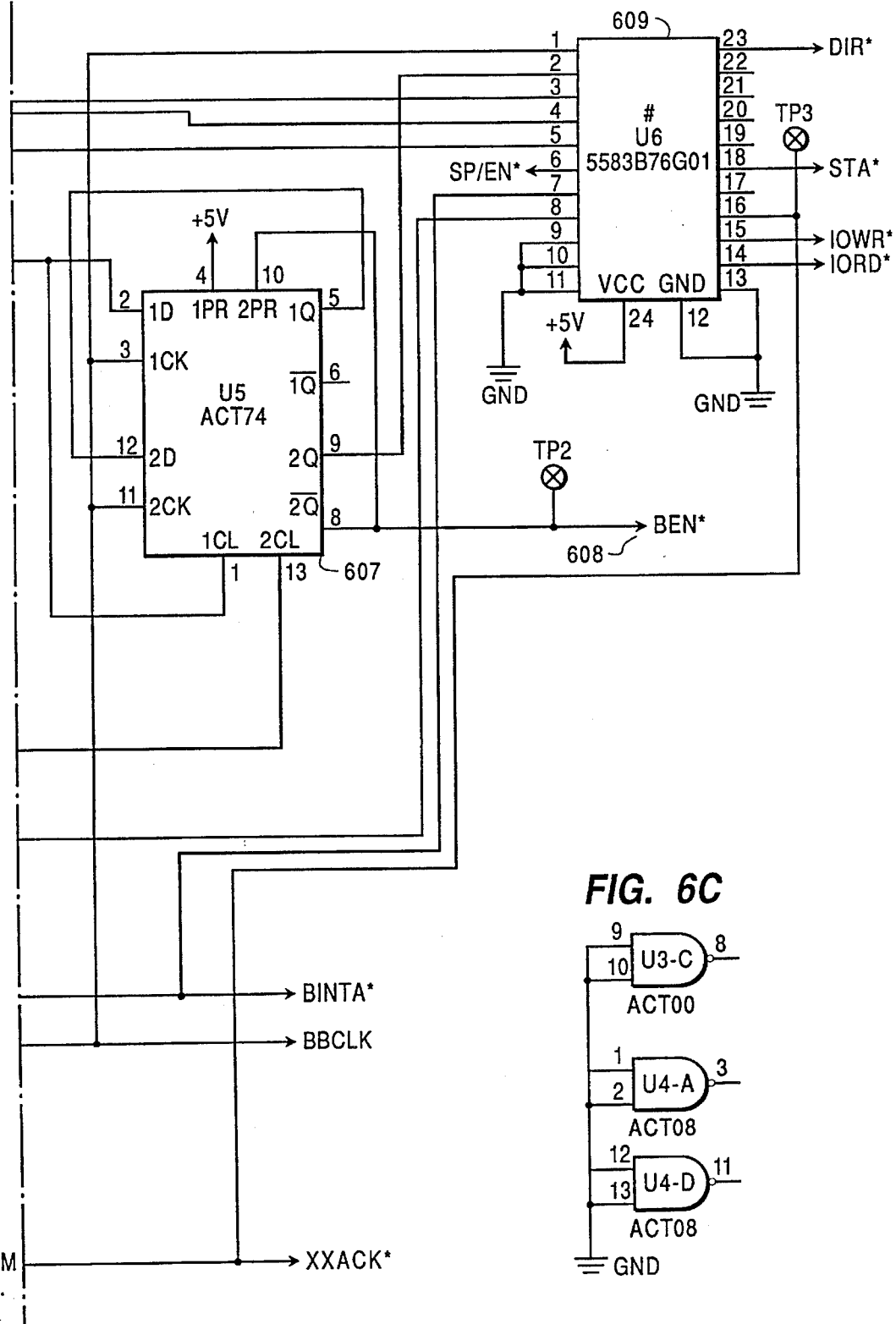
Figure 6C:
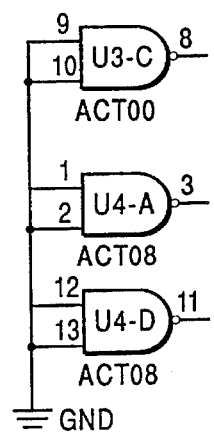
Figure 7D:
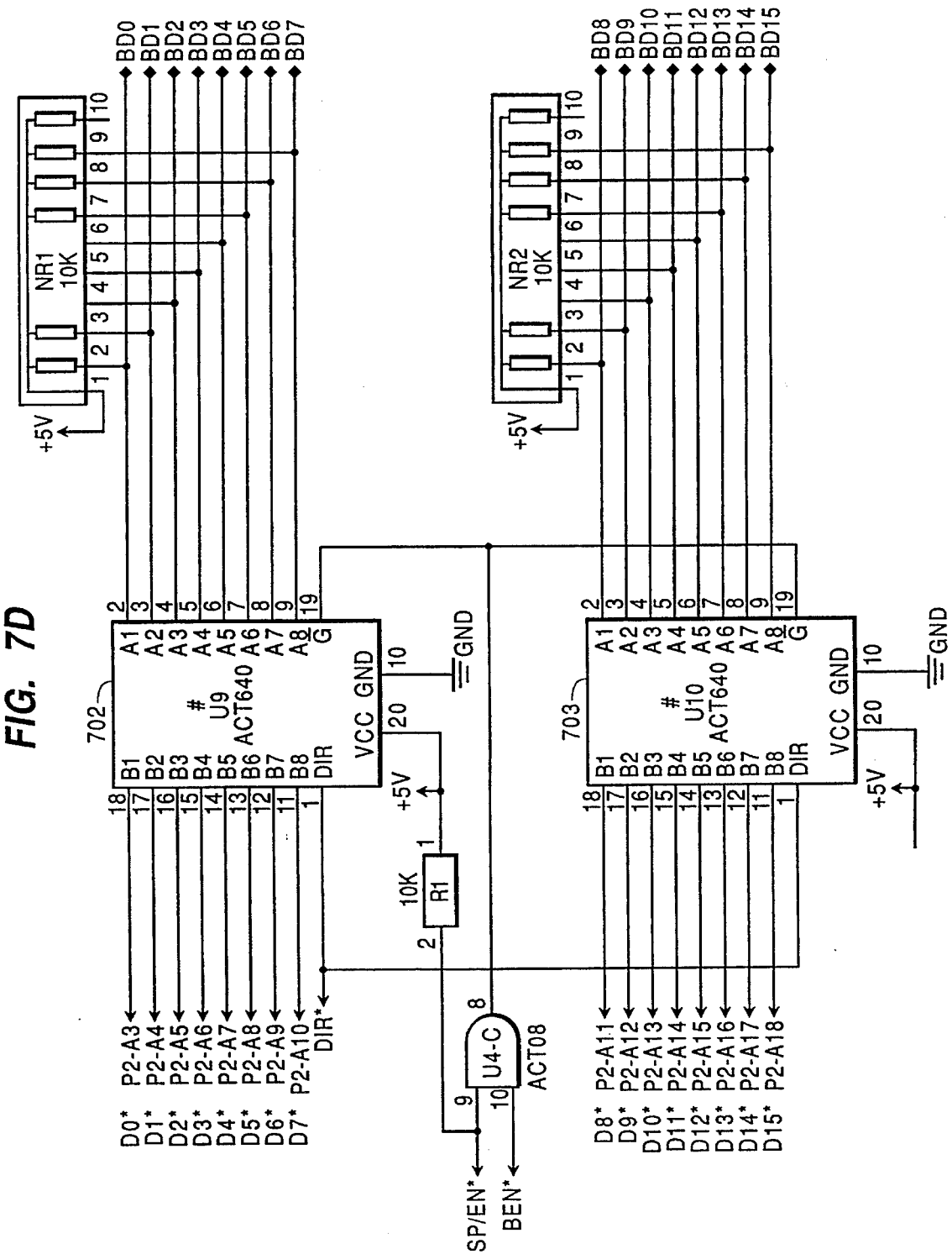
Figure 7E:
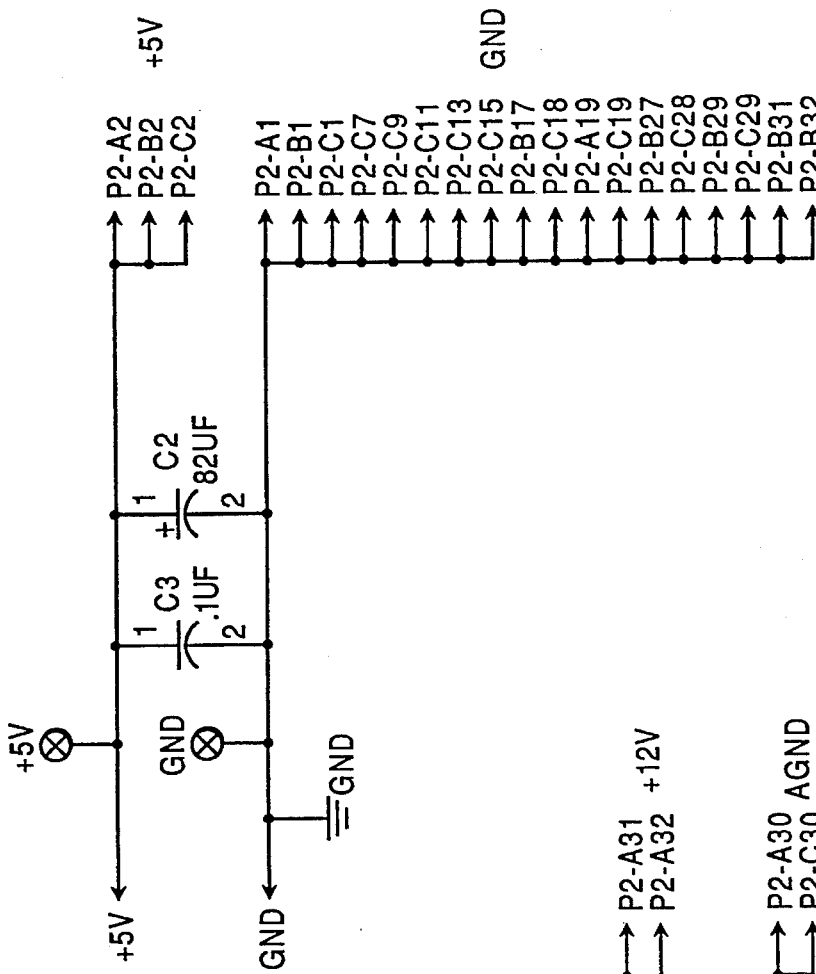
Figure 7F:
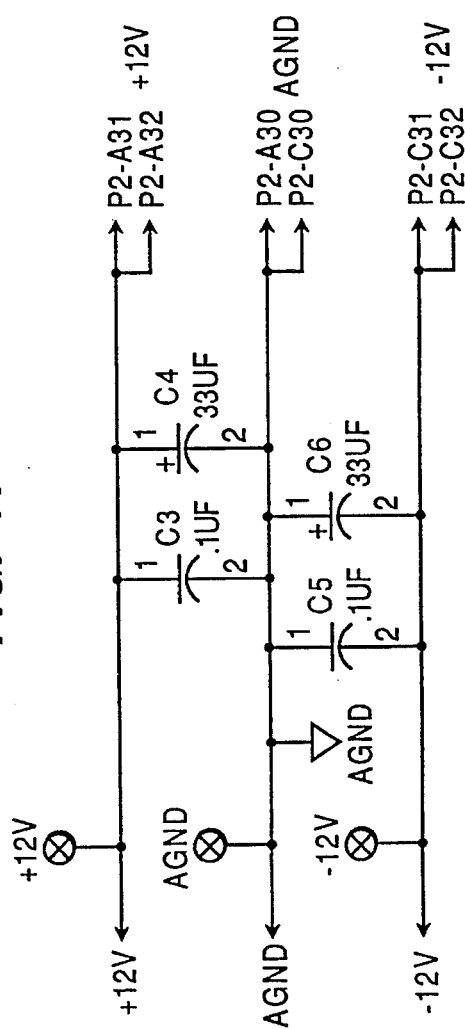

Referring to FIGS. 6A and 6B, the device 601 is used as a board address decoder. In the preferred embodiment, it is implemented as a programmed logic device (PLD). When the output pin 603 (22) goes low, the board is selected. The slave board is designed to reside at one of four sets of locations depending on the positions of the jumpers jpr1 & jpr2. This method of board decoding was chosen so that on jobs which require more than one slave board, the boards can be interchanged easily without having to make any firmware changes.

Device 602 is used to buffer several control bus signals from the master that are used on the board. In the preferred embodiment, this device is a 54FCT244 or equivalent. The memory read and write signals (MRDC & IORC) (MWTC & IOWC), bus clock (BCLK), and the reset (INIT) signals are buffered by this device. The device also buffers the interrupt acknowledge signal (INTA). The Multibus I acknowledge (XACK) is not buffered as can be seen.

Devices 604, 605, 606 and 607 are used to generate the board enable signal (BEN) 608 which indicates this board is being accessed by the present bus cycle. Two levels of D-type flip-flops are necessary to synchronize them with the 10 MHz timing clock. The signal BEN 608 is kept high by feeding the inverted output of device 607 pin 10 back to the PRESET pin. Device 605 is used to NAND together the read and write strobes. The output of device 605 is then fed to the clear line of device 607 (pin 13). This will remove the BEN signal 608 once the read or write strobe goes away. By using the read or write strobe to clear the BEN signal 608, it is ensured that all the bus cycles are received.

Device 609 is the slave control programmed logic device (PLD) in a preferred embodiment as was described with reference to FIGS. 4, 4A, 4B and 5 above. Device 609 has ten registered outputs, several of which are used to form a mode state machine (S0, S1, S2, S3, S4) which is clocked by the rising edges of a 10 MHz timing reference. The on-board control signals (DIR, STA, XACK, IOWR, IORD) are produced at the remaining five outputs. Eight of the device's pins are used to input control signals. The slave control logic 609 generates the timing read and write strobes for the slave board only. When the read or write is completed, it drives the XACK line to signal the master that it has finished.

Figure 8:
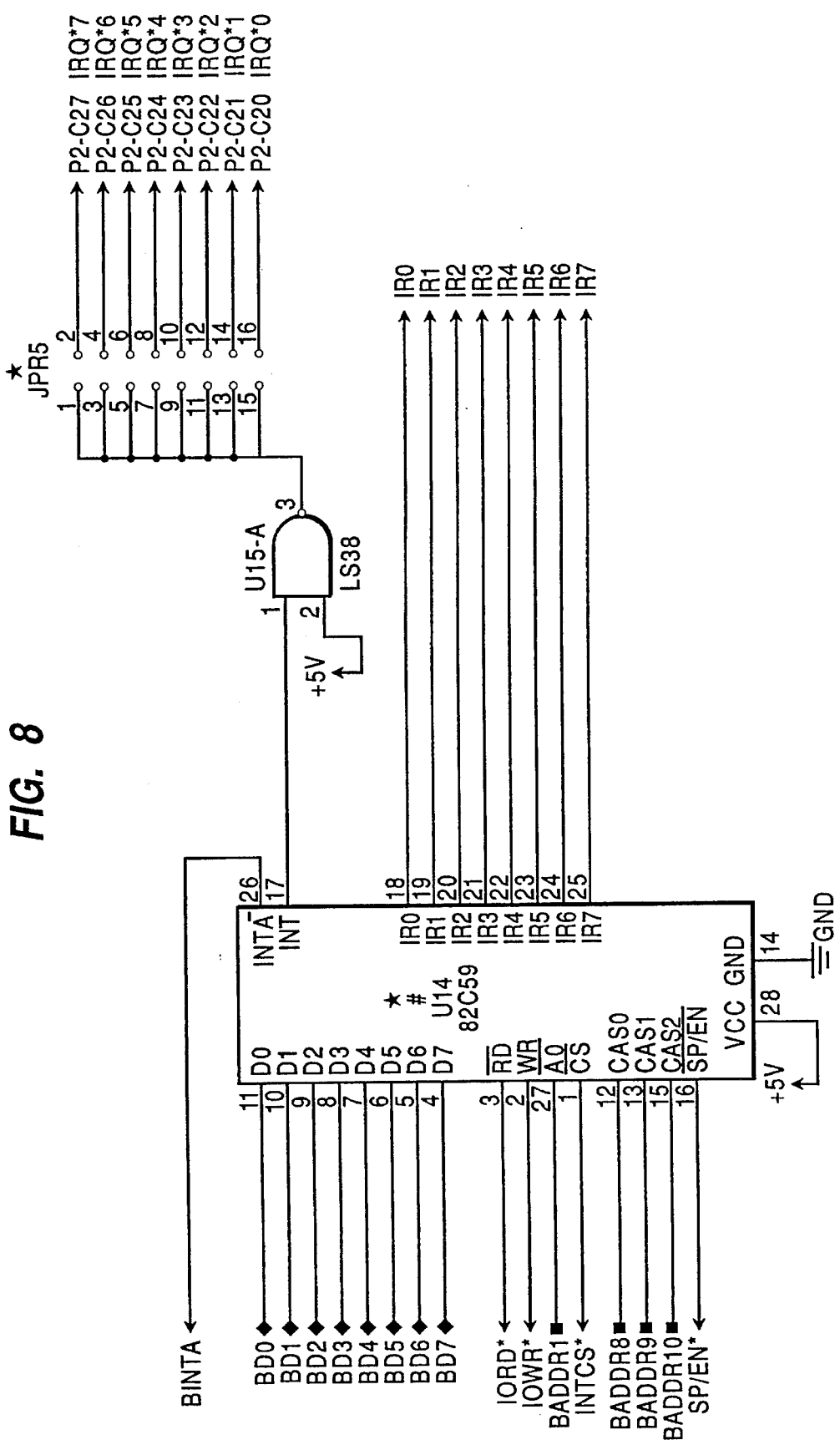
FIG. 8 is a schematic diagram of part of a slave bus interface according to an embodiment of the invention.

Referring now to FIGS. 7A to 7F, device 701 is used to buffer, invert and latch some of the address lines used. Devices 702 and 703 are data buffers and are enabled/disabled by the signal BEN 608 or SP/EN. FIG. 8 is more of the slave controller circuitry, showing the interrupt generating circuit which generates interrupt signals for the bus.

Figure 9:
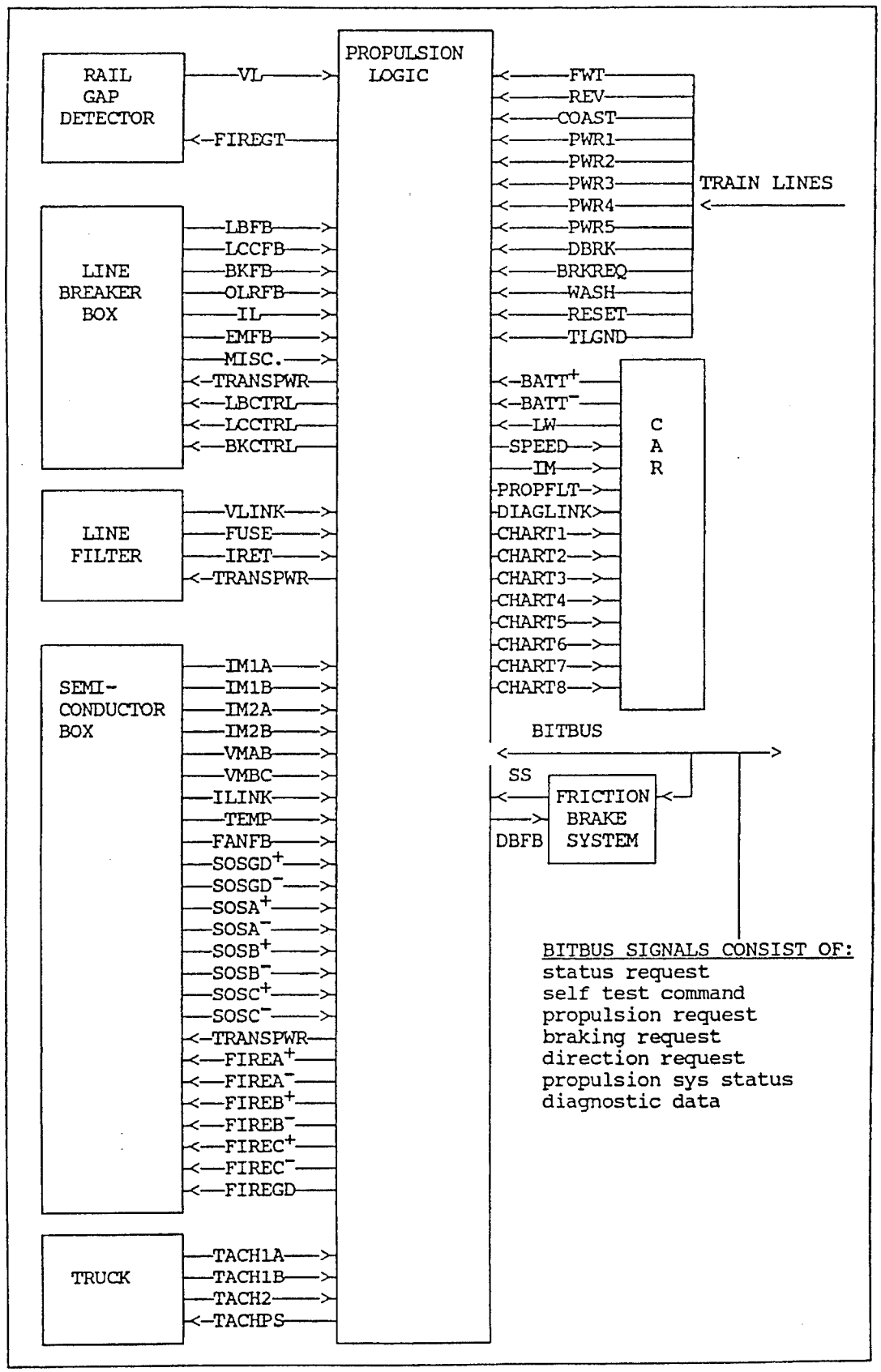
FIG. 9 is a block diagram showing an example of a propulsion control system in which the invention may be practiced sown in block diagram form.
Figure 10:
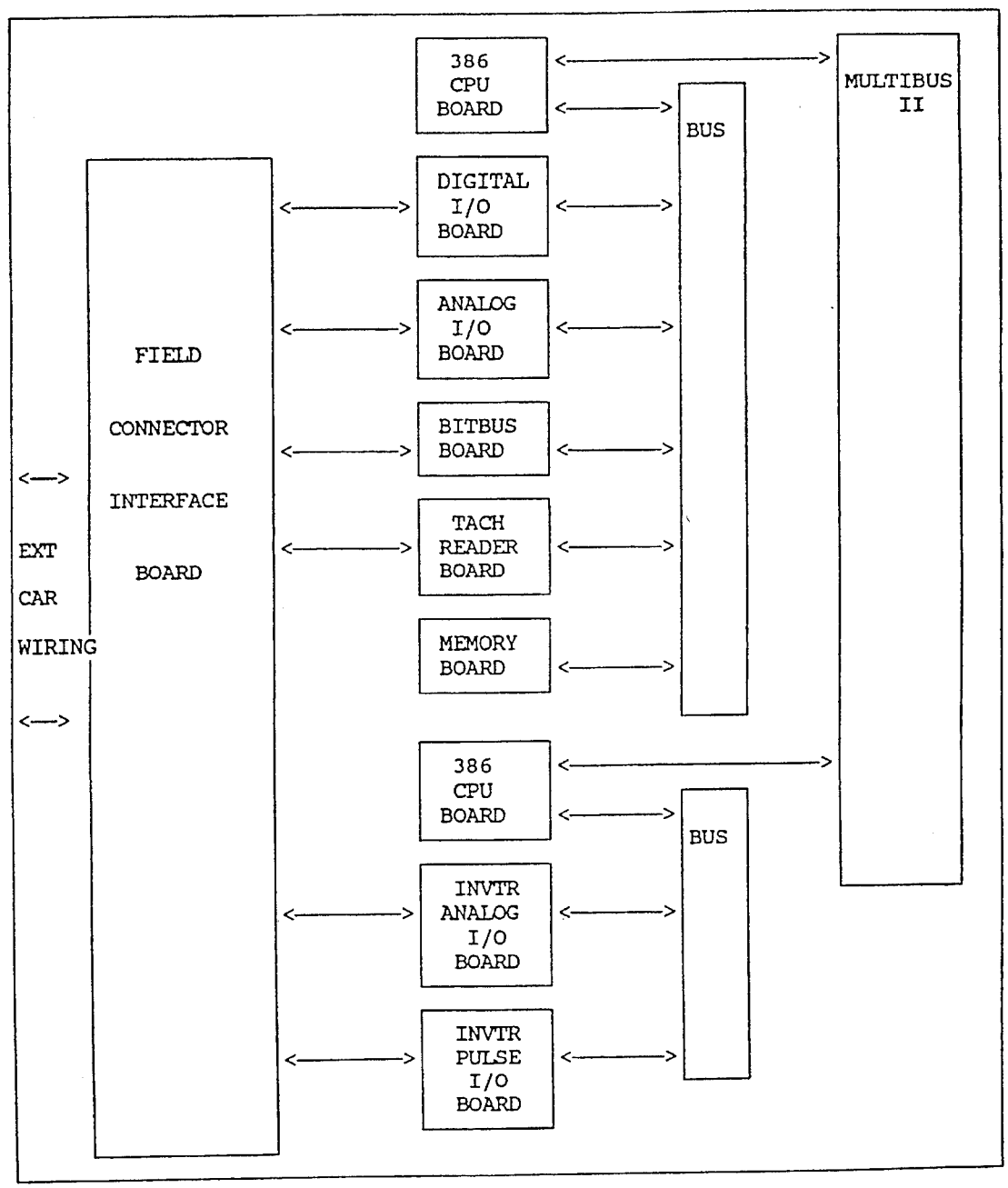
FIG. 10 is a block diagram showing an example of a propulsion logic signal flow diagram for a system in which the invention may be practiced.

Referring now to FIGS. 9 and 10, shown in block diagram form is a propulsion control system and a propulsion logic signal flow diagram, respectively, which illustrate a system in which the propulsion control system central processing unit board of the present invention is used. Various signals are used by the propulsion control system to control the operation of a subway car.

Referring now to FIGS. 11A and 11B, the master bus controller U39 described above (item 1102) is shown connected to the other PLD's (1101, 1103, 1104) which comprise the Multibus I master control logic 115 in an embodiment of the invention. PLD 1101 is the arbiter, PLD 1103 is the latch controller and PLD 1104 is the decoder. The arbiter PLD performs the functions that a conventional Intel 8289 or its equivalent performs, while the latch controller PLD performs the functions that a conventional Intel 8288 or its equivalent performs. Decoder PLD 1104 decodes input signals to produce the signal 1105 which corresponds to the Multibus I chip select (MBCS) signal fed to the master bus controller 1102 and arbiter 1101.

Figure 12:
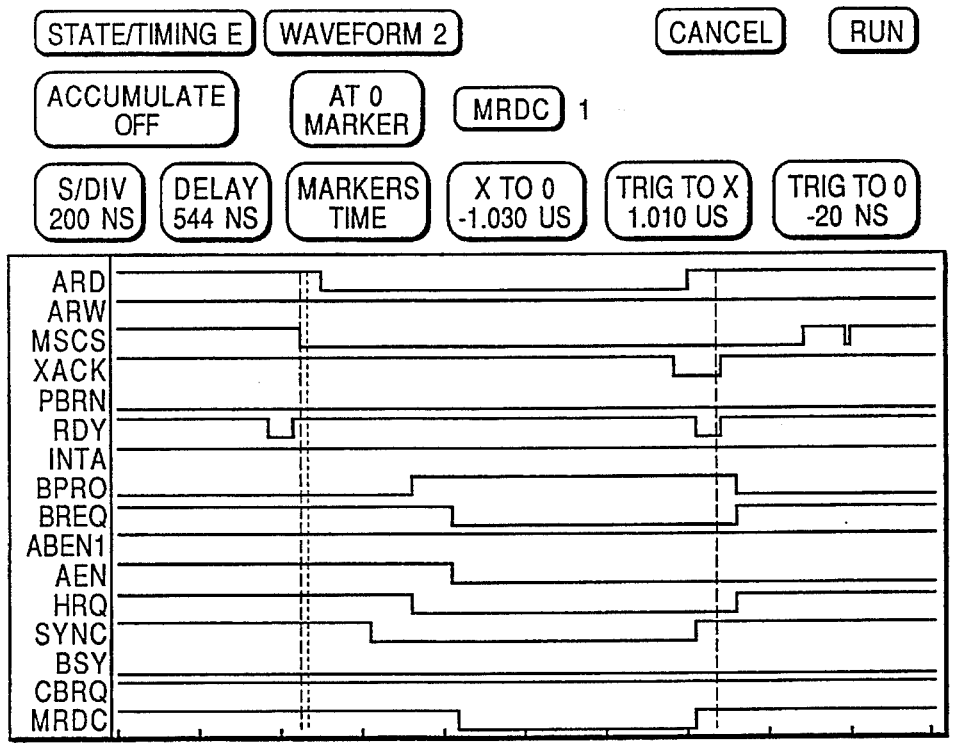
FIG. 12 is a timing diagram for read timing according to an embodiment of the invention.
Figure 13:
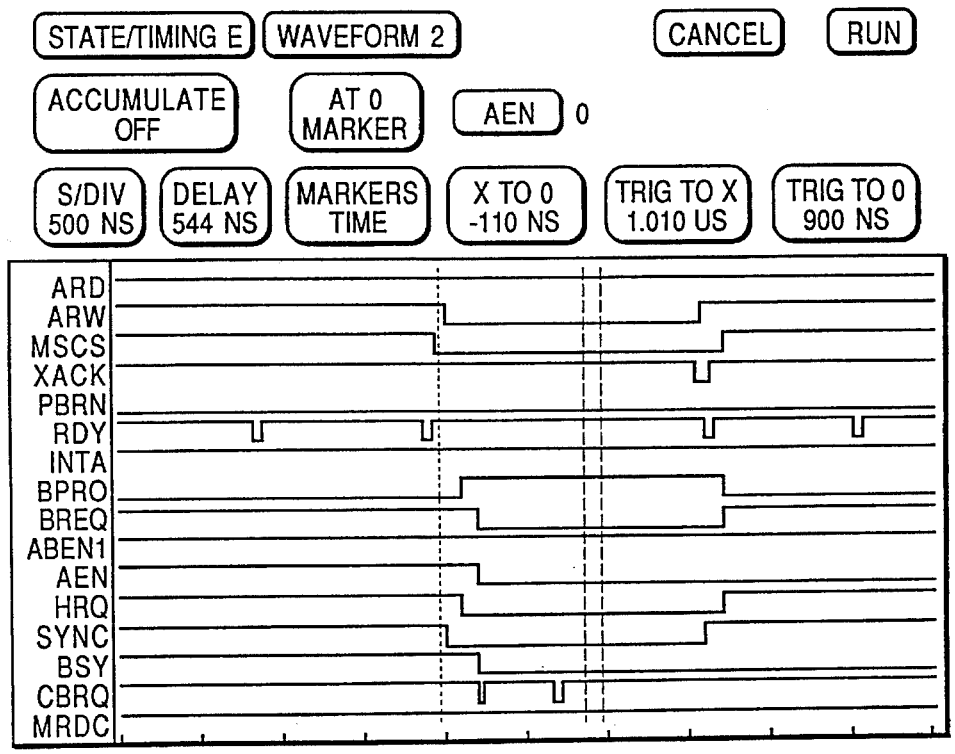
FIG. 13 is a timing diagram for write timing according to an embodiment of the invention.

Referring to FIGS. 12 and 13, shown is a timing diagram for read timing in FIG. 12, and FIG. 13 shows a timing diagram for write timing for the CPU board, according to the present invention.

Figure 14A:
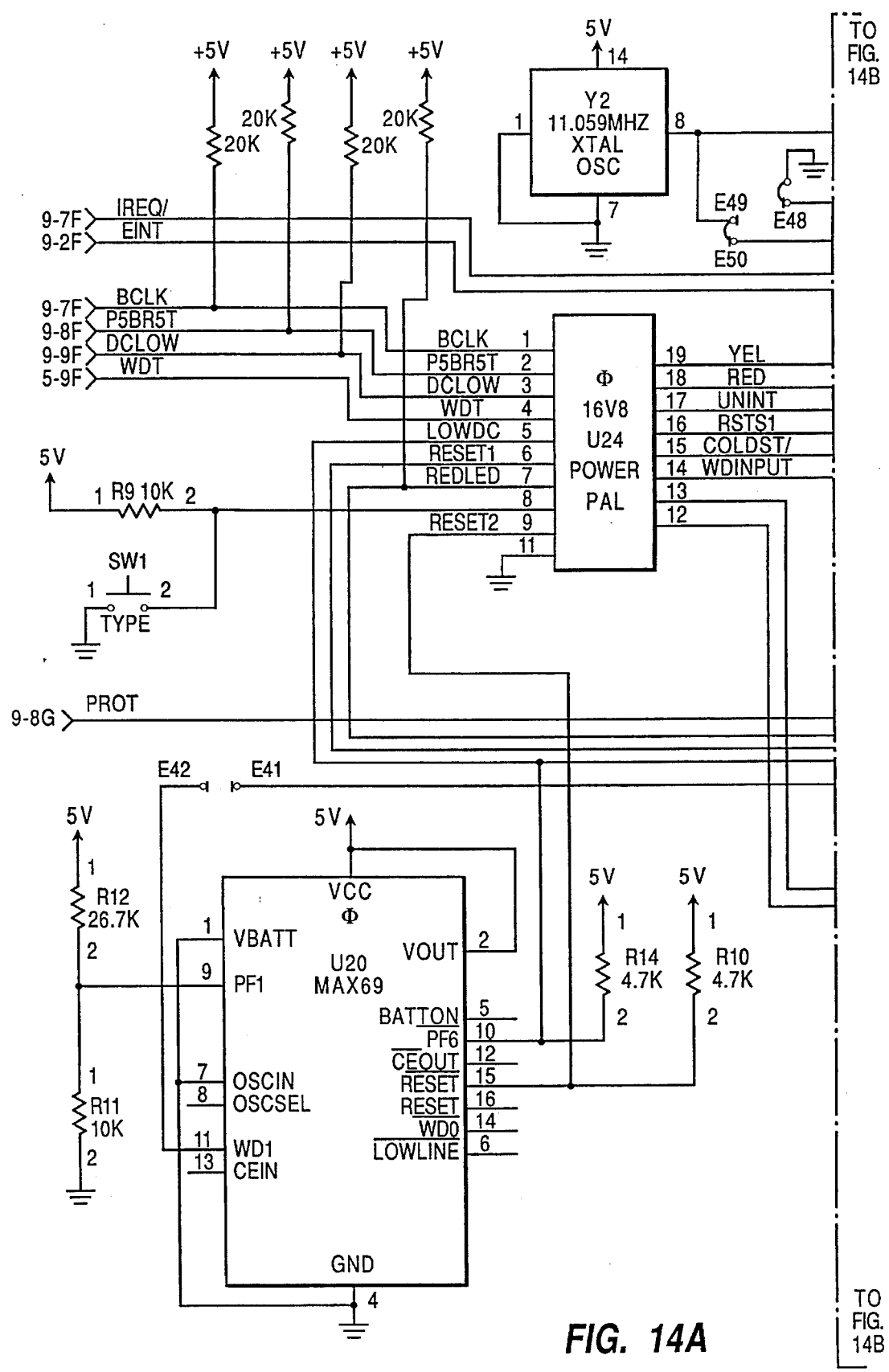
FIGS. 14A and 14B are a schematic diagram of a part of a Multibus II system illustrating the interconnect device and power PLD with pull-up resistors interconnected to the system and the removable feature according to one aspect of the invention.
Figure 14B:
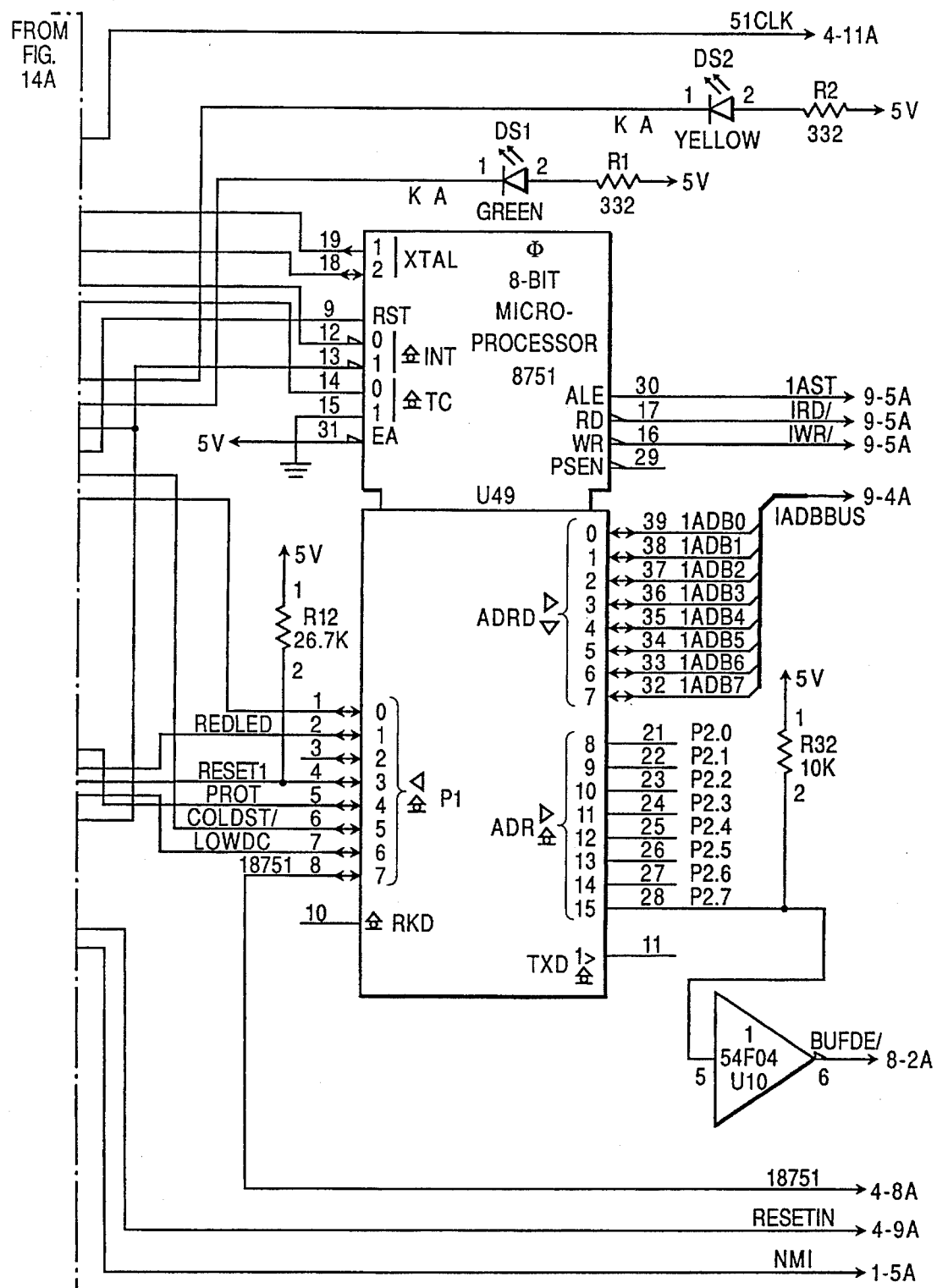

Referring now to FIGS. 14A and 14B, shown is a circuit diagram of the removable Multibus II feature according to one aspect of the invention. The Multibus II interface resident on the board may not be required for all applications and has been designed to be removable with this in mind. As described in more detail later, certain support circuitry is required if the Multibus II interface is removed. FIGS. 14A and 14B show the interconnect device U49 (113) and power PLD U24 with pull-up resistors interconnected to the system.

Figure 15:
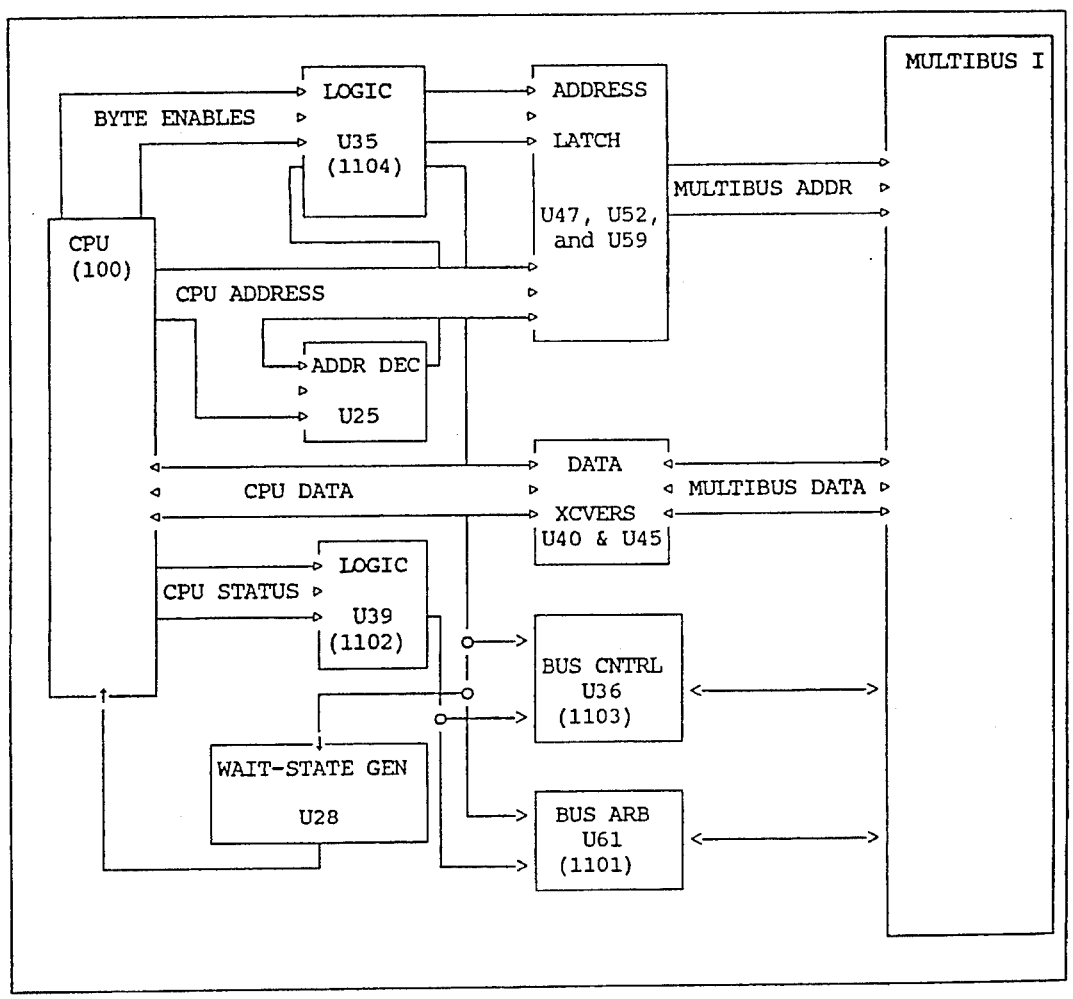
FIG. 15 is a block diagram of a modified 80386 Multibus I Interface according to the invention.

Referring now to FIG. 15, shown is a block diagram of an embodiment of a modified architecture of an 80386 Multibus I Interface according to the invention, showing how PLD's 1101, 1102, 1103 and 1104 replace and expand the capabilites over conventional devices and architecture to form the Multibus I control logic 115 of FIG. 1.

Referring now to FIGS. 16 and 17, arbiter PLD U61 (1101) is shown and specified in tabular form, including the state equations and pin definitions, respectively. In the preferred embodiment, the device performs the multibus arbiter function as described above.

Referring now to FIGS. 18 and 19, listed are the specifications for a preferred embodiment of the master controller PLD U39 (1102), described above with respect to FIGS. 2, 3 and 11A to 11B, including the state equations and pin definitions.

Referring now to FIGS. 20, 20A, 20B and 20C, shown and listed in tabular form is a preferred embodiment of the latch controller PLD U36 (1103) and its specifications, including equations and pin definitions, and test vectors in two parts, respectively, described above with respect to FIGS. 11A to 11B.

Figure 21:
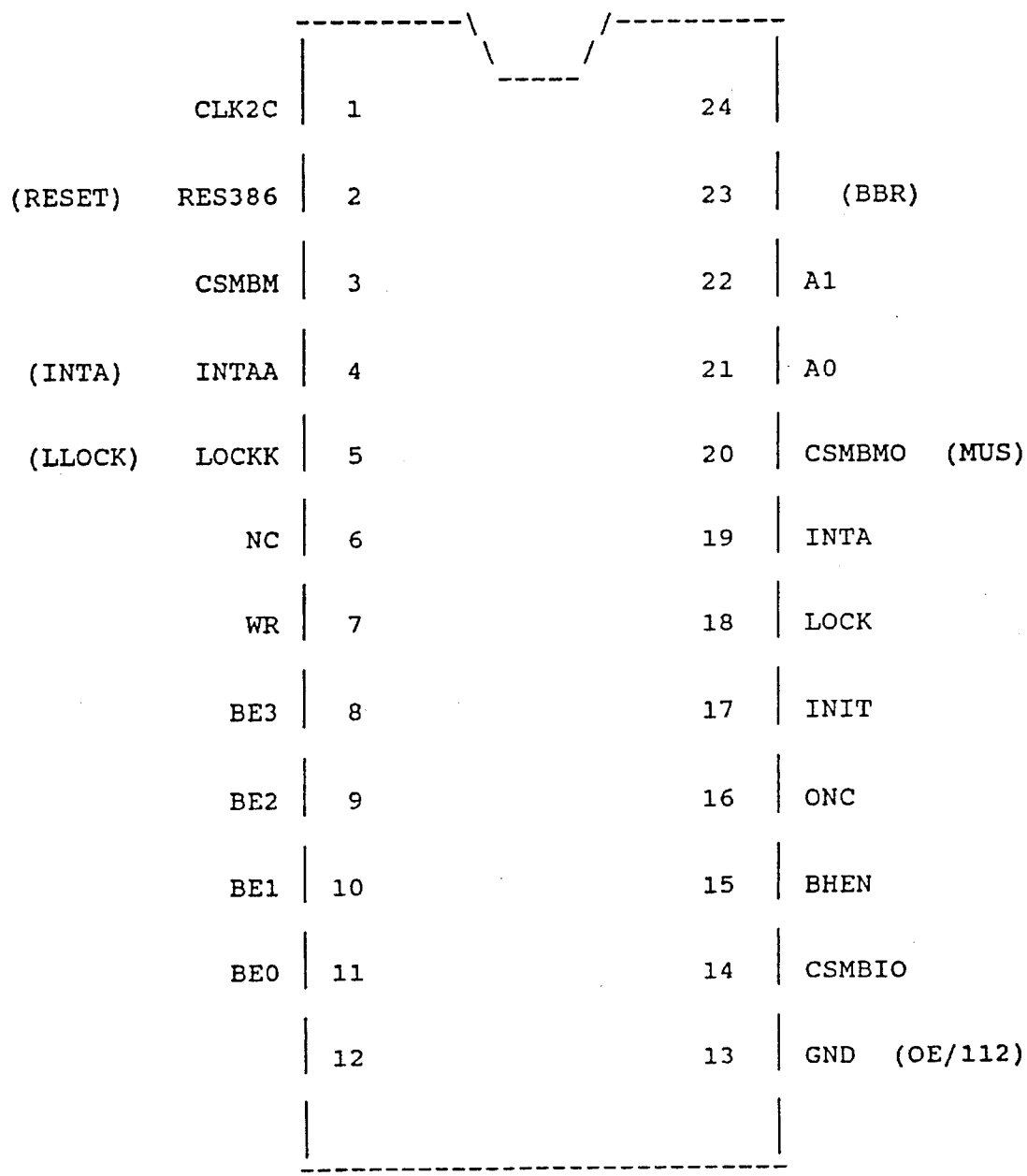
FIG. 21 is a functional black box diagram of an embodiment of a decoder PLD according to the invention.

Referring now to FIGS. 21 and 22, shown is a preferred embodiment of the decoder PLD U35 (1104), described with respect to FIGS. 11A to 11B above, and its specifications, including its equations and pin definitions, respectively.

Figure 23A:
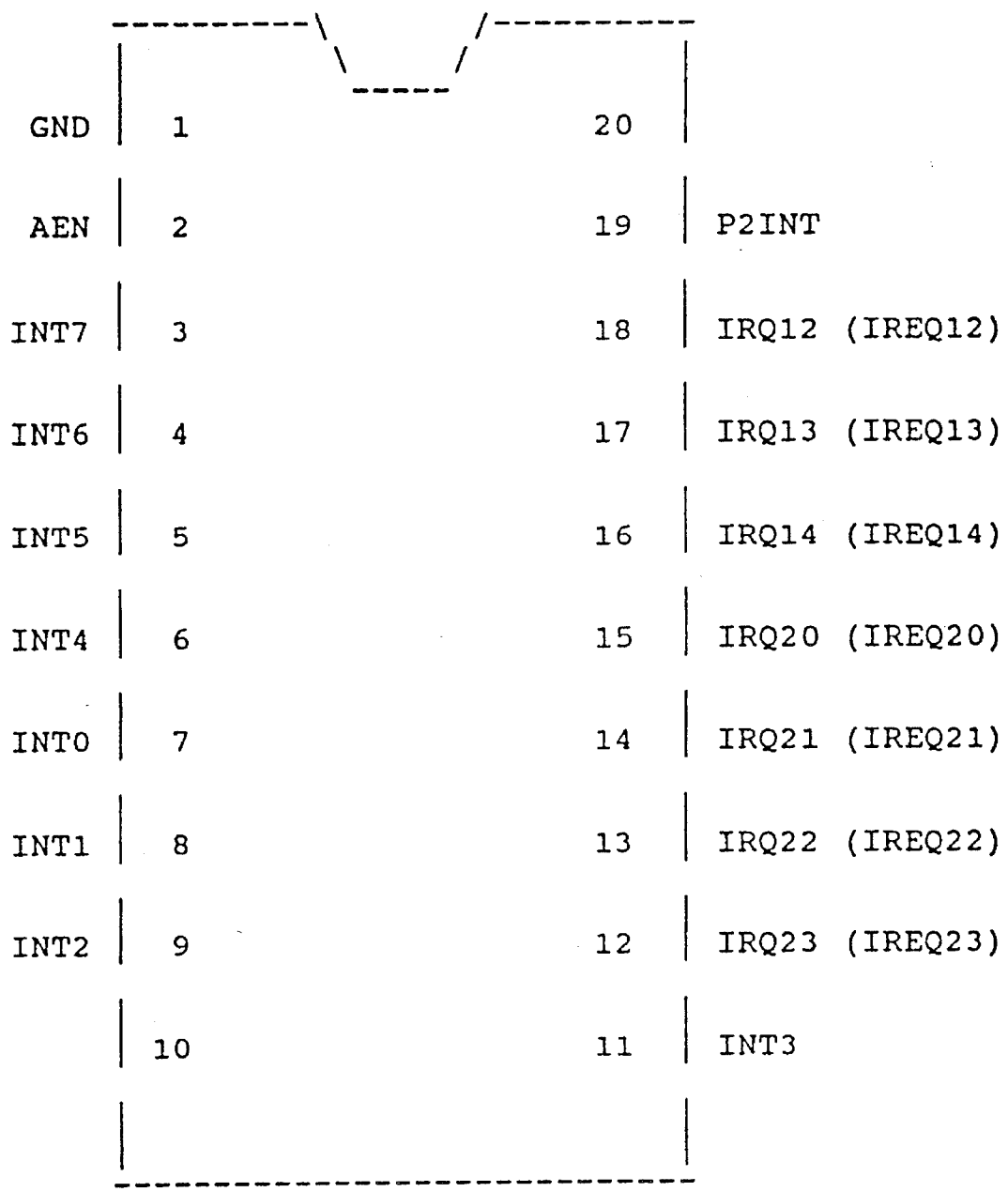
FIG. 23A is a functional black box diagram of an embodiment of an interrupt PLD according to the invention.

Referring now to FIGS. 23A and 23B, shown is a preferred embodiment of the interrupt PLD U56 (see FIGS. 26A to 26D), and its definitions, including the state equations and pin definitions, respectively, for use with the propulsion control system CPU board according to the invention.

Figure 26A:
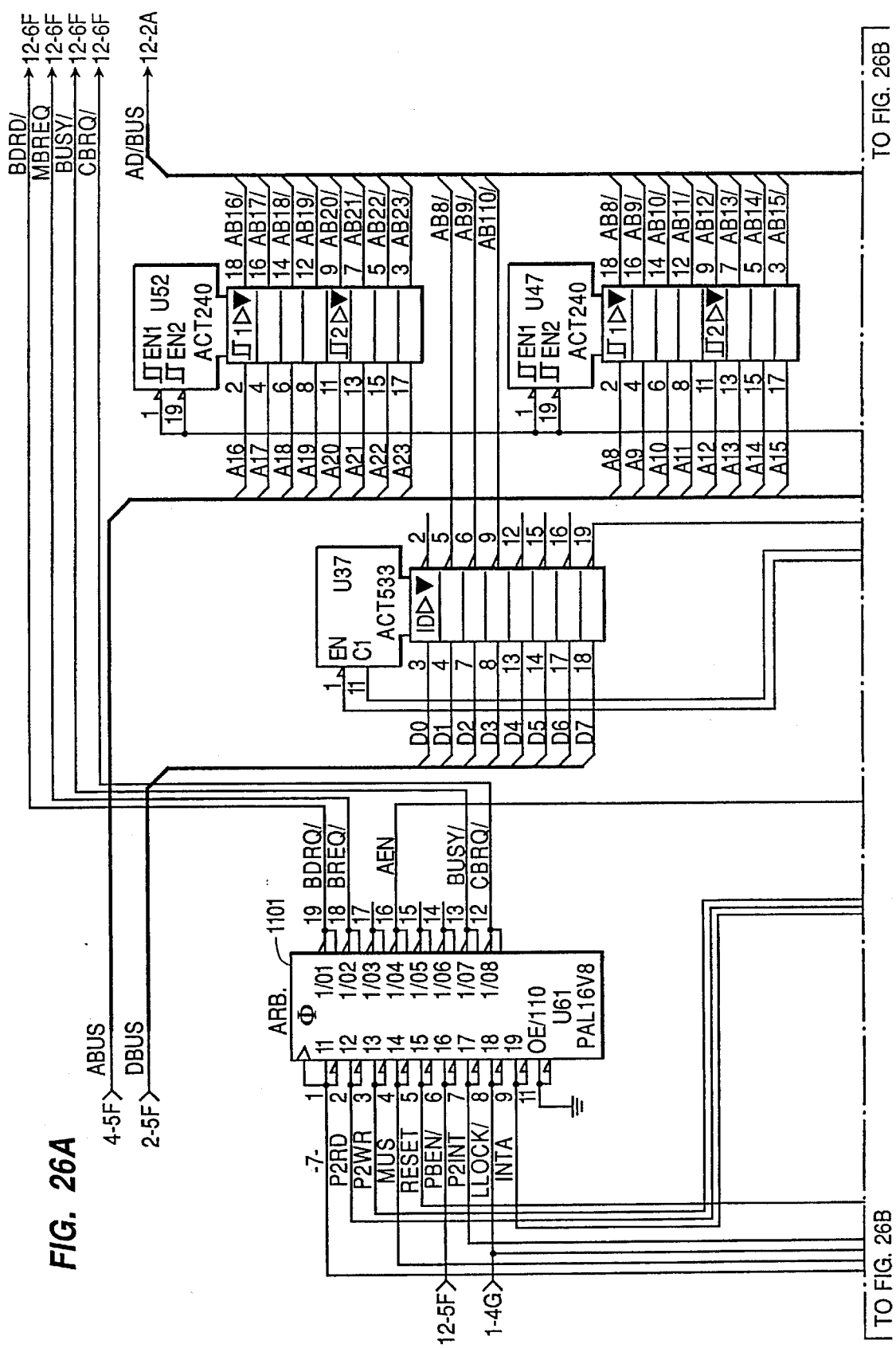
Figure 26B:
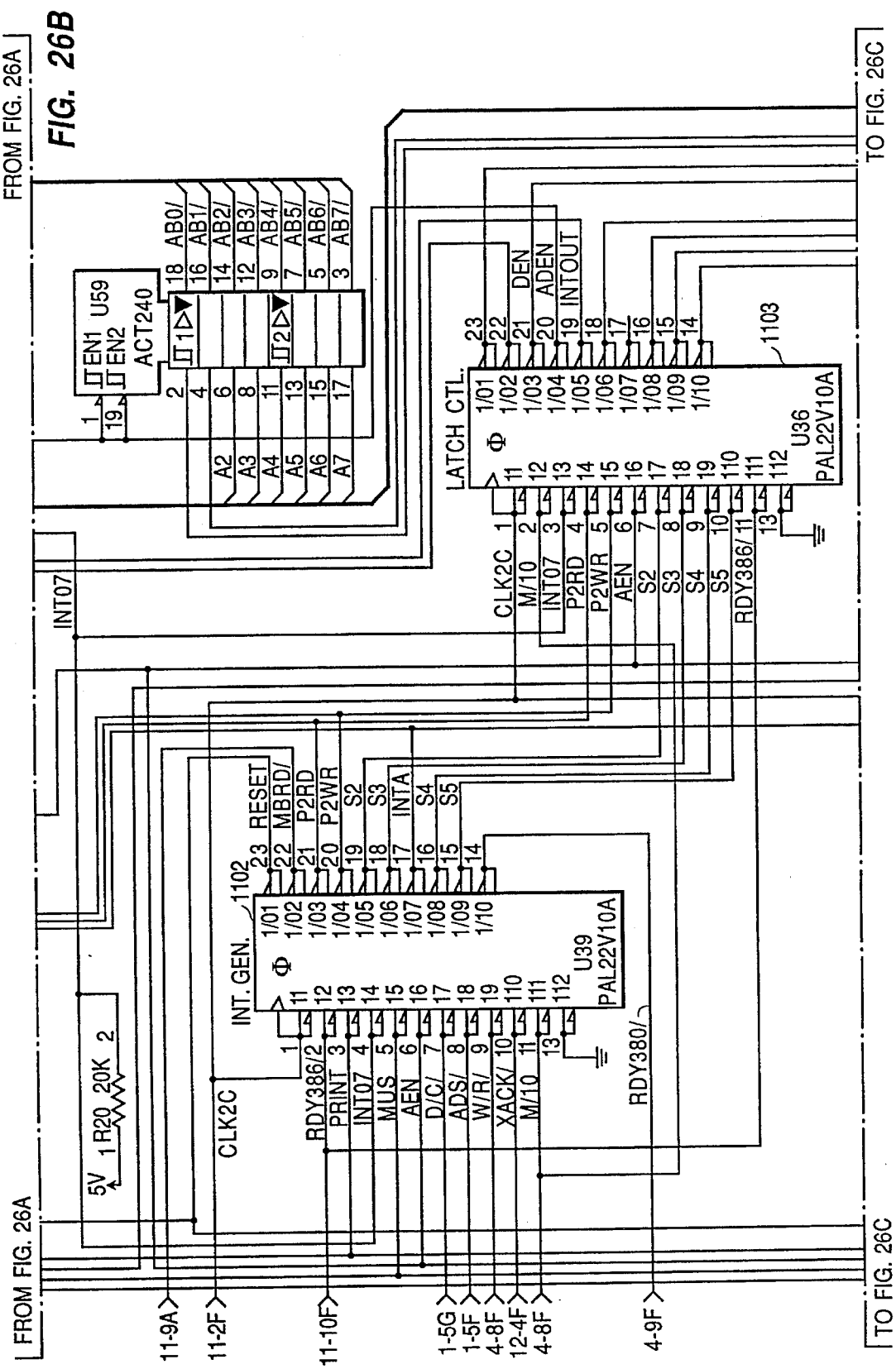
Figure 26C:
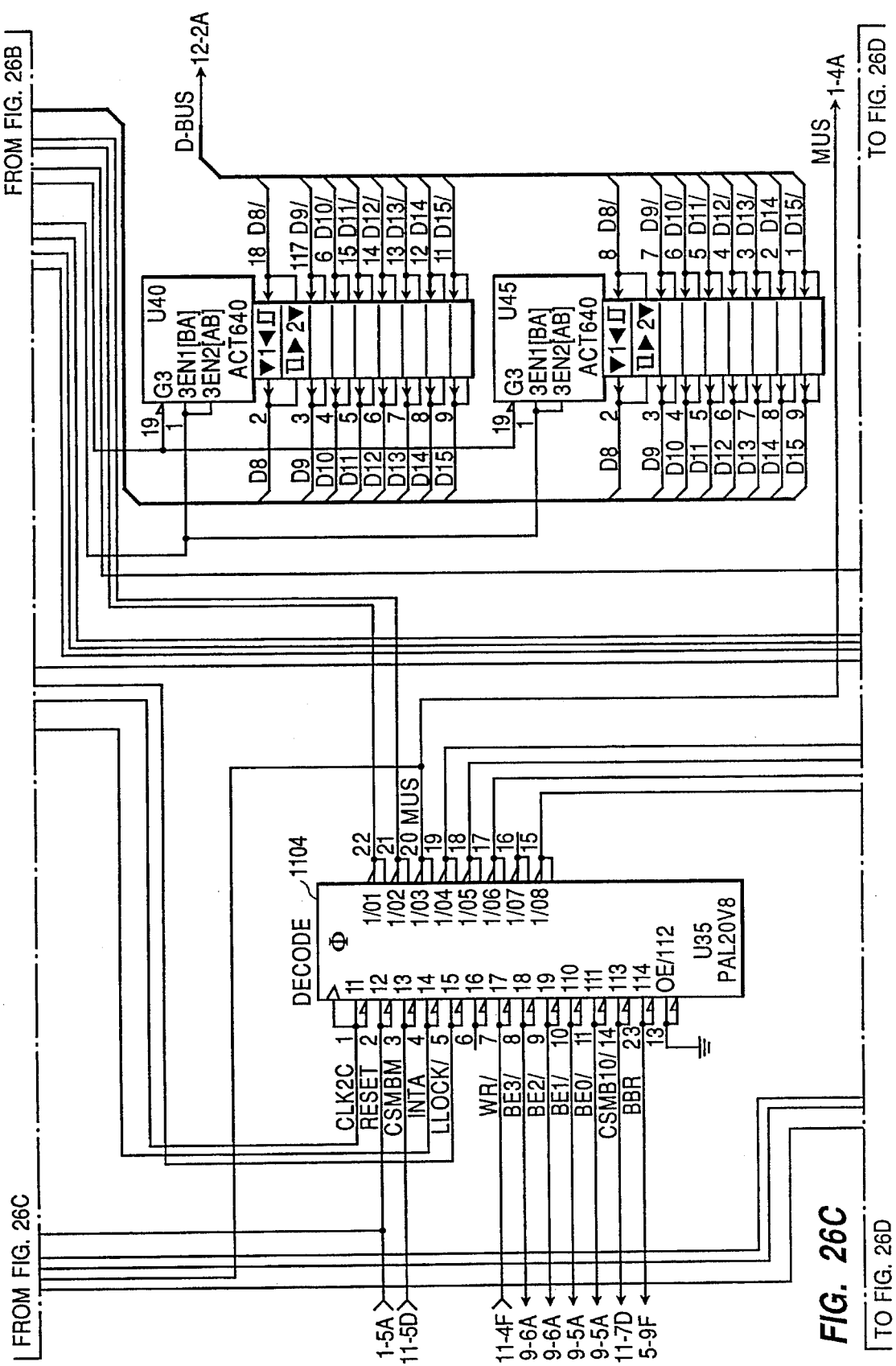
Figure 26D:
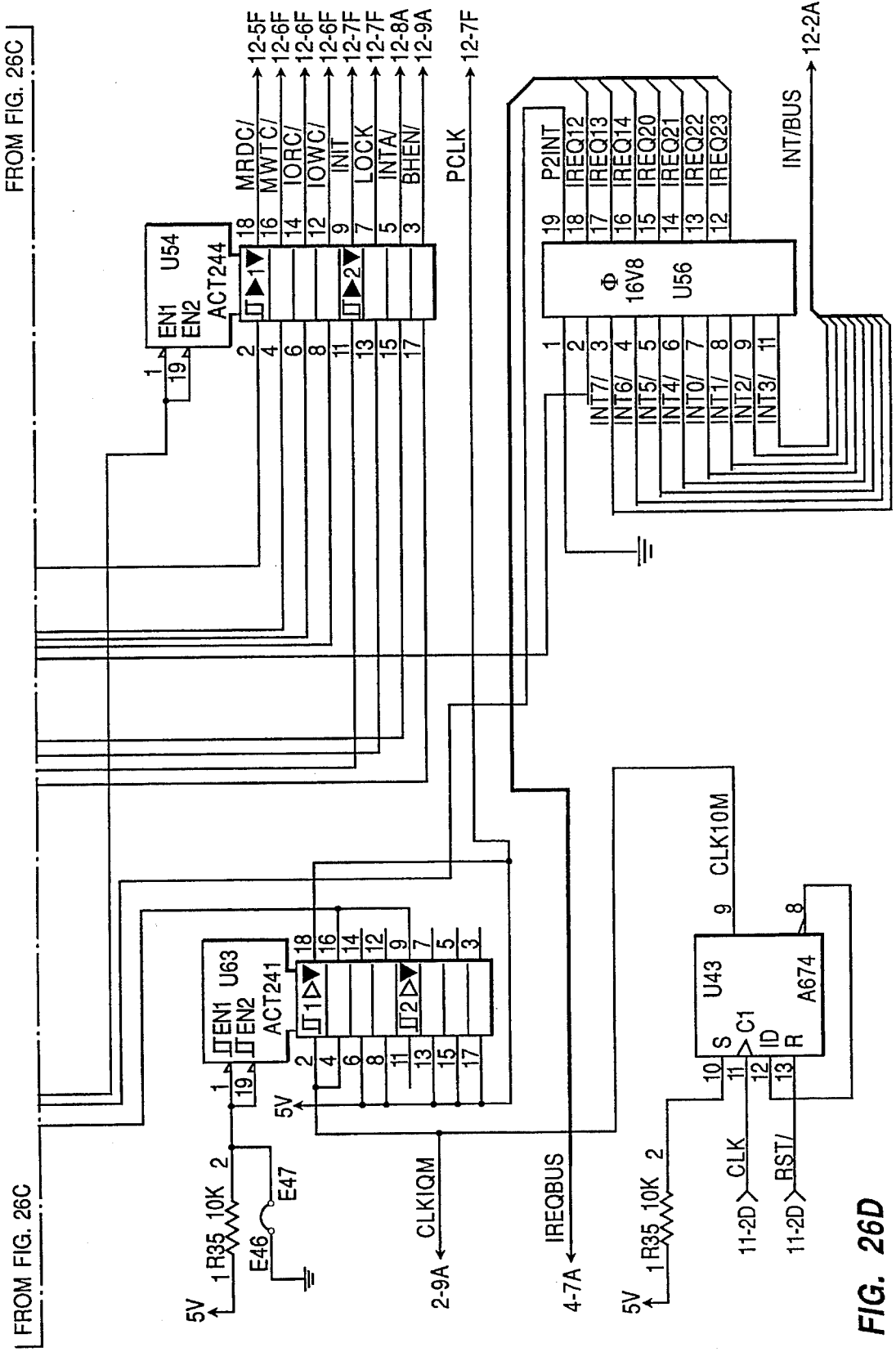

FIGS. 24A through 36D together comprise a complete schematic for a preferred embodiment of the propulsion control system CPU board of the present invention. Highlights of some of the significant features in the figures are now described. FIGS. 24A to 24D show the 80386 CPU (U50) and its 80387 numeric coprocessor (U57) interconnected. FIGS. 25A to 25C show the 8530 serial interface (U48) connected to jacks (J3 and J4) via drivers (U31 and U41), and show associated address and data latches (U44, U46, U51, U53, U55, U58, U60 and U62). FIGS. 26A to 25C show shows the interconnection of the system with the Multibus I control logic PLD's (U35, U36, U39 and U61), shown in simplified form in FIGS. 11A and 11B, show here in more detail and interconnected with the system. FIGS. 27A and 27B show the interconnection of the 82380 multifunction peripheral device U29 (109) with the system. FIGS. 28A to 28C show read only memory U1–U4 (ROM) connected to the system. FIGS. 29A and 29B show the 8751 interconnect device U49 (113) and power PLD U24 with pull-up resistors interconnected to the system. This arrangement allows for a removable Multibus II interface.

FIGS. 14A 14B and FIGS. 32A to 32C show the components that make up the Multibus II interface. The Multibus II interface will not be required in all applications. If the Multibus II is required, all system support functions are provided via the Multibus II interface control logic 114 (U30). If an application doesn't require the interface, additional support circuitry must be added. Device U20 provides power-up, watchdog timer and reset functions. PLD U24 is programmed to accept voltage-low input conditions, power-up reset timing inputs from the Multibus II interface control logic 114 (U30) or device U20. The 8751 microcontroller 113 (U49) provides support for interconnect space and can be removed without additional support circuitry with the exception of several pull-up resistors. All signals that interface from devices U49 (e.g. REST1, REDLED) and U12 (e.g. BCLK, PSBRST and DCLOW) to PLD U24 are pulled high via 10k or 20k pull-up resistors. The use of pull-up resistors permits the use of the same PLD equations in both applications. Using PLD U24 allows the removal of U49, U12, U30 and the Bus line drivers.

FIGS. 30A and 30B show random access memory (RAM) U14–U17 connected to the system. FIGS. 31A to 31C show buffers connected to the system. FIGS. 32A to 32C show the 82389 Multibus II control logic device U30 (114), the message passing coprocessor, interconnected to the system. FIGS. 33A to 33C and 35A to 35C show bus connectors P1 and P2.

FIGS. 34A to 34C show various system programmed logic devices (PLD's) U25 Memory PLD, U26 I/O PLD, U27 CNTR PLD, U28 RDY PLD, and U32 RDY SYC. These PLD's are shown individually in FIGS. 38A, 39A, 40A, 41A and 42A, respectively, and the specifications for these PLD's are provided in tabular form in FIGS. 38B, 39B, 40B, 41B and 42B, respectively. FIGS. 36A to 36D show the bypassing capacitors for the various devices.

FIGS. 37A and 37B show a preferred embodiment of the power PLD U24 and its specifications, including equations and pin definitions. FIGS. 38A and 38B show a preferred embodiment of the memory PLD U25 and its specifications, including equations and pin definitions. FIGS. 39A and 39B show a preferred embodiment of the I/O PLD U26 and its specifications, including equations, test vectors and pin definitions. FIGS. 40A and 40B show a preferred embodiment of the read/write timing generator (CNTR PLD) PLD U27 and its specifications, including equations and pin definitions. FIGS. 41A and 41B show a preferred embodiment of the RDY PLD U28 and its specifications, including equations, test vectors and pin definitions. And FIGS. 42A and 42B show a preferred embodiment of the RDY SYC PLD U32 and its specifications, including equations and pin definitions.

It will be apparent to one of ordinary skill in the art that the manner of making and using the claimed invention has been adequately disclosed in the above written description of the preferred embodiment taken together with the drawings.

It will be understood that the above description of the preferred embodiment of the present invention is susceptible to various modifications, changes, and adaptations, and the same are intended to be comprehended within the meaning and range of equivalents of the appended claims.

I claim:

1. A propulsion control system for controlling a vehicle, said propulsion control system comprising:

a field connector interface board connected to vehicle wiring;

a plurality of master and slave interface and control boards connected to the field connector interface board, said plurality of master and slave interface and control boards including a digital input-output board, an analog input-output board, a bitbus board, a tach reader board, a memory board, and a master CPU board, each of which are connected to the field connector interface board;

a first bus connected to the plurality of master and slave interface and control boards and a second bus connected to the master CPU board;

wherein, the master CPU board comprises:

a local bus;

memory;

a multifunction peripheral device; and a central processing unit operatively connected to said memory and said multifunction peripheral device by said local bus, with said multifunction peripheral device including:

wait state generator means for generating timing signals, direct memory access control means for controlling data transfer in said system, and interrupt handling means for generating interrupt requests and handling direct memory access interrupts;

a first bus interface, operatively connected to said multifunction peripheral device and said local bus, including:

first bus master control logic means for controlling the first bus responsive to said interrupt requests from said interrupt handling means; and buffering means for buffering data between said local bus and the first bus responsive to said first bus control logic means; and a second bus interface, operatively connected to said multifunction peripheral device, including:

second bus master control logic means for controlling the second bus and producing said direct memory access interrupts;

interconnect means for interfacing control signals from said second bus control logic means;

reset control having an output connected to said interconnect means; and buffering means for buffering data between the second bus and said second bus control logic means responsive to control signals from said interconnect means;

with said central processing unit circuit board communicating with the remaining components of said propulsion control system via said first and said second buses.

2. The propulsion control system according to claim 1, wherein said first bus master control logic means for controlling the first bus comprises:

bus control logic means for producing timing and control signals;

arbiter means, responsive to said timing and control signals, for providing bus protocol control and synchronization of the central processor with the first bus;

decoder means, responsive to said timing and control signals, for enabling said bus control logic means responsive to address signals from the central processor; and latch control means, responsive to said timing and control signals, for generating command and control timing for the first bus to optimize its performance.

* * * * *

UNITED STATES PATENT AND TRADEMARK OFFICE
CERTIFICATE OF CORRECTION

PATENT NO. : 5,488,733  
DATED : January 30, 1996  
INVENTOR(S) : William F. Molyneaux Page 1 of 2

It is certified that error appears in the above-indentified patent and that said Letters Patent is hereby corrected as shown below:

On the title page, item [54], "CENTAL" should read --CENTRAL--.

Column 1 Line 2 "CENTAL" should read --CENTRAL--.

Column 3 Lines 21-22 "slave interface face" should read --slave interface--.

Column 3 Line 33 "sown" should read --shown--.

Column 4 Line 2 "1103" should read --1104--.

Column 4 Line 5 "FIG, 23B" should read --FIG. 23B--.

Column 4 Line 6 "FIG, 23;" should read --FIG. 23A;--.

Figure 24A:
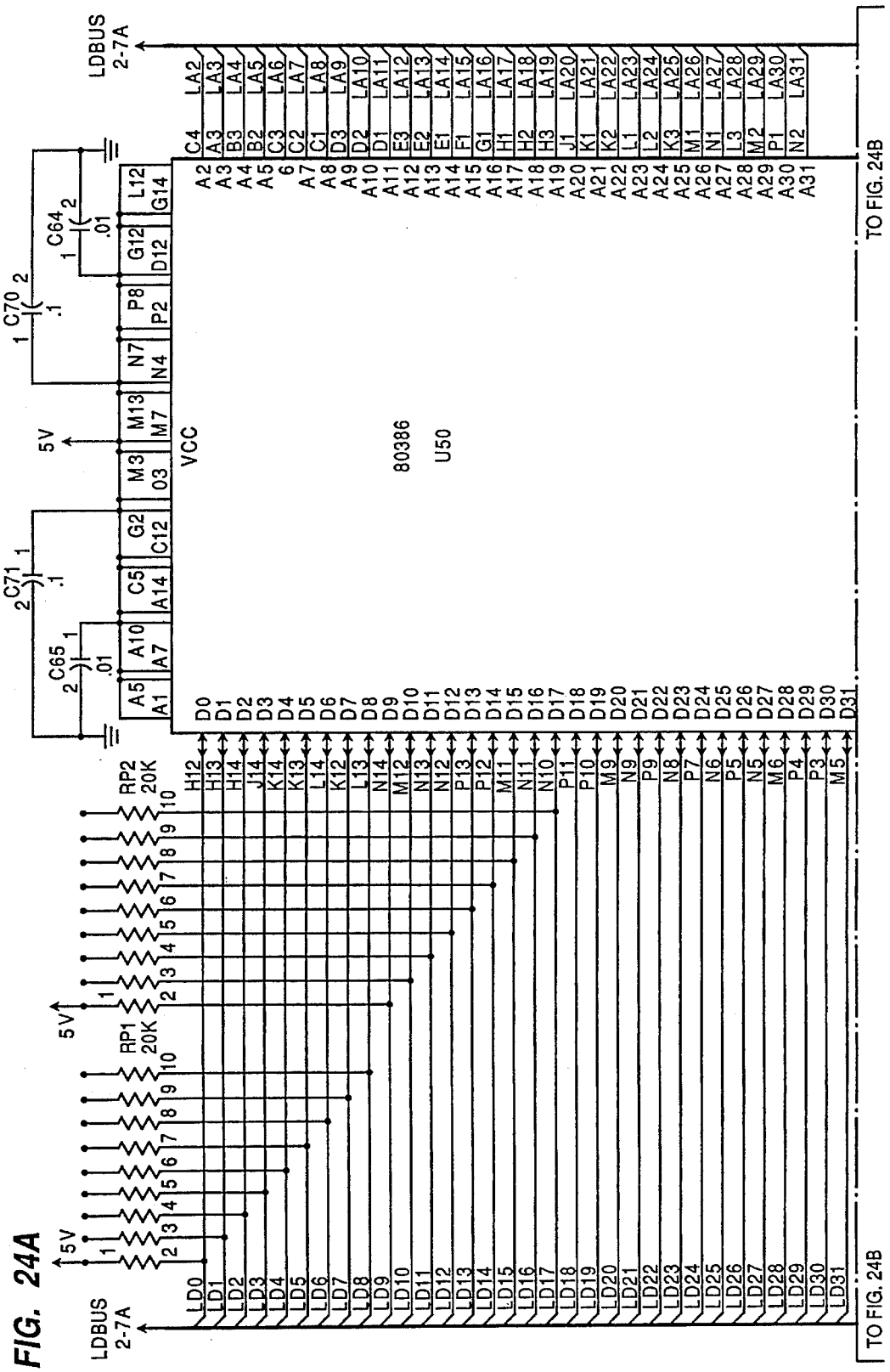
Figure 24B:
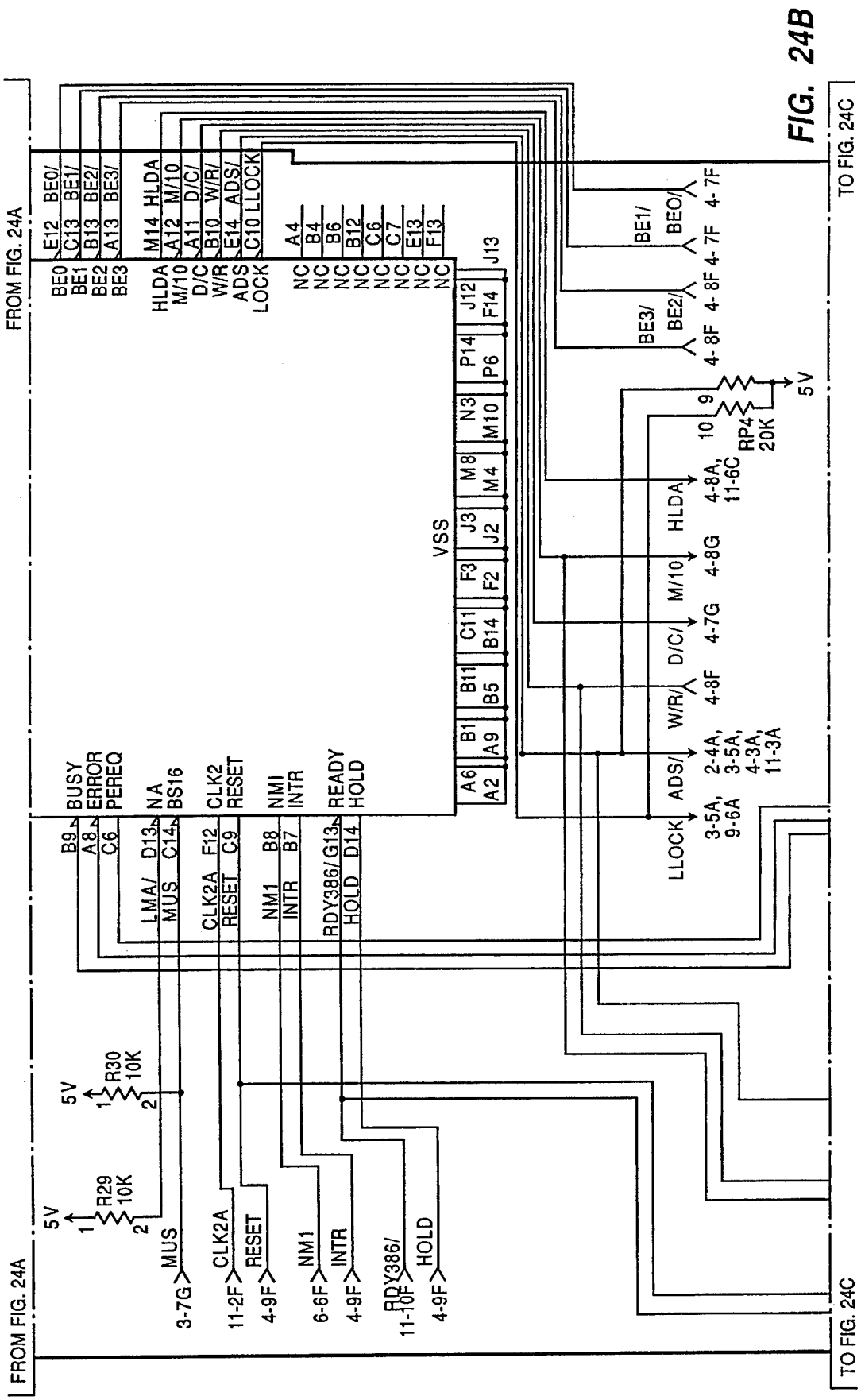
Figure 24C:
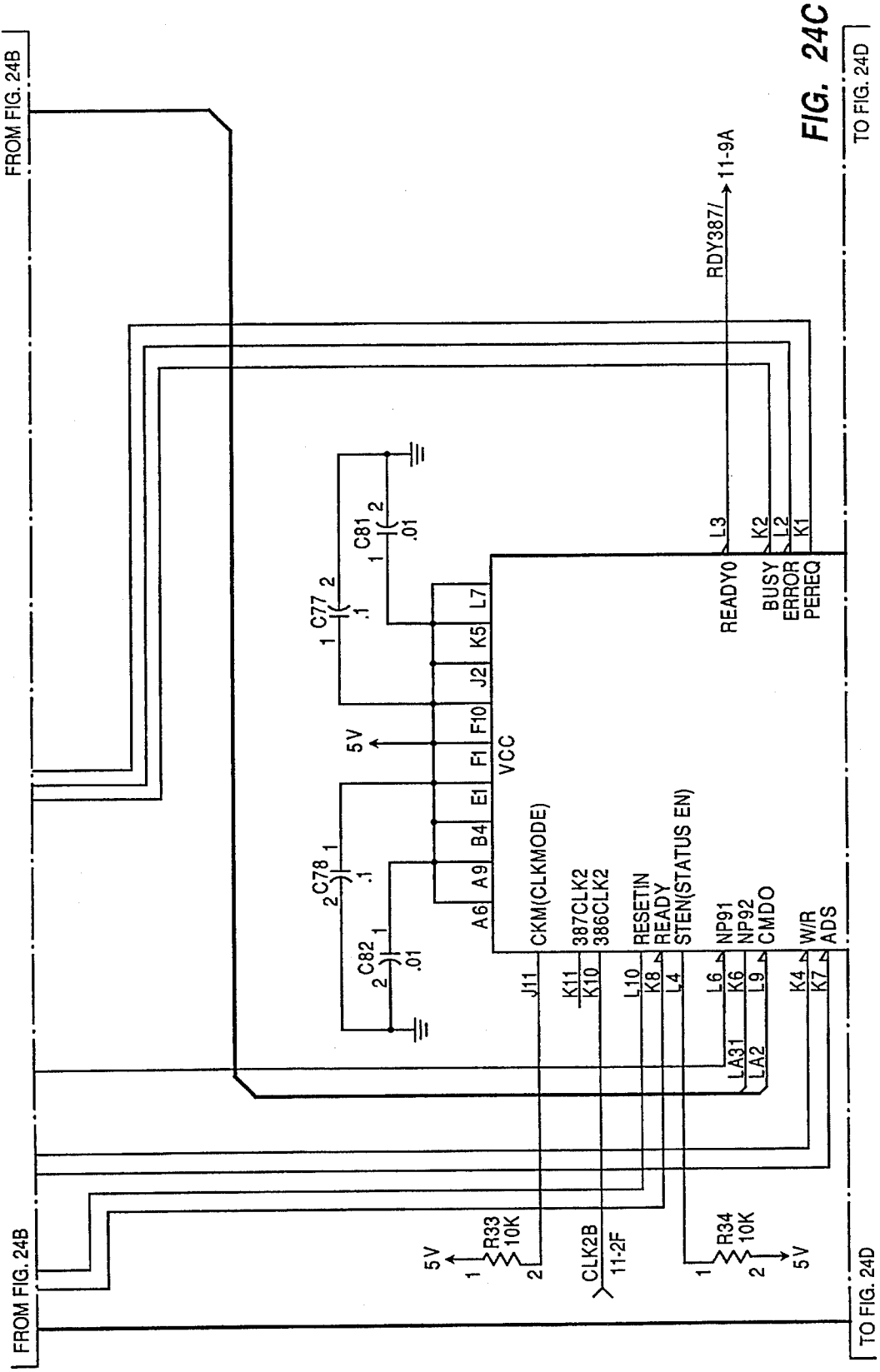
Figure 24D:
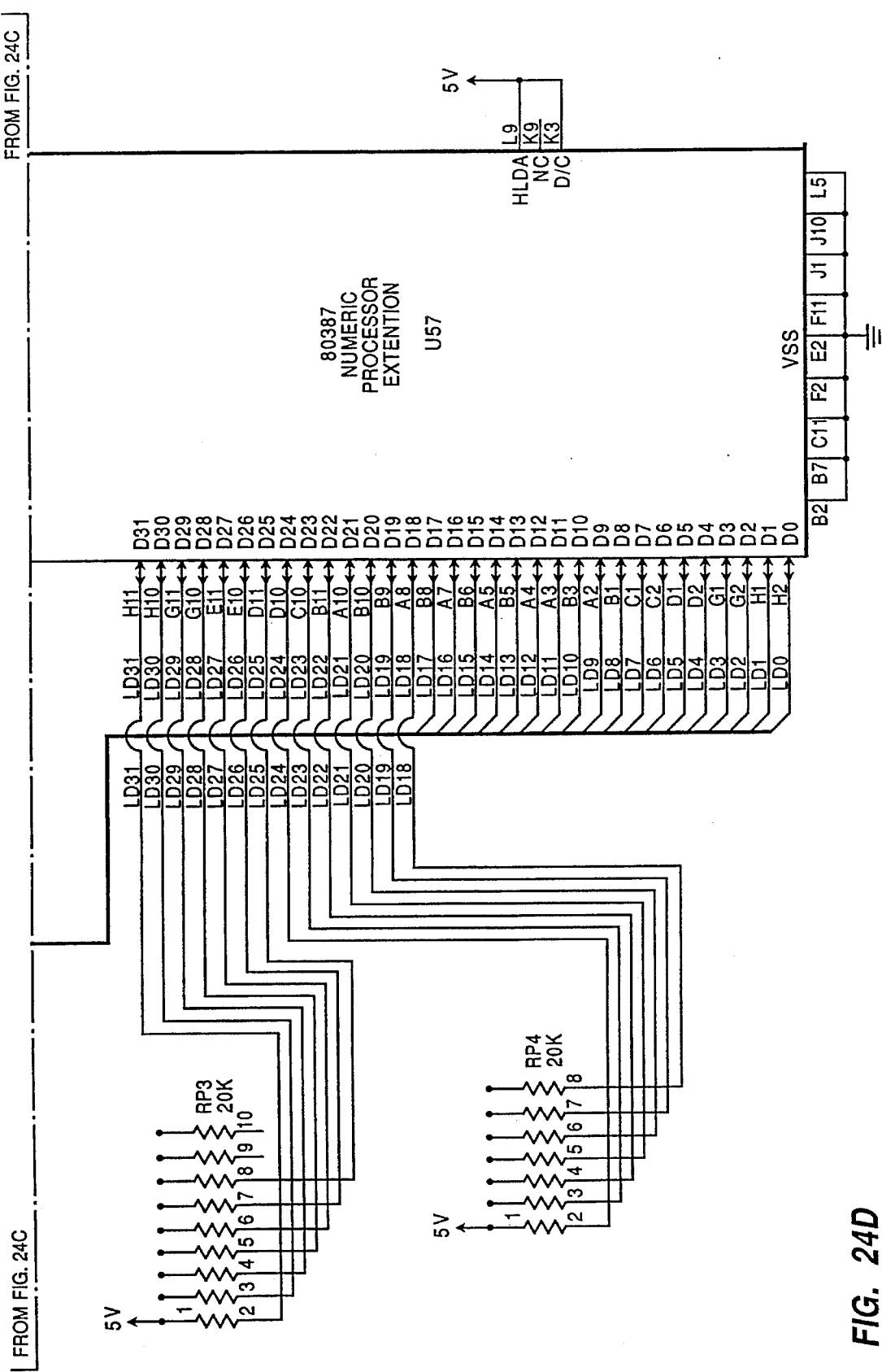

Column 4 Line 10 "FIG. 24A" should read --FIGS. 24A--.

Column 4 Line 11 "compressor;" should read --coprocessor;--.

Column 4 Line 13 after "interface" insert --for the--.

Column 5 Line 22 "in." should read --in--

Column 5 Line 46 "32A and 32C" should read --32A to 32C--.

UNITED STATES PATENT AND TRADEMARK OFFICE
CERTIFICATE OF CORRECTION

PATENT NO. : 5,488,733
DATED : January 30, 1996
INVENTOR(S) : William F. Molyneaux It is certified that error appears in the above-indentified patent and that said Letters Patent is hereby corrected as shown below:

Column 6 Line 22 "11,059" should read --11.059--.

Column 6 Line 47 "11A. 11B" should read --11A, 11B--.

Column 6 Line 50 "FIG." should read --FIGS.--.

Column 7 Line 47 "strobe" should read --Strobe--.

Column 10 Lines 38-39 "26A to 25C show shows" should read --26A to 26D show--.

Column 10 Line 41 "show here" should read --shown here--.

Column 10 Line 50 "14A 14B" should read --14A, 14B--.

Signed and Sealed this

Eleventh Day of June, 1996

BRUCE LEHMAN

*Attest:*

*Attesting Officer*   Commissioner of Patents and Trademarks

UNITED STATES PATENT AND TRADEMARK OFFICE
CERTIFICATE OF CORRECTION

PATENT NO. : 5,488,733
DATED : January 30, 1996
INVENTOR(S) : William F. Molyneaux It is certified that error appears in the above-indentified patent and that said Letters Patent is hereby corrected as shown below:

Column 3 Line 58 "11;" should read --11);--.

Signed and Sealed this

Tenth Day of September, 1996

*Attest:*

BRUCE LEHMAN

*Attesting Officer*  *Commissioner of Patents and Trademarks*